United States Patent
Xu et al.

(10) Patent No.: US 12,394,323 B2
(45) Date of Patent: *Aug. 19, 2025

(54) POLYGON SHAPED FLIGHT-RESTRICTION ZONES

(71) Applicant: SZ DJI TECHNOLOGY CO., LTD., Shenzhen (CN)

(72) Inventors: Xinan Xu, Shenzhen (CN); Yun Yu, Shenzhen (CN); Canlong Lin, Shenzhen (CN); Xi Chen, Shenzhen (CN); Mingyu Wang, Shenzhen (CN); Jianyu Song, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 287 days.

This patent is subject to a terminal disclaimer.

(21) Appl. No.: 17/941,694

(22) Filed: Sep. 9, 2022

(65) Prior Publication Data

US 2023/0048209 A1  Feb. 16, 2023

Related U.S. Application Data

(63) Continuation of application No. 17/523,847, filed on Nov. 10, 2021, now Pat. No. 11,462,116, which is a (Continued)

(30) Foreign Application Priority Data

Mar. 9, 2015  (WO) ................. PCT/CN2015/073915

(51) Int. Cl.
*G08G 5/55* (2025.01)
*G05D 1/00* (2006.01)
(Continued)

(52) U.S. Cl.
CPC ............. *G08G 5/55* (2025.01); *G05D 1/0214* (2013.01); *G05D 1/106* (2019.05); *G05D 1/617* (2024.01);
(Continued)

(58) Field of Classification Search
CPC ...... G08G 5/006; G08G 5/004; G08G 5/0013; G08G 5/0021; G08G 5/0026;
(Continued)

(56) References Cited

U.S. PATENT DOCUMENTS

| | | | |
|---|---|---|---|
| 4,862,373 A | 8/1989 | Meng | |
| 5,631,640 A | 5/1997 | Deis et al. | |

(Continued)

FOREIGN PATENT DOCUMENTS

| | | |
|---|---|---|
| CN | 1222969 A | 7/1999 |
| CN | 1222970 A | 7/1999 |

(Continued)

OTHER PUBLICATIONS

European Patent Office, Summons to Oral Proceedings, EP Patent Application 19198007.7, mailed Nov. 4, 2022, 13 pages.

(Continued)

*Primary Examiner* — Mary Cheung
(74) *Attorney, Agent, or Firm* — ANOVA LAW GROUP, PLLC

(57) ABSTRACT

Systems, methods, and devices are provided for controlling an unmanned aerial vehicle (UAV) associated with flight response measures. The flight response measure may be generated by assessing one or more flight-restriction strips, assessing at least one of a location or a movement characteristic of the UAV relative to the one or more flight-restriction strips, and directing, with aid of one or more processors, the UAV to take one or more flight response measures based on at least one of the location or movement (Continued)

characteristic of the UAV relative to the one or more flight-restriction strips.

20 Claims, 22 Drawing Sheets

Related U.S. Application Data continuation of application No. 16/810,631, filed on Mar. 5, 2020, now Pat. No. 11,482,119, which is a continuation of application No. 15/699,359, filed on Sep. 8, 2017, now Pat. No. 10,586,463, which is a continuation of application No. PCT/CN2015/098149, filed on Dec. 21, 2015.

(51) Int. Cl.
  *G05D 1/617* (2024.01)
  *G08G 5/20* (2025.01)
  *G08G 5/21* (2025.01)
  *G08G 5/22* (2025.01)
  *G08G 5/26* (2025.01)
  *G08G 5/53* (2025.01)
  *G08G 5/57* (2025.01)
  *G08G 5/59* (2025.01)
  *G08G 5/72* (2025.01)
  *B64U 10/10* (2023.01)
  *B64U 101/30* (2023.01)

(52) U.S. Cl.
  CPC .............. *G05D 1/621* (2024.01); *G08G 5/20* (2025.01); *G08G 5/21* (2025.01); *G08G 5/22* (2025.01); *G08G 5/26* (2025.01); *G08G 5/53* (2025.01); *G08G 5/57* (2025.01); *G08G 5/59* (2025.01); *G08G 5/727* (2025.01); *B64U 10/10* (2023.01); *B64U 2101/30* (2023.01); *B64U 2201/10* (2023.01); *B64U 2201/20* (2023.01)

(58) Field of Classification Search
  CPC .. G08G 5/0052; G08G 5/0069; G08G 5/0082; B64U 10/10; B64U 2101/30; B64U 2201/10; B64U 2201/20
  See application file for complete search history.

(56) References Cited

U.S. PATENT DOCUMENTS

| | | | |
|---|---|---|---|
| 6,064,939 A | 5/2000 | Nishida et al. | |
| 6,097,996 A | 8/2000 | Deker | |
| 6,161,063 A | 12/2000 | Deker | |
| 6,289,277 B1 | 9/2001 | Feyereisen et al. | |
| 6,650,972 B1 | 11/2003 | Robinson et al. | |
| 6,675,095 B1 | 1/2004 | Bird et al. | |
| 6,708,091 B2 | 3/2004 | Tsao | |
| 6,718,235 B1 | 4/2004 | Borugian | |
| 7,164,986 B2 * | 1/2007 | Humphries | B60R 25/00 340/426.22 |
| 7,194,353 B1 | 3/2007 | Baldwin et al. | |
| 7,228,232 B2 | 6/2007 | Bodin et al. | |
| 7,231,294 B2 | 6/2007 | Bodin et al. | |
| 7,512,462 B2 | 3/2009 | Nichols et al. | |
| 7,606,115 B1 | 10/2009 | Cline et al. | |
| 7,734,387 B1 | 6/2010 | Young et al. | |
| 7,737,878 B2 | 6/2010 | Van et al. | |
| 8,019,532 B2 | 9/2011 | Sheha et al. | |
| 8,082,102 B2 | 12/2011 | Ravenscroft | |
| 8,340,836 B2 | 12/2012 | Taylor | |
| 8,521,339 B2 | 8/2013 | Gariepy et al. | |
| 8,531,293 B2 | 9/2013 | Putz | |
| 8,543,265 B2 | 9/2013 | Ekhaguere et al. | |
| 8,600,602 B1 | 12/2013 | Mcandrew et al. | |
| 8,692,703 B1 | 4/2014 | Dove et al. | |
| 8,702,033 B2 | 4/2014 | Regmi | |
| 8,755,950 B2 | 6/2014 | Johansson | |
| 8,788,118 B2 | 7/2014 | Matos | |
| 8,838,289 B2 | 9/2014 | Margolin | |
| 8,868,328 B1 | 10/2014 | Estkowski | |
| 9,087,451 B1 | 7/2015 | Jarrell | |
| 9,188,657 B2 | 11/2015 | Benson | |
| 9,201,422 B2 | 12/2015 | Ohtomo et al. | |
| 9,274,529 B2 | 3/2016 | Ben-shachar et al. | |
| 9,317,036 B2 | 4/2016 | Wang et al. | |
| 9,329,001 B2 | 5/2016 | Mohamadi | |
| 9,483,950 B1 | 11/2016 | Wang et al. | |
| 9,651,944 B2 | 5/2017 | Arwine | |
| 9,704,408 B2 | 7/2017 | Yu et al. | |
| 9,734,723 B1 | 8/2017 | Bruno et al. | |
| 9,842,505 B2 | 12/2017 | Wang et al. | |
| 10,147,329 B2 | 12/2018 | Liu et al. | |
| 10,380,900 B2 | 8/2019 | Batla et al. | |
| 10,586,463 B2 | 3/2020 | Xu et al. | |
| 10,733,895 B2 | 8/2020 | Liu et al. | |
| 2002/0022909 A1 | 2/2002 | Karem | |
| 2003/0055540 A1 | 3/2003 | Hansen | |
| 2003/0134645 A1 | 7/2003 | Stern et al. | |
| 2003/0225489 A1 | 12/2003 | Tsao | |
| 2003/0227395 A1 | 12/2003 | Zeineh | |
| 2004/0193334 A1 | 9/2004 | Carlsson et al. | |
| 2004/0217883 A1 | 11/2004 | Judge et al. | |
| 2005/0159883 A1* | 7/2005 | Humphries | B60R 25/33 340/995.21 |
| 2005/0165886 A1 | 7/2005 | Tuer et al. | |
| 2006/0106506 A1 | 5/2006 | Nichols et al. | |
| 2006/0167597 A1 | 7/2006 | Bodin et al. | |
| 2006/0167599 A1 | 7/2006 | Bodin et al. | |
| 2006/0217877 A1 | 9/2006 | Bodin et al. | |
| 2006/0217881 A1 | 9/2006 | Pei et al. | |
| 2007/0018052 A1 | 1/2007 | Eriksson | |
| 2007/0093946 A1 | 4/2007 | Gideoni | |
| 2007/0106473 A1 | 5/2007 | Bodin et al. | |
| 2007/0146167 A1 | 6/2007 | Miller et al. | |
| 2008/0025238 A1 | 1/2008 | Mccown et al. | |
| 2008/0174454 A1 | 7/2008 | Bitar et al. | |
| 2008/0183344 A1* | 7/2008 | Doyen | G08G 5/0082 701/9 |
| 2008/0306680 A1 | 12/2008 | Marty et al. | |
| 2009/0012661 A1 | 1/2009 | Louis | |
| 2009/0027253 A1 | 1/2009 | Van Tooren et al. | |
| 2009/0082913 A1 | 3/2009 | Yount et al. | |
| 2009/0210109 A1 | 8/2009 | Ravenscroft | |
| 2009/0322567 A1 | 12/2009 | Stock et al. | |
| 2010/0004798 A1 | 1/2010 | Bodin et al. | |
| 2010/0031334 A1 | 2/2010 | Shaikh | |
| 2010/0084513 A1 | 4/2010 | Gariepy et al. | |
| 2010/0094500 A1 | 4/2010 | Jin | |
| 2010/0114633 A1 | 5/2010 | Sislak et al. | |
| 2010/0225457 A1 | 9/2010 | Aguirre | |
| 2010/0286859 A1 | 11/2010 | Feigh et al. | |
| 2011/0202206 A1 | 8/2011 | Karthikeyan et al. | |
| 2011/0301842 A1 | 12/2011 | Krupansky et al. | |
| 2012/0143482 A1 | 6/2012 | Goossen et al. | |
| 2012/0150423 A1 | 6/2012 | Khatwa et al. | |
| 2012/0203419 A1 | 8/2012 | Tucker et al. | |
| 2013/0046422 A1 | 2/2013 | Cabos | |
| 2013/0060405 A1 | 3/2013 | Komatsuzaki et al. | |
| 2013/0085629 A1 | 4/2013 | Washington et al. | |
| 2013/0198857 A1 | 8/2013 | Maier et al. | |
| 2013/0238170 A1 | 9/2013 | Klinger | |
| 2013/0261850 A1 | 10/2013 | Smith et al. | |
| 2013/0269013 A1 | 10/2013 | Parry et al. | |
| 2013/0311009 A1 | 11/2013 | McAndrew et al. | |
| 2013/0317667 A1 | 11/2013 | Kruglick | |
| 2014/0018976 A1 | 1/2014 | Goossen et al. | |
| 2014/0018979 A1 | 1/2014 | Goossen et al. | |
| 2014/0025229 A1 | 1/2014 | Levien et al. | |
| 2014/0067160 A1 | 3/2014 | Levien et al. | |
| 2014/0142785 A1 | 5/2014 | Fuentes et al. | |
| 2014/0231590 A1 | 8/2014 | Trowbridge et al. | |
| 2014/0330456 A1 | 11/2014 | Lopez Morales et al. | |

(56) References Cited

U.S. PATENT DOCUMENTS

| | | | |
|---|---|---|---|
| 2014/0359724 | A1 | 12/2014 | Kubisch |
| 2014/0371952 | A1 | 12/2014 | Ohtomo et al. |
| 2014/0379173 | A1 | 12/2014 | Knapp et al. |
| 2015/0087303 | A1 | 3/2015 | Hillary et al. |
| 2015/0153175 | A1 | 6/2015 | Skaaksrud |
| 2015/0241878 | A1* | 8/2015 | Crombez ........ B60W 60/00184 701/23 |
| 2015/0254988 | A1 | 9/2015 | Wang et al. |
| 2015/0336667 | A1 | 11/2015 | Srivastava et al. |
| 2015/0336668 | A1 | 11/2015 | Pasko et al. |
| 2015/0339931 | A1 | 11/2015 | Yu et al. |
| 2015/0339933 | A1 | 11/2015 | Batla et al. |
| 2015/0379874 | A1 | 12/2015 | Ubhi et al. |
| 2016/0005318 | A1 | 1/2016 | Wang et al. |
| 2016/0071420 | A1 | 3/2016 | Heilman |
| 2016/0140851 | A1 | 5/2016 | Levy et al. |
| 2016/0163203 | A1 | 6/2016 | Wang et al. |
| 2016/0214715 | A1 | 7/2016 | Meffert |
| 2016/0225264 | A1 | 8/2016 | Taveira |
| 2016/0240087 | A1 | 8/2016 | Kube et al. |
| 2016/0244161 | A1 | 8/2016 | Mcclure |
| 2016/0253907 | A1* | 9/2016 | Taveira ................ G08G 5/0039 701/3 |
| 2016/0275801 | A1 | 9/2016 | Kopardekar |
| 2016/0321930 | A9 | 11/2016 | Yu et al. |
| 2017/0243494 | A1 | 8/2017 | Taveira |
| 2017/0301242 | A1 | 10/2017 | Yu et al. |
| 2017/0372618 | A1 | 12/2017 | Xu et al. |
| 2020/0202721 | A1 | 6/2020 | Xu et al. |
| 2020/0357286 | A1 | 11/2020 | Liu et al. |
| 2022/0068143 | A1 | 3/2022 | Xu et al. |
| 2022/0068144 | A1 | 3/2022 | Liu et al. |

FOREIGN PATENT DOCUMENTS

| | | | | |
|---|---|---|---|---|
| CN | 1222971 | A | | 7/1999 |
| CN | 1289994 | C | | 12/2006 |
| CN | 101504287 | A | | 8/2009 |
| CN | 101582202 | A | | 11/2009 |
| CN | 101598557 | A | | 12/2009 |
| CN | 101826262 | A | | 9/2010 |
| CN | 102066234 | A | * | 5/2011 ............ B66F 9/0755 |
| CN | 102331260 | A | | 1/2012 |
| CN | 102496312 | A | | 6/2012 |
| CN | 102510011 | A | | 6/2012 |
| CN | 202267872 | U | | 6/2012 |
| CN | 102591352 | A | | 7/2012 |
| CN | 102620736 | A | | 8/2012 |
| CN | 102637040 | A | | 8/2012 |
| CN | 102955478 | A | | 3/2013 |
| CN | 103116360 | A | | 5/2013 |
| CN | 103177609 | A | | 6/2013 |
| CN | 103226356 | A | | 7/2013 |
| CN | 103267528 | A | | 8/2013 |
| CN | 103365299 | A | | 10/2013 |
| CN | 1103455036 | A | | 12/2013 |
| CN | 103592947 | A | | 2/2014 |
| CN | 104216414 | A | | 12/2014 |
| CN | 104834307 | A | | 8/2015 |
| CN | 104991564 | A | | 10/2015 |
| CN | 105139693 | A | | 12/2015 |
| CN | 106461396 | A | | 2/2017 |
| CN | 107407938 | A | | 11/2017 |
| CN | 108351645 | A | | 7/2018 |
| EP | 0490745 | B1 | | 3/1996 |
| EP | 1218698 | B1 | | 1/2008 |
| EP | 2648175 | A2 | | 10/2013 |
| EP | 2674723 | A2 | | 12/2013 |
| FR | 2893146 | A1 | | 5/2007 |
| GB | 2476149 | A | | 6/2011 |
| JP | H09507714 | A | | 8/1997 |
| JP | H11296800 | A | | 10/1999 |
| JP | 2003127994 | A | | 5/2003 |
| JP | 2003127997 | A | | 5/2003 |
| JP | 2004291805 | A | | 10/2004 |
| JP | 2005071176 | A | | 3/2005 |
| JP | 2005274284 | A | | 10/2005 |
| JP | 2006143193 | A | | 6/2006 |
| JP | 2007164280 | A | | 6/2007 |
| JP | 2007237873 | A | | 9/2007 |
| JP | 2008247293 | A | | 10/2008 |
| JP | 2009300361 | A | | 12/2009 |
| JP | 2010095246 | A | | 4/2010 |
| JP | 2014040231 | A | | 3/2014 |
| JP | 2016539838 | A | | 12/2016 |
| KR | 20160074895 | A | | 6/2016 |
| RU | 2657916 | C1 | | 6/2018 |
| WO | 2007054448 | A1 | | 5/2007 |
| WO | 2009091431 | A1 | | 7/2009 |
| WO | 2010085944 | A1 | | 8/2010 |
| WO | 2011155020 | A1 | | 12/2011 |
| WO | 2011159182 | A1 | | 12/2011 |
| WO | 2015157883 | A1 | | 10/2015 |
| WO | 2017021955 | A1 | | 2/2017 |

OTHER PUBLICATIONS

CNIPA, Office Action, CN Patent Application 202110393178.7, mailed Jun. 24, 2022, 8 pages.
Communication to USPTO for U.S. Appl. No. 14/262,563 on Oct. 29, 2015, 28 pages.
EPO, Extended European Search Report, EP 15785769.9, mailed Jan. 17, 2017, 8 pages.
EPO, European Search Report, EP 15874400, mailed Jun. 30, 2017, 9 pages.
European Patent Office, Communication pursuant to Article 94(3) EPC, EP Patent Application 19198007.7, mailed Mar. 14, 2022, 13 pages.
European Patent Office, Summons to Oral Proceedings, EP Patent Application No. 15874400.3, mailed Apr. 13, 2022, 17 pages.
Exhibit A. Invitation Relating to Certain Parts of the International Application that are, or Appear to be, Missing, indicating that the original filing was missing Figures 9-11. Dated Mar. 20, 2014 for PCT/CN2014/073143, 3 pages.
Exhibit B. Letter—Replacement sheet with missing figures on Apr. 17, 2014, 7 pages.
Exhibit C. Notification Concerning Later Submitted Parts of an International Application. Dated May 28, 2014 for PCT/CN2014/073143, 2 pages.
Flite Test—Blade 350QX Quadcopter—Review. Published Mar. 17, 2014, 3 pages. <www.youtube.com/watch?v=F9YTVrxKRdU>.
Newman. Here's How to Set Up a No-Fly Drone Zone Over Your House. Feb. 10, 2015, 5 pages. <www.slate.com/blogs/future_tense/2015/02/10/noflyzone_org_lets_you_geofence_the_area_over_your_house_for_drones_to_avoid.html.>.
NoFlyZone web site. Accessed Nov. 11, 2015, 3 pages. <www.noflyzone.org>.
Response to Feb. 7, 2022 Non-Final Office Action in U.S. Appl. No. 16/942,096 filed with the U.S. Patent Office on Jun. 1, 2022, 13 pages.
Response to Feb. 7, 2022 Restriction Requirement in U.S. Appl. No. 17/523,847 filed with the U.S. Patent Office on Mar. 11, 2022, 10 pages.
Response to Final Office Action in U.S. Appl. No. 16/942,096 filed with the U.S. Patent Office on Aug. 25, 2022, 11 pages.
Response to Jan. 31, 2022 Non-Final Office Action in U.S. Appl. No. 17/523,859 filed with the U.S. Patent Office on Apr. 13, 2022, 20 pages.
Response to Mar. 29, 2022 Non-Final Office Action in U.S. Appl. No. 17/523,847 filed with the U.S. Patent Office on Apr. 1, 2022, 11 pages.
Response to Nov. 2, 2021 Non-Final Office Action in U.S. Appl. No. 16/810,631 filed with the U.S. Patent Office on Feb. 7, 2022, 13 pages.
Robot create owners guide. 2006. 20 pages. <www.irobot.com>.
Sudekum. Don't fly drones here. MapBox. Jul. 22, 2014, 4 pages. <www.mapbox.com/blog/dont-fly-here/>.
U.S. Appl. No. 15/369,383, filed Dec. 5, 2016, 122 pages.

(56) References Cited

OTHER PUBLICATIONS

United State Patent Office, Notice of Allowance for U.S. Appl. No. 14/815,800, mailed Feb. 21, 2017, 2 pages.
United States Patent and Trademark Office, Final Office Action, U.S. Appl. No. 16/942,096, mailed Jun. 24, 2022, 7 pages.
United States Patent and Trademark Office, Non-Final Office Action, U.S. Appl. No. 16/810,631, mailed Nov. 2, 2021, 9 pages.
United States Patent and Trademark Office, Non-Final Office Action, U.S. Appl. No. 16/942,096, mailed Feb. 7, 2022, 9 pages.
United States Patent and Trademark Office, Non-Final Office Action, U.S. Appl. No. 17/523,847, mailed Mar. 29, 2022, 11 pages.
United States Patent and Trademark Office, Non-Final Office Action, U.S. Appl. No. 17/523,859, mailed Jan. 31, 2022, 10 pages.
United States Patent and Trademark Office, Notice of Allowance, U.S. Appl. No. 16/810,631, mailed Jun. 15, 2022, 5 pages.
United States Patent and Trademark Office, Notice of Allowance, U.S. Appl. No. 16/810,631, mailed Mar. 9, 2022, 9 pages.
United States Patent and Trademark Office, Notice of Allowance, U.S. Appl. No. 16/942,096, mailed Sep. 8, 2022, 5 pages.
United States Patent and Trademark Office, Notice of Allowance, U.S. Appl. No. 17/523,847, mailed Jun. 1, 2022, 9 pages.
United States Patent and Trademark Office, Notice of Allowance, U.S. Appl. No. 17/523,859, mailed Apr. 22, 2022, 6 pages.
United States Patent and Trademark Office, Notice of Allowance, U.S. Appl. No. 17/523,859, mailed Jul. 11, 2022, 6 pages.
United States Patent and Trademark Office, Restriction Requirement, U.S. Appl. No. 17/523,847, mailed Feb. 7, 2022, 6 pages.
United States Patent Office, Communication for U.S. Appl. No. 14/262,563, mailed Oct. 29, 2015, 2 pages.
United States Patent Office, Notice of Allowance for U.S. Appl. No. 14/262,563, mailed Aug. 17, 2015, 4 pages.
United States Patent Office, Notice of Allowance for U.S. Appl. No. 14/262,563, mailed Feb. 3, 2016, 8 pages.
United States Patent Office, Notice of Allowance for U.S. Appl. No. 14/262,563, mailed Jun. 11, 2015, 9 pages.
United States Patent Office, Notice of Allowance for U.S. Appl. No. 14/262,563, mailed Nov. 18, 2015, 8 pages.
United States Patent Office, Notice of Allowance for U.S. Appl. No. 14/815,800, mailed Mar. 21, 2016, 9 pages.
United States Patent Office, Notice of Allowance for U.S. Appl. No. 14/815,800, mailed Sep. 29, 2016, 9 pages.
United States Patent Office, Notice of Allowance for U.S. Appl. No. 14/857,120, mailed Aug. 3, 2016, 8 pages.
United States Patent Office, Notice of Allowance for U.S. Appl. No. 14/857,120, mailed Mar. 29, 2016, 8 pages.
United States Patent Office, Notice of Allowance for U.S. Appl. No. 15/011,041, mailed May 9, 2017, 9 pages.
United States Patent Office, Office Action for U.S. Appl. No. 14/262,563, mailed Feb. 11, 2015, 14 pages.
United States Patent Office, Office Action for U.S. Appl. No. 14/857,120, mailed Nov. 20, 2015, 16 pages.
United States Patent Office, Office Action for U.S. Appl. No. 15/011,041, mailed Jan. 20, 2017, 10 pages.
WIPO International Preliminary Report on Patentability, PCT/CN2015/073915, mailed Aug. 24, 2016, 182 pages.
WIPO International Search Report and Written Opinion, PCT/CN2014/073143, mailed Dec. 10, 2014, 15 pages.
WIPO International Search Report and Written Opinion, PCT/CN2015/073915, mailed Apr. 17, 2015, 7 pages.
WIPO International Search Report and Written Opinion, PCT/CN2015/098149, mailed Mar. 30, 2016, 11 pages.
WIPO International Search Report and Written Opinion, PCT/US2015/011041, mailed May 1, 2015, 9 pages.
WIPO, International Search Report and Written Opinion, PCT/CN2015/075627, mailed Jan. 12, 2016, 6 pages.
English Translation of JP2007237873A.

\* cited by examiner

POLYGON SHAPED FLIGHT-RESTRICTION ZONES

CROSS-REFERENCE TO RELATED APPLICATIONS

This application is a continuation of U.S. patent application Ser. No. 17/523,847, filed Nov. 10, 2021, which is a continuation of U.S. patent application Ser. No. 16/810,631, filed Mar. 5, 2020, which is a continuation of U.S. patent application Ser. No. 15/699,359, filed on Sep. 8, 2017, which is a continuation of International Application No. PCT/CN2015/098149, filed on Dec. 21, 2015, which claims priority to International Application No. PCT/CN2015/073915, filed on Mar. 9, 2015.

BACKGROUND

Aerial vehicles such as unmanned aerial vehicles (UAVs) can be used for performing surveillance, reconnaissance, and exploration tasks for military and civilian applications. Such vehicles may carry a payload configured to perform a specific function.

It may be desirable to provide flight restriction zones in order to affect UAV behavior in certain regions. For example, it may be desirable to provide flight restriction zones near airports or important buildings. In some instances, the flight restriction zones may best be represented by shapes, such as regular or irregular polygon shapes.

SUMMARY

In some instances, it may be desirable to control or limit flight of an aerial vehicle, such as an unmanned aerial vehicle (UAV), within or near regions that are irregularly shaped. Thus, a need exists for providing improved flight restriction zones that are irregularly shaped, and for providing associated flight response measures for UAVs within or near the flight restriction zones. The flight restriction zones may be generated with flight restriction strips. The present disclosure provides systems, methods, computer readable mediums, and devices related to flight restriction strips and associated flight response measures of a UAV relative to the flight restriction strips.

Thus, in one aspect, a method for controlling an unmanned aerial vehicle (UAV) is provided. The method comprises: assessing one or more flight-restriction strips; assessing at least one of (1) a location, or (2) movement characteristic of the UAV relative to the one or more flight-restriction strips; and directing, with aid of one or more processors, the UAV to take one or more flight response measures based on at least one of the location or the movement characteristic of the UAV relative to the one or more flight-restriction strips.

In another aspect, an apparatus for controlling an unmanned aerial vehicle (UAV) is provided. The apparatus comprises one or more controllers running on one or more processors, individually or collectively configured to: assess one or more flight-restriction strips; assess at least one of (1) a location, or (2) a movement characteristic of the UAV relative to the one or more flight-restriction strips; and direct the UAV to take one or more flight response measures based on at least one of the location or movement characteristic of the UAV relative to the one or more flight-restriction strips.

In another aspect, a non-transitory computer readable medium for controlling an unmanned aerial vehicle (UAV) is provided. The non-transitory computer readable medium comprises code, logic, or instructions to: assess one or more flight-restriction strips; assess at least one of (1) a location, or (2) a movement characteristic of the UAV relative to the one or more flight-restriction strips; and direct the UAV to take one or more flight response measures based on at least one of the location or movement characteristic of the UAV relative to the one or more flight-restriction strips.

In another aspect, an unmanned aerial vehicle (UAV) is provided. The UAV comprises: one or more propulsion units configured to effect flight of the UAV; and one or more processors that direct the UAV to take one or more flight response measures in response to at least one of an assessed (1) location, or (2) movement characteristic of the UAV relative to one or more flight-restriction strips.

In another aspect, a method for supporting flight restriction is provided. The method comprises: generating, with aid of one or more processors, a flight restriction zone using one or more flight-restriction strips, wherein the one or more flight-restriction strips require the UAV to take one or more flight response measures based on at least one of an assessed (1) location, or (2) movement characteristic of the UAV relative to the one or more flight restriction strips.

In another aspect, an apparatus for supporting flight restriction is provided. The apparatus comprises one or more controllers running on one or more processors, individually or collectively, configured to: generate a flight restriction zone using one or more flight-restriction strips, wherein the one or more flight-restriction strips require the UAV to take one or more flight response measures based on at least one of an assessed (1) location, or (2) movement characteristic of the UAV relative to the one or more flight-response strips.

In another aspect, a non-transitory computer readable medium for supporting flight restriction is provided. The non-transitory computer readable medium comprises code, logic, or instructions to: generate a flight restriction zone using one or more flight-restriction strips, wherein the one or more flight-restriction strips require the UAV to take one or more flight response measures based on at least one of an assessed (1) location, or (2) movement characteristic of the UAV relative to the one or more flight-response strips.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

Figure 1:
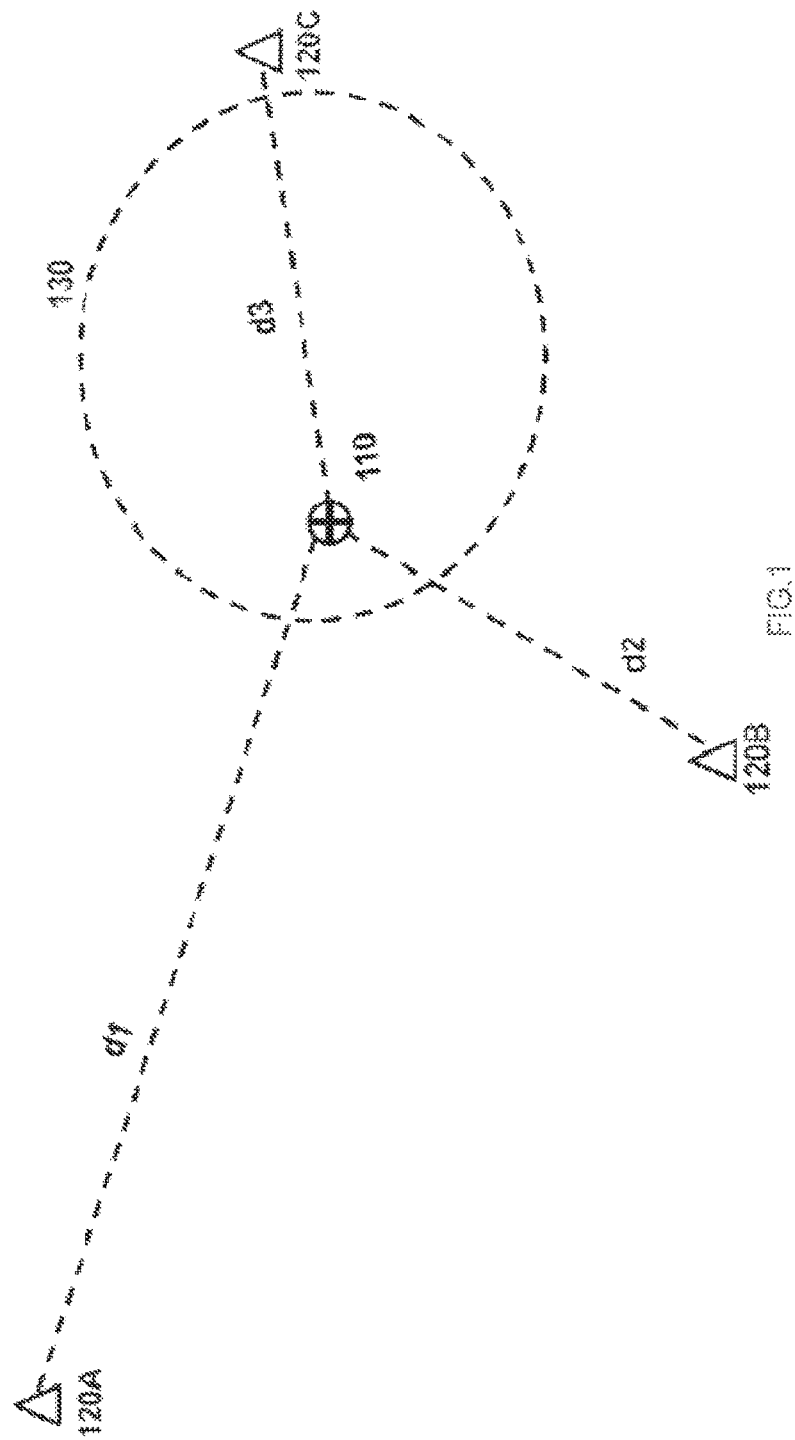
FIG. 1 provides an example of unmanned aerial vehicle locations relative to a flight-restricted region, in accordance with an embodiment of the disclosure.

The systems, methods, computer readable mediums, and devices of the present disclosure provide flight restriction strips, flight restriction zones generated by the flight restriction strips, and associated flight response measures of a UAV relative to the flight restriction strips and/or zones. The flight restriction zones as used herein may refer to any region in which it is possible to limit or affect operation of an aerial vehicle. The aerial vehicle may be an unmanned aerial vehicle (UAV), or any other type of movable object. Some jurisdictions may have one or more no-fly zones where UAVs are not permitted to fly (e.g., flight prohibited regions). For example, in the US, UAVs may not fly within certain proximities of airports. Additionally, it may be prudent to restrict flight of aerial vehicles in certain regions. For example, it may be prudent to restrict flight of aerial vehicles in large cities, across national borders, near governmental buildings, and the like.

The flight restriction zones may be provided around and/or overlap regions where restriction of flight is desired. Regions where restriction of flight is desired may also be referred to herein as flight restricted regions. The flight restriction zones may be generated and may have arbitrary shapes (e.g., circular shapes) or shapes that mimic the flight restricted regions. The regions where restriction of aerial vehicles is desired may comprise irregular shapes. For example, the flight restricted regions may best be defined by irregular polygonal shapes. Therefore, a need exists to provide flight restricted zones having irregular shapes.

In some instances, flight restricted zones having regular shapes may be provided. In some instances, the flight restricted zone may be generated or determined based on a threshold distance, or proximity, from a location of one or more flight restricted regions. For example, a location of one or more flight-restricted regions, such as airports, may be stored on-board the UAV.

Alternatively or in addition, information about the location of one or more flight-restricted regions may be accessed from a data source off-board the UAV. For example, if the Internet or another network is accessible, the UAV may obtain information regarding flight restriction regions from a server online. The one or more flight-restricted regions may be associated each with one or more flight response measures. The one or more flight response measures may be stored on-board the UAV. Alternatively or in addition, information about the one or more flight response measures may be accessed from a data source off-board the UAV. For example, if the Internet or another network is accessible, the UAV may obtain information regarding flight response measures from a server online. The location of the UAV may be determined. This may occur prior to take-off of the UAV and/or while the UAV is in flight. In some instances, the UAV may have a GPS receiver that may be used to determine the location of the UAV. In other examples, the UAV may be in communication with an external device, such as a mobile control terminal. The location of the external device may be determined and used to approximate the location of the UAV. Information about the location of one or more flight restricted regions accessed from a data source off-board the UAV may depend on, or be governed by a location of the UAV or an external device in communication with the UAV. For example, the UAV may access information on other flight-restricted regions about or within 1 mile, 2 miles, 5 miles, 10 miles, 20 miles, 50 miles, 100 miles, 200 miles, or 500 miles of the UAV. Information accessed from a data source off-board the UAV may be stored on a temporary or a permanent database. For example, information accessed from a data source off-board the UAV may add to a growing library of flight-restricted regions on board the UAV. Alternatively, only the flight restricted regions about or within 1 mile, 2 miles, 5 miles, 10 miles, 20 miles, 50 miles, 100 miles, 200 miles, or 500 miles of the UAV may be stored on a temporary database, and flight restricted regions previously within, but currently outside the aforementioned distance range (e.g., within 50 miles of the UAV) may be deleted. In some embodiments, information on all airports may be stored on-board the UAV while information on other flight-restricted regions may be accessed from a data source off-board the UAV (e.g., from an online server). The distance between the UAV and a flight-restricted region may be calculated. Based on the calculated distance, one or more flight response measures may be taken. For example, if the UAV is within a first radius of a flight-restricted region, the UAV may automatically land. If the UAV is within a second radius of the flight-restricted region, the UAV may be give an operator a time period to land, after which the UAV will automatically land. If the UAV is within a third radius of the flight-restricted region, the UAV may provide an alert to an operator of the UAV regarding the proximity of the flight-restricted region. In some instances, if the UAV is within a particular distance from the flight-restricted region, the UAV may not be able to take off.

The systems, devices, and methods herein may provide automated response of a UAV to a detected proximity to a flight-restricted region. Different actions may be taken, based on different detected distances to the restricted region, which may permit the user to take action with reduced interference when not too close, and which may provide greater interference to provide automated landing when the UAV is too close to comply with regulations and provide greater safety. The systems, devices, and methods herein may also use various systems for determining the location of the UAV to provide greater assurance that the UAV will not inadvertently fly into a flight-restricted region.

FIG. 1 provides an example of unmanned aerial vehicle locations 120A, 120B, 120C relative to a flight-restricted region 110, in accordance with an embodiment of the disclosure.

A flight-restricted region 110 may have any location. In some instances, a flight-restricted region location may be a point, or the center or location of the flight-restricted region may be designated by a point (e.g., latitude and longitude coordinates, optionally altitude coordinate). For example, a flight-restricted region location may be a point at the center of an airport, or representative of the airport or other type of flight-restricted region. In other examples, a flight-restricted region location may include an area or region. The area or region 130 may have any shape (e.g., rounded shape, rectangular shape, triangular shape, shape corresponding to one or more natural or man-made feature at the location, shape corresponding to one or more zoning rules, or any other boundaries). For example, the flight-restricted region may be the boundaries of an airport, the border between nations, other jurisdictional borders, or other type of flight-restricted region. The flight restricted regions may be defined by straight or curved lines. In some instances, the flight-restricted region may include a space. The space may be a three-dimensional space that includes latitude, longitude, and/or altitude coordinates. The three-dimensional space may include length, width, and/or height. The flight-restricted region may include space from the ground up to any altitude above the ground. This may include altitude straight up from one or more flight-restricted region on the ground. For example, for some latitudes and longitudes, all altitudes may be flight restricted. In some instances, some altitudes for particular lateral regions may be flight-restricted, while others are not. For example, for some latitudes and longitudes, some altitudes may be flight restricted while others are not. Thus, the flight-restricted region may have any number of dimensions, and measurement of dimensions, and/or may be designated by these dimension locations, or by a space, area, line, or point representative of the region.

A flight-restricted region may include one or more locations where unauthorized aerial vehicles may not fly. This may include unauthorized unmanned aerial vehicles (UAVs) or all UAVs. Flight-restricted regions may include prohibited airspace, which may refer to an area (or volume) of airspace within which flight of aircraft is not allowed, usually due to security concerns. Prohibited areas may contain airspace of defined dimensions identified by an area on the surface of the earth within which the flight of aircraft is prohibited. Such areas can be established for security or other reasons associated with the national welfare. These areas may be published in the Federal Register and are depicted on aeronautical charts in the United States, or in other publications in various jurisdictions. The flight-restricted region may include one or more of special use airspace (e.g., where limitations may be imposed on aircraft not participating in designated operations), such as restricted airspace (i.e., where entry is typically forbidden at all times from all aircraft and is not subject to clearance from the airspace's controlling body), military operations areas, warning areas, alert areas, temporary flight restriction (TFR) areas, national security areas, and controlled firing areas.

Examples of flight-restricted regions may include, but are not limited to, airports, flight corridors, military or other government facilities, locations near sensitive personnel (e.g., when the President or other leader is visiting a location), nuclear sites, research facilities, private airspace, de-militarized zones, certain jurisdictions (e.g., townships, cities, counties, states/provinces, countries, bodies of water or other natural landmarks), national borders (e.g., the border between the U.S. and Mexico), or other types of no-fly zones. A flight-restricted region may be a permanent no-fly zone or may be a temporary area where flight is prohibited. In some instances, a list of flight-restricted regions may be updated. Flight-restricted regions may vary from jurisdiction to jurisdiction. For instance, some countries may include schools as flight-restricted regions while others may not.

An aerial vehicle, such as a UAV 120A, 120B, 120C may have a location. The location of a UAV may be determined to be one or more coordinates of the UAV relative to a reference frame (e.g., underlying earth, environment). For example, the latitude and/or longitude coordinates of a UAV may be determined. Optionally, an altitude of the UAV may be determined. The location of the UAV may be determined to any degree of specificity. For example, the location of the UAV may be determined to within about 2000 meters, 1500 meters, 1200 meters, 1000 meters, 750 meters, 500 meters, 300 meters, 100 meters, 75 meters, 50 meters, 20 meters, 10 meters, 7 meters, 5 meters, 3 meters, 2 meters, 1 meter, 0.5 meters, 0.1 meters, 0.05 meters, or 0.01 meters.

A location of a UAV 120A, 120B, 120C may be determined relative to a location of flight-restricted region 110. This may include comparing coordinates representative of the location of the UAV with coordinates of a location representative of the flight-restricted region. In some embodiments, assessing relative locations between the flight-restricted region and the UAV may include calculating a distance between the flight-restricted region and the UAV. For example, if a UAV 120A is at a first location, the distance d1 between the UAV and the flight-restricted region 110 may be calculated. If the UAV 120B is at a second location, the distance d2 between the UAV and the flight-restricted region may be calculated. In another example, if the UAV 120C is at a third location, the distance d3 between the UAV and the flight-restricted region may be calculated. In some instances, only the distances between the UAV and the flight-restricted region may be located and/or calculated. In other examples, other information, such as direction or bearing between the UAV and flight-restricted region may be calculated. For example, the relative cardinal direction (e.g., north, west, south, east) between the UAV and flight-restricted region, or angular direction (e.g., angular between) between the UAV and flight-restricted region may be calculated. Relative velocities and/or acceleration between the UAV and flight-restricted region and related directions may or may not be calculated.

The distance may be calculated periodically or continuously while the UAV is in flight. The distance may be calculated in response to a detected event (e.g., receiving a GPS signal after not having received the GPS signal for a period of time prior). As the location of the UAV is updated, the distance to the flight-restricted region may also be recalculated.

The distance between a UAV 120A, 120B, 120C and a flight-restricted region 110 may be used to determine whether to take a flight response measure and/or which type of flight response measure to take. Examples of flight response measures that may be taken by a UAV may include automatically landing the UAV immediately, providing a time period for an operator of the UAV to land the UAV on a surface after which the UAV will automatically land if the operator has not already landed the UAV, provide an alert to an operator of the unmanned aerial vehicle that the unmanned aerial vehicle is near the flight-restricted region, automatically take evasive action by adjusting the flight path of the UAV, preventing the UAV from entering the flight restriction region, or any other flight response measure.

The flight response measures may be mandatory for all operators of a UAV. Alternatively flight response measures may be ignored by an authorized user, such as an authorized operator of the UAV. The authorized user may be authenticated. For example, the authorized user may be authenticated by an external device, a server, or the UAV. The external device may be a mobile device, a controller (e.g., of a UAV), and the like. For example, a user may log in to a server and verify their identity. When an operator of the UAV operates the UAV in a flight restricted region, a determination may be performed whether the user is authorized to fly the UAV in the flight restricted region. If the operator is authorized to fly the UAV operator may ignore the flight response measure that is imposed. For example, an airport staff may be an authorized user with regards to a flight restricted region at or near an airport. For example, a federal agent or officer (e.g., border patrol agent) may be an authorized user at or near a national border.

In one example, it may be determined whether the distance d1 falls within a distance threshold value. If the distance exceeds the distance threshold value, then no flight response measure may be needed and a user may be able to operate and control the UAV in a normal manner. In some instances, the user may control the flight of the UAV by providing real-time instructions to the UAV from an external device, such as a remote terminal. In other instances, the user may control flight of the UAV by providing instructions ahead of time (e.g., flight plan or path) that may be followed by the UAV. If the distance d1 falls beneath the distance threshold value, then a flight response measure may be taken. The flight response measure may affect operation of the UAV. The flight response measure may take control of the UAV away from the user, may provide a user limited time to take corrective action before taking control of the UAV away from the user, impose an altitude restriction, and/or may provide an alert or information to the UAV.

The distance may be calculated between coordinates representative of the UAV and the flight-restricted region. A flight response measure may be taken based on the calculated distance. The flight response measure may be determined by the distance without taking direction or any other information into account. Alternatively, other information, such as direction may be taken into account. In one example, a UAV at a first position 120B may be a distance d2 from the flight-restricted region. A UAV at a second position 120C may be a distance d3 from the flight-restricted region. The distance d2 and d3 may be substantially the same. However, the UAVs 120B, 120C may be at different directions relative to the flight-restricted region. In some instances, the flight response measure, if any, may be the same for the UAVs based solely on the distance and without regard to the directions. Alternatively, the directions or other conditions may be considered and different flight response measures may possibly be taken. In one example, a flight-restricted region may be provided over an area 130 or space. This area or space may include portions that are or are not equidistant from coordinates representative of the flight-restricted region 110. In some instances, if flight-restricted region extends further to the east, even if d3 is the same as d2, different flight response measures may or may not be taken. Distances may be calculated between the UAV had flight-restricted region coordinates. Alternatively, distance from the UAV to the closest boundary of the flight-restricted region may be considered.

In some examples, a single distance threshold value may be provided. Distances exceeding the distance threshold value may permit regular operation of the UAV while distance within the distance threshold value may cause a flight response measure to be taken. In other examples, multiple distance threshold values may be provided. Different flight response measures may be selected based on which distance threshold values that a UAV may fall within. Depending on the distance between the UAV and the flight-restricted region, different flight response measures may be taken.

In one example, a distance d2 may be calculated between a UAV 120B and the fight-restricted region 110. If the distance falls within a first distance threshold, a first flight response measure may be taken. If the distance falls within a second distance threshold, a second flight response measure may be taken. In some instances, if the second distance threshold may be greater than the first distance threshold. If the distance meets both distance thresholds, both the first flight response measure and the second flight response measure may be taken. Alternatively, if the distance falls within the second distance threshold but outside the first distance threshold, the second flight response measure is taken without taking the first flight response measure, and if the distance falls within the first distance threshold, the first flight response measure is taken without taking the second flight response measure. Any number of distance thresholds and/or corresponding flight response measures may be provided. For example, a third distance threshold may be provided. The third distance threshold may be greater than the first and/or second distance thresholds. A third flight response measure may be taken if the distance falls within the third distance threshold. The third flight response measure may be taken in conjunction with other flight response measures, such as the first and second flight response measures if the first and second distance thresholds are also met respectively. Alternatively, the third flight response measure may be taken without taking the first and second flight response measures.

Distance thresholds may have any value. For example, the distance thresholds may be on the order of meters, tens of meters, hundreds of meters, or thousands of meters. The distance thresholds may be about 0.05 miles, 0.1 miles, 0.25 miles, 0.5 miles, 0.75 miles, 1 mile, 1.25 miles, 1.5 miles, 1.75 miles, 2 miles, 2.25 miles, 2.5 miles, 2.75 miles, 3 miles, 3.25 miles, 3.5 miles, 3.75 miles, 4 miles, 4.25 miles, 4.5 miles, 4.75 miles, 5 miles, 5.25 miles, 5.5 miles, 5.75 miles, 6 miles, 6.25 miles, 6.5 miles, 6.75 miles, 7 miles, 7.5 miles, 8 miles, 8.5 miles, 9 miles, 9.5 miles, 10 miles, 11 miles, 12 miles, 13 miles, 14 miles, 15 miles, 17 miles, 20 miles, 25 miles, 30 miles, 40 miles, 50 miles, 75 miles, or 100 miles. The distance threshold may optionally match a regulation for a flight-restricted region (e.g., if FAA regulations did not allow a UAV to fly within X miles of an airport, the distance threshold may optionally be X miles), may be greater than the regulation for the flight-restricted region (e.g., the distance threshold may be greater than X miles), or may be less than the regulation for the flight-restricted region (e.g., the distance threshold may be less than X miles). The distance threshold may be greater than the regulation by any distance value (e.g., may be X+0.5 miles, X+1 mile, X+2 miles, etc). In other implementations, the distance threshold may be less than the regulation by any distance value (e.g., may be X−0.5 miles, X−1 mile, X−2 miles, etc.).

A UAV location may be determined while the UAV is in flight. In some instances, the UAV location may be determined while the UAV is not in flight. For instance, the UAV location may be determined while the UAV is resting on a surface. The UAV location may be assessed when the UAV is turned on, and prior to taking off from the surface. The distance between the UAV and the flight-restricted region may be assessed while the UAV is on a surface (e.g., prior to taking off/after landing). If the distance falls beneath a distance threshold value, the UAV may refuse to take off. For example, if the UAV is within 4.5 miles of an airport, the UAV may refuse to take off. In another example if the UAV is within 5 miles of an airport, the UAV may refuse to take off. Any distance threshold value, such as those described elsewhere herein may be used. In some instances, multiple distance threshold values may be provided. Depending on the distance threshold value, the UAV may have different take-off measures. For example, if the UAV falls beneath a first distance threshold, the UAV may not be able to take off. If the UAV falls within a second distance threshold, the UAV may be able to take off, but may only have a very limited period of time for flight. In another example, if the UAV falls within a second distance threshold, the UAV may be able to take off but may only be able to fly away from the flight-restricted region (e.g., increase the distance between the UAV and the flight-restricted region). In another example if the UAV falls beneath a second distance threshold or a third distance threshold, the UAV may provide an alert to the operator of the UAV that the UAV is near a flight-restricted region, while permitting the UAV to take off. In another example if a UAV falls within a distance threshold, it may be provided with a maximum altitude of flight. If the UAV is beyond the maximum altitude of flight, the UAV may be automatically brought to a lower altitude while a user may control other aspects of the UAV flight.

Figure 2:
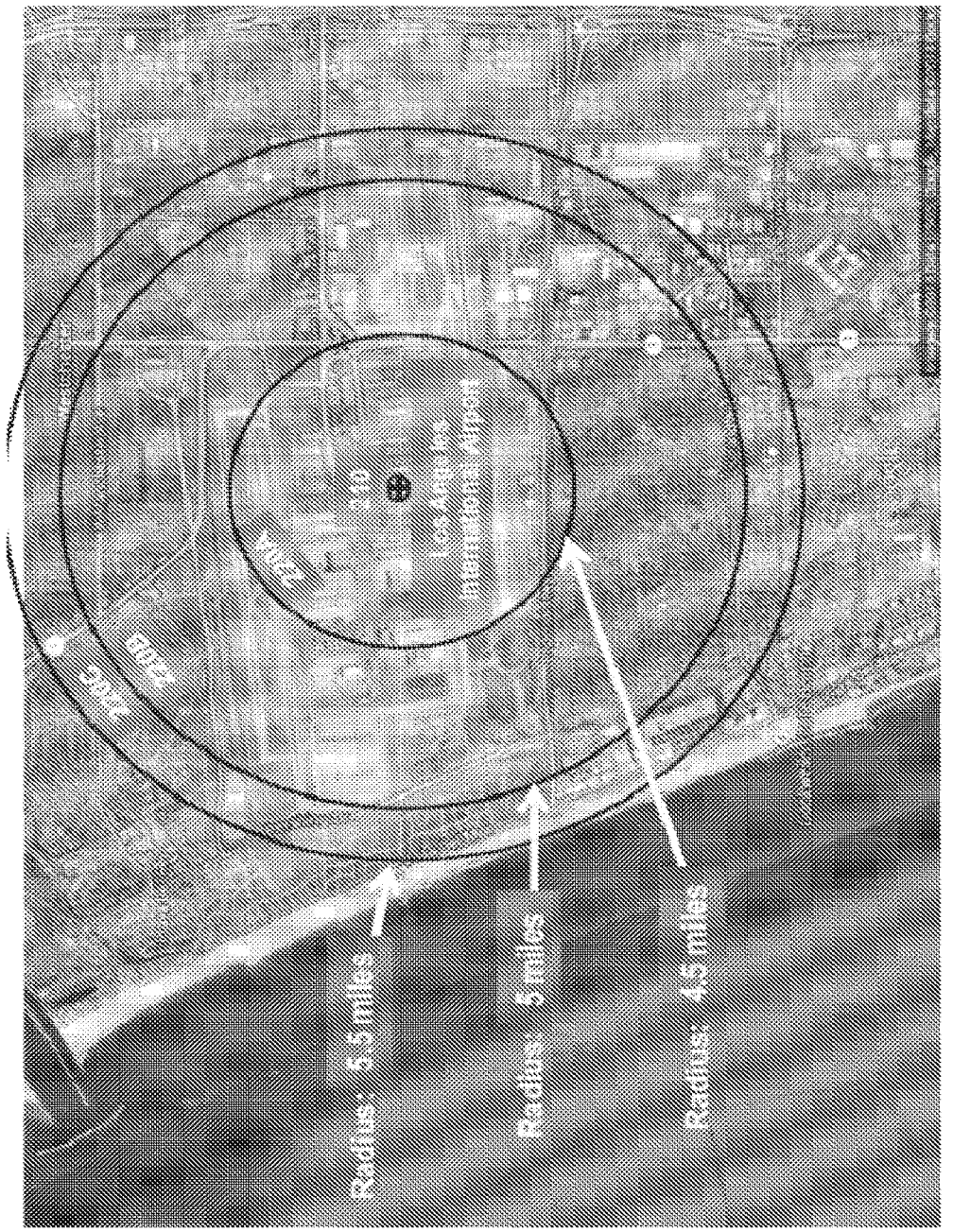
FIG. 2 shows an example of a plurality of flight-restricted region proximity zones, in accordance with an embodiment of the disclosure.

FIG. 2 shows an example of a plurality of flight-restricted region proximity zones 220A, 220B, 220C, in accordance with an embodiment of the disclosure. A flight-restricted region 210 may be provided. The location of the flight-restricted region may be represented by a set of coordinates (i.e., a point), area, or space. One or more flight-restricted proximity zones may be provided around the flight-restricted region.

In one example, the flight-restricted region 210 may be an airport. Any description herein of an airport may apply to any other type of flight-restricted region, or vice versa. A first flight-restricted proximity zone 220A may be provided, with the airport therein. In one example, the first flight-restricted proximity zone may include anything within a first radius of the airport. For example, the first flight-restricted proximity zone may include anything within 4.5 miles of the airport. The first flight-restricted proximity zone may have a substantially circular shape, including anything within the first radius of the airport. The flight-restricted proximity zone may have any shape. If a UAV is located within the first flight-restricted proximity zone, a first flight response measure may be taken. For example, if the UAV is within 4.5 miles of the airport, the UAV may automatically land. The UAV may automatically land without any input from an operator of the UAV, or may incorporate input from the operator of the UAV. The UAV may automatically start decreasing in altitude. The UAV may decrease in altitude at a predetermined rate, or may incorporate location data in determining the rate at which to land. The UAV may find a desirable spot to land, or may immediately land at any location. The UAV may or may not take input from an operator of the UAV into account when finding a location to land. The first flight response measure may be a software measure to prevent users from being able to fly near an airport. An immediate landing sequence may be automatically initiated when the UAV is in the first flight-restricted proximity zone.

A second flight-restricted proximity zone 220B may be provided around an airport. The second flight-restricted proximity zone may include anything within a second radius of the airport. The second radius may be greater than the first radius. For example, the second flight-restricted proximity zone may include anything within 5 miles of the airport. In another example, the second flight-restricted proximity zone may include anything within 5 miles of the airport and also outside the first radius (e.g., 4.5 miles) of the airport. The second flight-restricted proximity zone may have a substantially circular shape including anything within the second radius of the airport, or a substantially ring shape including anything within the second radius of the airport and outside the first radius of the airport. If a UAV is located within the second flight-restricted proximity zone, a second flight response measure may be taken. For example, if the UAV is within 5 miles of the airport and outside 4.5 miles of the airport, the UAV may prompt an operator of the UAV to land within a predetermined time period (e.g., 1 hour, 30 minutes, 14 minutes, 10 minutes, 5 minutes, 3 minutes, 2 minutes, 1 minute, 45 seconds, 30 seconds, 15 seconds, 10 seconds, or five seconds). If the UAV is not landed within the predetermined time period, the UAV may automatically land.

When the UAV is within the second flight-restricted proximity zone, the UAV may prompt the user (e.g., via mobile application, flight status indicator, audio indicator, or other indicator) to land within the predetermined time period (e.g., 1 minute). Within the time period, the operator of the UAV may provide instructions to navigate the UAV to a desired landing surface and/or provide manual landing instructions. After the predetermined time period has been exceeded, the UAV may automatically land without any input from an operator of the UAV, or may incorporate input from the operator of the UAV. The UAV may automatically start decreasing in altitude after the predetermined time period. The UAV may decrease in altitude at a predetermined rate, or may incorporate location data in determining the rate at which to land. The UAV may find a desirable spot to land, or may immediately land at any location. The UAV may or may not take input from an operator of the UAV into account when finding a location to land. The second flight response measure may be a software measure to prevent users from being able to fly near an airport. A time-delayed landing sequence may be automatically initiated when the UAV is in the second flight-restricted proximity zone. If the UAV is able to fly outside the second flight-restricted proximity zone within the designated time period, then the automated landing sequence may not come into effect and the operator may be able to resume normal flight controls of the UAV. The designated time period may act as a grace period for an operator to land the UAV or exit the area near the airport.

A third flight-restricted proximity zone 220C may be provided around an airport. The third flight-restricted proximity zone may include anything within a third radius of the airport. The third radius may be greater than the first radius and/or second radius. For example, the third flight-restricted proximity zone may include anything within 5.5 miles of the airport. In another example, the third flight-restricted proximity zone may include anything within 5.5 miles of the airport and also outside the second radius (e.g., 5 miles) of the airport. The third flight-restricted proximity zone may have a substantially circular shape including anything within the third radius of the airport, or a substantially ring shape including anything within the third radius of the airport and outside the second radius of the airport. If a UAV is located within the third flight-restricted proximity zone, a third flight response measure may be taken. For example, if the UAV is within 5.5 miles of the airport and outside 5 miles of the airport, the UAV may send an alert to an operator of the UAV. Alternatively, if the UAV is anywhere within 5.5 miles of the airport, an alert may be provided.

Any numerical value used to describe the dimension of the first, second, and/or third flight-restricted proximity zones are provided by way of example only and may be interchanged for any other distance threshold value or dimension as described elsewhere herein. While flight restricted proximity zones having a substantially circular or ring shape have been described primarily herein, flight restricted proximity zones may have any shape (e.g., shape of an airport), to which the measures described herein are equally applicable. The radius of the flight restricted proximity zones may be determined. For example, the radius may be determined based on an area of the flight restricted region. Alternatively or in conjunction, the radius may be determined based on an area of the one or more other flight restricted proximity zones. Alternatively or in conjunction, the radius may be determined based on other considerations. For example, at an airport, the second radius may be based on a minimum safe radius that encompasses the airport. For example, for a runaway of an airport, the second radius may be determined based on a length of the runway.

When the UAV is within the third flight-restricted proximity zone, the UAV may alert the user (e.g., via mobile application, flight status indicator, audio indicator, or other indicator) regarding the close proximity to the flight-restricted region. In some examples, an alert can include a visual alert, audio alert, or tactile alert via an external device. The external device may be a mobile device (e.g., tablet, smartphone, remote controller) or a stationary device (e.g., computer). In other examples the alert may be provided via the UAV itself. The alert may include a flash of light, text, image and/or video information, a beep or tone, audio voice or information, vibration, and/or other type of alert. For example, a mobile device may vibrate to indicate an alert. In another example, the UAV may flash light and/or emit a noise to indicate the alert. Such alerts may be provided in combination with other flight response measures or alone.

In one example, the location of the UAV relative to the flight-restricted region may be assessed. If the UAV falls within the first flight-restricted proximity zone, the UAV may not be able to take off. For example, if the UAV is within 4.5 miles of the flight-restricted region (e.g., airport), the UAV may not be able to take off. Information about why the UAV is not able to take off may or may not be conveyed to the user. If the UAV falls within the second flight-restricted proximity zone, the UAV may or may not be able to take off. For example, if the UAV is within 5 miles of the airport, the UAV may not be able to take off. Alternatively, the UAV may be able to take off but have restricted flight capabilities. For example, the UAV may only be able to fly away from the flight-restricted region, may only be able to fly to a particular altitude, or have a limited period of time for which the UAV may fly. If the UAV falls within the third flight-restricted proximity zone, the UAV may or may not be able to take off. For example, if the UAV is within 5.5 miles of the airport, the UAV may provide an alert to the user about the proximity to the airport. Distance, bearing, airport name, type of facility, or other information may be provided in the alert to the user. The alert may be provided to the user when the UAV is within 5.5 miles of the airport but outside 5 miles. In another example, the alert may be provided if the UAV is within 5.5 miles, and may be combined with other take-off responses or provided on its own. This may provide a safety measure that may prevent the UAV from flying in a flight-restricted region.

In some instances, flight response measures closer to a flight-restricted region may provide more rapid response by the UAV to land. This may reduce user autonomy in controlling the UAV flight but may provide greater compliance with regulations and provide greater safety measures. Flight response measures further from the flight-restricted region may permit a user to have more control over the UAV. This may provide increased user autonomy in controlling the UAV and allow the user to take action to prevent the UAV from entering restricted airspace. The distance can be used to measure risk or likelihood of the UAV falling within restricted airspace, and based on the measure of risk take an appropriate level of action.

Figure 3:
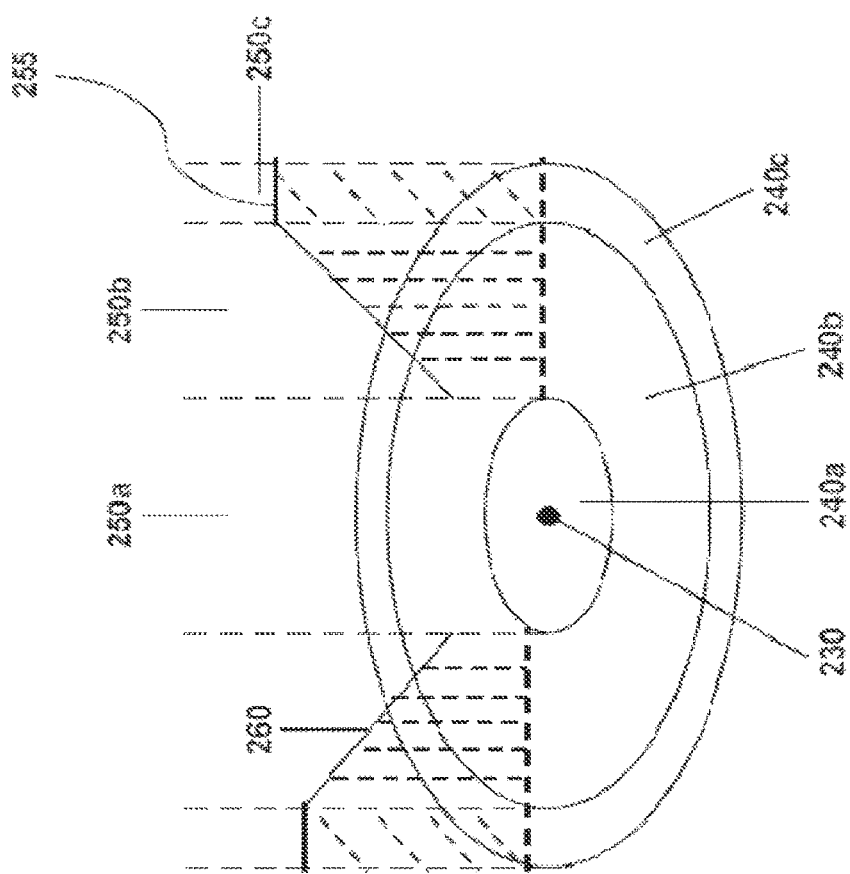
FIG. 3 provides an additional example of plurality of flight-restricted region proximity zones in accordance with an embodiment of the disclosure.

FIG. 3 provides an additional example of a plurality of flight-restricted region proximity zones 240a, 240b, 240c, in accordance with an embodiment of the disclosure. A flight-restricted region 230 may be provided. As previously described, the location of the flight-restricted region may be represented by a set of coordinates (i.e., point), area, or space. One or more flight-restricted proximity zones may be provided around the flight-restricted region.

The flight-restricted proximity zones 240a, 240b, 240c may include lateral regions around the flight restricted region 230. In some instances, the flight-restricted proximity zones may refer to spatial regions 250a, 250b, 250c that extend in the altitude direction corresponding to the lateral regions. The spatial regions may or may not have an upper and/or lower altitude limit. In some examples, a flight ceiling 260 may be provided, above which a spatial flight-restricted proximity zone 250b comes into play. Beneath the flight ceiling, a UAV may freely traverse the region.

The flight-restricted region 230 may be an airport. Optionally, the flight-restricted region may be an international airport (or Category A airport as described elsewhere herein). Any description herein of an airport may apply to any other type of flight-restricted region, or vice versa. A first flight-restricted proximity zone 240a may be provided, with the airport therein. In one example, the first flight-restricted proximity zone may include anything within a first radius of the airport. For example, the first flight-restricted proximity zone may include anything within 1.5 miles (or 2.4 km) of the airport. The first flight-restricted proximity zone may have a substantially circular shape, including anything within the first radius of the airport. The flight-restricted proximity zone may have any shape. If a UAV is located within the first flight-restricted proximity zone, a first flight response measure may be taken. For example, if the UAV is within 1.5 miles of the airport, the UAV may automatically land. The UAV may automatically land without any input from an operator of the UAV, or may incorporate input from the operator of the UAV. The UAV may automatically start decreasing in altitude. The UAV may decrease in altitude at a predetermined rate, or may incorporate location data in determining the rate at which to land. The UAV may find a desirable spot to land, or may immediately land at any location. The UAV may or may not take input from an operator of the UAV into account when finding a location to land. The first flight response measure may be a software measure to prevent users from being able to fly near an airport. An immediate landing sequence may be automatically initiated when the UAV is in the first flight-restricted proximity zone.

In some implementations the first flight-restricted proximity zone 240a may extend from a ground level upwards indefinitely, or beyond a height at which the UAV can fly. When a UAV enters any portion of a spatial region 250a above the ground, a first flight response measure may be initiated.

A second flight-restricted proximity zone 240b may be provided around an airport. The second flight-restricted proximity zone may include anything within a second radius of the airport. The second radius may be greater than the first radius. For example, the second flight-restricted proximity zone may include anything within about 2 miles, 2.5 miles, 3 miles, 4 miles, 5 miles (or 8 km), or 10 miles of the airport. In another example, the second flight-restricted proximity zone may include anything within about 2 miles, 2.5 miles, 3 miles, 4 miles, 5 miles, or 10 miles of the airport and also outside the first radius (e.g., 1.5 miles) of the airport. The second flight-restricted proximity zone may have a substantially circular shape including anything within the second radius of the airport, or a substantially ring shape including anything within the second radius of the airport and outside the first radius of the airport.

In some instances, a changing permissible altitude may be provided. For example, a flight ceiling 260 may be provided within the second flight-restricted proximity zone. If a UAV is beneath the flight ceiling, the airplane may freely fly and may be outside the second flight-restricted proximity zone. If the UAV is above the flight ceiling, the UAV may fall within the second flight-restricted proximity zone and be subjected to a second flight response. In some instances, the flight ceiling may be a slanted flight ceiling as illustrated. The slanted flight ceiling may indicate a linear relationship between a distance from the flight-restricted region 230 and the UAV. For example, if the UAV is laterally 1.5 miles away from the flight-restricted region, the flight ceiling may be at 35 feet. If the UAV is laterally 5 miles away from the flight-restricted region, the flight ceiling may be at 400 feet. The flight ceiling may increase linearly from the inner radius to the outer radius. For example, the flight ceiling may increase linearly at less than or equal to about a 5°, 10°, 15°, 30°, 45°, or 70° angle until a maximum height set by a system is reached. The flight ceiling may increase linearly at greater than or equal to about a 5°, 10°, 15°, 30°, 45°, or 70° angle until a maximum height set by a system is reached. The angle at which the flight ceiling increases at may be referred to as an angle of inclination. The flight ceiling at the inner radius may have any value, such as about 0 feet, 5 feet, 10 feet, 15 feet, 20 feet, 25 feet, 30 feet, 35 feet, 40 feet, 45 feet, 50 feet, 55 feet, 60 feet, 65 feet, 70 feet, 80 feet, 90 feet, 100 feet, 120 feet, 150 feet, 200 feet, or 300 feet. The flight ceiling at the outer radius may have any other value, such as 20 feet, 25 feet, 30 feet, 35 feet, 40 feet, 45 feet, 50 feet, 55 feet, 60 feet, 65 feet, 70 feet, 80 feet, 90 feet, 100 feet, 120 feet, 150 feet, 200 feet, 250 feet, 300 feet, 350 feet, 400 feet, 450 feet, 500 feet, 550 feet, 600 feet, 700 feet, 800 feet, 900 feet, 1000 feet, 1500 feet, or 2000 feet. In other embodiments, the flight ceiling may be a flat flight ceiling (e.g., a constant altitude value), a curved flight ceiling, or any other shape of flight ceiling.

If a UAV is located within the second flight-restricted proximity zone, a second flight response measure may be taken. For example, if the UAV is within 5 miles of the airport and outside 1.5 miles of the airport, and above the flight ceiling, the UAV may prompt an operator of the UAV to decrease altitude to beneath the flight ceiling within a predetermined time period (e.g., 1 hour, 30 minutes, 14 minutes, 10 minutes, 5 minutes, 3 minutes, 2 minutes, 1 minute, 45 seconds, 30 seconds, 15 seconds, 10 seconds, or five seconds). For example, if the UAV is within 5 miles of the airport and outside 1.5 miles of the airport, and above the flight ceiling, the UAV may automatically descend until it is below the flight ceiling, without prompting the operator. If the UAV is beneath the flight ceiling within the predetermined time period, or otherwise outside the second flight-restricted proximity zone, the UAV may operate as normal. For example, an operator of the UAV may have unrestricted control with regards to the UAV as long as the UAV is below the flight ceiling.

When the UAV is within the second flight-restricted proximity zone, the UAV may automatically decrease in altitude at a predetermined rate, or may incorporate location data in determining the rate at which to decrease altitude. The UAV may decrease altitude while continuing on its trajectory and/or incorporating commands from an operator regarding lateral movements of the UAV. Additionally, the UAV may incorporate commands from an operator regarding downward movement of the UAV (e.g., hastening the descent of the UAV). The UAV may or may not take input from an operator of the UAV into account when decreasing altitude.

When the UAV is within the second flight-restricted proximity zone, the UAV may prompt the user (e.g., via mobile application, flight status indicator, audio indicator, or other indicator) to land within the predetermined time period (e.g., 1 minute) or to decrease altitude to beneath the flight ceiling within the predetermined time period. Within the time period, the operator of the UAV may provide instructions to navigate the UAV to a desired landing surface and/or provide manual landing instructions, or may decrease the altitude of the UAV to beneath the flight ceiling. After the predetermined time period has been exceeded, the UAV may automatically land without any input from an operator of the UAV, may automatically decrease altitude to beneath the flight ceiling without any input from an operator, or may incorporate input from the operator of the UAV. The UAV may automatically start decreasing in altitude after the predetermined time period, substantially as described herein.

The second flight response measure may be a software measure to prevent users from being able to fly near an airport. A time-delayed landing sequence may be automatically initiated when the UAV is in the second flight-restricted proximity zone. If the UAV is able to fly outside the second flight-restricted proximity zone within the designated time period (e.g., outside the outer radius or beneath the fight ceiling), then the automated landing sequence may not come into effect and the operator may be able to resume normal flight controls of the UAV. The designated time period may act as a grace period for an operator to land the UAV or exit the area near the airport. Alternatively, no designated time period may be provided.

In some implementations the second-restricted proximity zone 240b may extend from a flight ceiling 260 upwards indefinitely, or beyond a height at which the UAV can fly. When a UAV enters any portion of a spatial region 250b above the flight ceiling, a second flight response measure may be initiated.

A third flight-restricted proximity zone 220c may be provided around an airport. The third flight-restricted proximity zone may include anything within a third radius of the airport. The third radius may be greater than the first radius and/or second radius. For example, the third flight-restricted proximity zone may include anything within about 330 feet (or about 100 meters) of the second radius (about 5.06 miles of the airport). In another example, the third flight-restricted proximity zone may include anything within 5.06 miles of the airport and also outside the second radius (e.g., 5 miles) of the airport. The third flight-restricted proximity zone may have a substantially circular shape including anything within the third radius of the airport, or a substantially ring shape including anything within the third radius of the airport and outside the second radius of the airport.

In some instances, a permissible altitude may be provided as described herein (e.g., changing permissible altitude, flat flight ceiling, etc). A flat flight ceiling 255 of the third flight-restricted proximity region may be of the same altitude as the flight ceiling at an outer radius of the second flight-restricted proximity zone. If a UAV is below the flat flight ceiling 255, the UAV may freely operate and may be outside the third flight-restricted proximity zone. If the UAV is above the flat flight ceiling 255, the UAV may fall within the third flight-restricted proximity zone and subject to a third flight-response.

If a UAV is located within the third flight-restricted proximity zone, a third flight response measure may be taken. For example, if the UAV is within 5.06 miles of the airport and outside 5 miles of the airport, the UAV may send an alert to an operator of the UAV. Alternatively, if the UAV is anywhere within 5.06 miles of the airport, an alert may be provided. In some embodiments, if the UAV is beneath the flight ceiling within the predetermined time period, or otherwise outside the second flight-restricted proximity zone, the UAV may operate as normal. For example, an operator of the UAV may have unrestricted control with regards to the UAV as long as the UAV is below the flight ceiling. In some embodiments, if the UAV is above the flight ceiling, the flight response measure may be to automatically descend the UAV until it is within a permissible altitude.

In some implementations the third flight-restricted proximity zone 240c may extend from a ground level upwards indefinitely, or beyond a height at which the UAV can fly. When a UAV enters any portion of a spatial region 250c above the ground, a third flight response measure may be initiated.

Any numerical value used to describe the dimension of the first, second, and/or third flight-restricted proximity zones are provided by way of example only and may be interchanged for any other distance threshold value or dimension as described elsewhere herein. Similarly, flight ceilings may be located in none, one, two, or all three flight-restricted proximity zones and may have any altitude value or configuration as described elsewhere herein.

When the UAV is within the third flight-restricted proximity zone, the UAV may alert the user via any method described elsewhere herein. Such alerts may be provided in combination with other flight response measures or alone.

In one example, the location of the UAV relative to the flight-restricted region may be assessed. If the UAV falls within the first flight-restricted proximity zone, the UAV may not be able to take off. For example, if the UAV is within 1.5 miles of the flight-restricted region (e.g., airport), the UAV may not be able to take off. Information about why the UAV is not able to take off may or may not be conveyed to the user. If the UAV falls within the second flight-restricted proximity zone, the UAV may or may not be able to take off. For example, if the UAV is within 5 miles of the airport, the UAV may be able to take off and fly freely beneath the flight ceiling. Alternatively, the UAV may be able to take off but have restricted flight capabilities. For example, the UAV may only be able to fly away from the flight-restricted region, may only be able to fly to a particular altitude, or have a limited period of time for which the UAV may fly. If the UAV falls within the third flight-restricted proximity zone, the UAV may or may not be able to take off. For example, if the UAV is within 5.06 miles of the airport, the UAV may provide an alert to the user about the proximity to the airport. Distance, bearing, airport name, type of facility, or other information may be provided in the alert to the user. The alert may be provided to the user when the UAV is within 5.06 miles of the airport but outside 5 miles. In another example, the alert may be provided if the UAV is within 5.06 miles, and may be combined with other take-off responses or provided on its own. This may provide a safety measure that may prevent the UAV from flying in a flight-restricted region.

Figure 7:
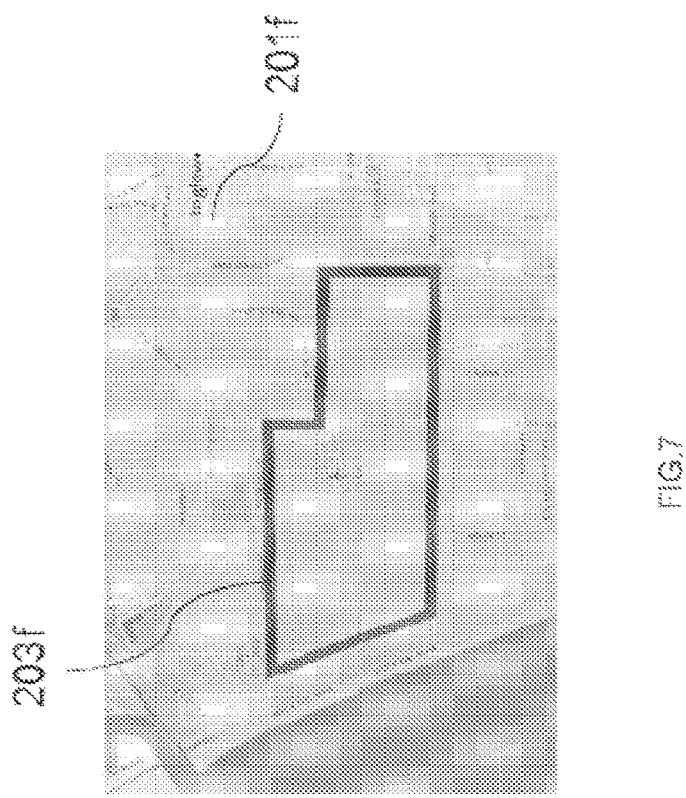
FIG. 7 provides an example of a flight restricted region of a regular shape around a region of irregular shape, in accordance with embodiments.

FIG. 7 provides an example of a flight restriction zone of a regular shape 201f around a region of irregular shape 203f, in accordance with embodiments. Region of irregular shape 203f may represent the outer perimeter of an airport wherein encroachment by a UAV may be undesirable or even dangerous. The region of regular shape 201f may represent a flight restricted proximity zone that may be set up to prevent encroachment of the UAV onto the airport. The flight restricted proximity zone may be a first flight-restricted proximity zone, as described herein. For example, a software response measure may prevent a UAV from entering the first flight-restricted proximity zone, regardless of altitude. If the UAV falls within the flight restricted region 201f, the UAV may automatically land and not be able to take off.

Figure 8:
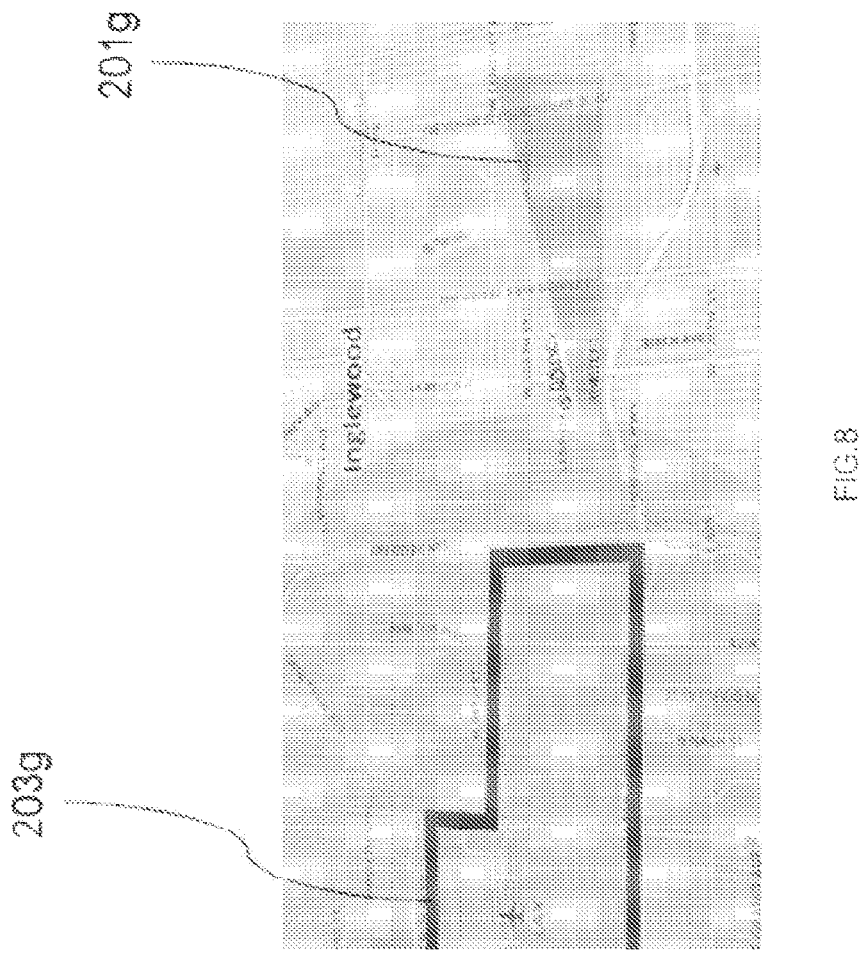
FIG. 8 provides an oblique view of a flight ceiling, in accordance with embodiments.

FIG. 8 provides an oblique view of a flight ceiling 201g, in accordance with embodiments. The flight ceiling 201g may represent a second flight-restricted proximity zone near an airport 203g with a changing permissible altitude (e.g., linearly increasing permissible altitude), substantially as described herein.

Figure 9:
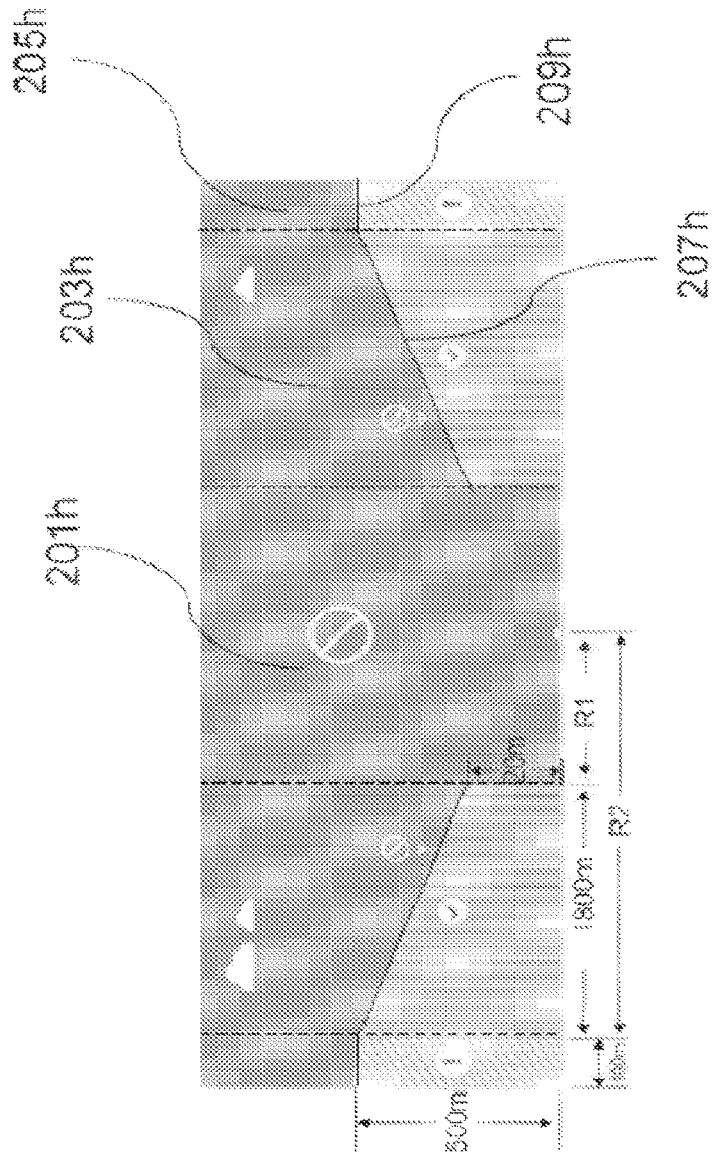
FIG. 9 provides a side view of a flight restricted region, in accordance with embodiments.

FIG. 9 provides a side view of a flight restriction zone, in accordance with embodiments. Region 201h may represent a first flight-restricted proximity zone, Region 203h may represent a second flight-restricted proximity zone, and Region 205h may represent a third flight-restricted proximity zone, substantially as described herein. For instance, a UAV may not be permitted to fly anywhere within the first flight-restricted proximity zone 201h. If the UAV falls within the first-flight restricted proximity zone, it may automatically land and be unable to take off. A UAV may not be permitted to fly anywhere above a slanted flight ceiling 207h into a second flight-restricted proximity zone 203h. The UAV may be permitted to fly freely below the slanted flight ceiling and may automatically descend to comply with the slanted flight ceiling while moving laterally. A UAV may not be permitted to fly above a flat flight ceiling 209h into a third flight-restricted proximity zone 205h. The UAV may be permitted to fly freely below the flat flight ceiling and if within a third flight-restricted proximity zone, the UAV may automatically descend until it is below the flat flight ceiling. In some embodiments, the UAV may receive an alert or a warning while operating in the third flight-restricted proximity zone.

Figure 4:
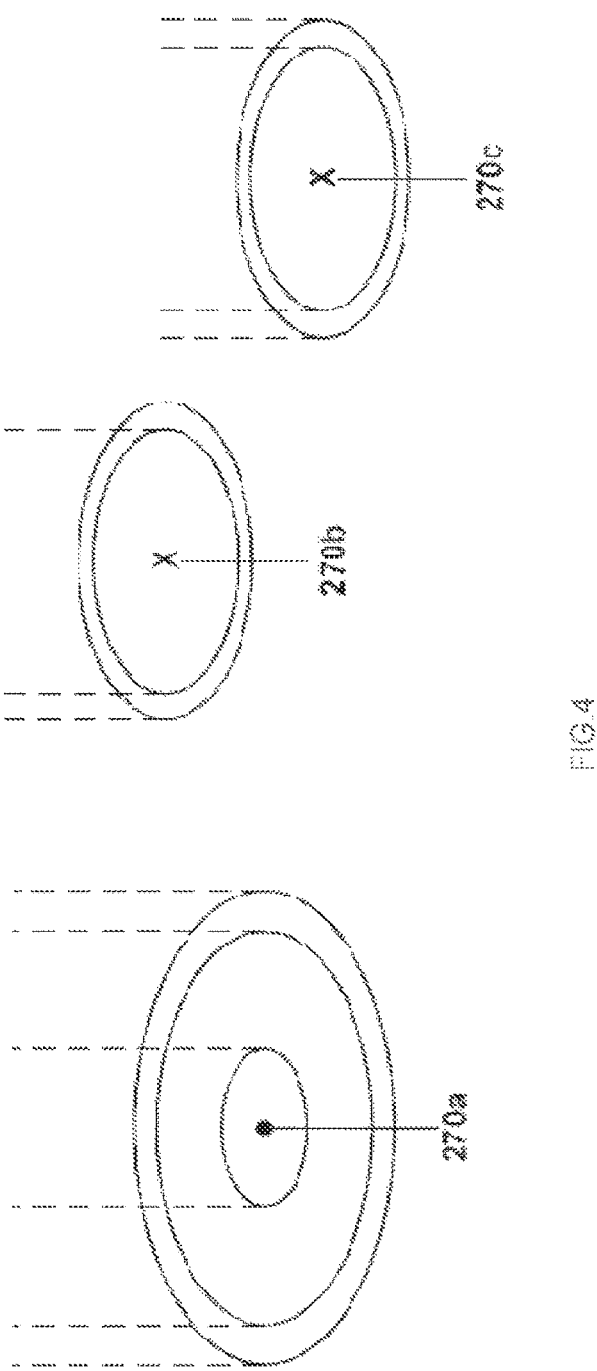
FIG. 4 provides an example of a plurality of types of flight-restricted regions and their related proximity zones, in accordance with an embodiment of the disclosure.

FIG. 4 provides an example of a plurality of types of flight-restricted regions and their related proximity zones, in accordance with an embodiment of the disclosure. In some instances, multiple types of flight-restricted regions may be provided. The multiple types of flight-restricted regions may include different categories of flight-restricted regions. In some instances, one or more, two or more, three or more, four or more, five or more, six or more, seven or more, eight or more, nine or more, ten or more, twelve or more fifteen or more, twenty or more, thirty or more, forty or more, fifty or more, or one hundred or more different categories of flight-restricted regions may be provided.

In one example, a first category of flight-restricted regions (Category A) may include larger international airports. A second category of flight-restricted regions (Category B) may include smaller domestic airports. In some instances, classification between Category A and Category B flight-restricted regions may occur with aid of a governing body or regulatory authority. For example, a regulatory authority, such as the Federal Aviation Administration (FAA) may define different categories of flight-restricted regions. Any division between to the two categories of airports may be provided.

For example, Category A may include airports having 3 or more, 4 or more, 5 or more, 6 or more, 7 or more, 8 or more, 9 or more, 10 or more, 12 or more, 15 or more, 17 or more, or 20 or more runways. Category B may include airports having one, two or less, 3 or less, 4 or less, or 5 or less runways.

Category A may include airports having at least one runway having a length of 5,000 feet or more, 6,000 feet or more, 7,000 feet or more, 8,000 feet or more, 9,000 feet or more, 10,000 feet or more, 11,000 feet or more, 12,000 feet or more, 13,000 feet or more, 14,000 feet or more, 15,000 feet or more, 16,000 feet or more, 17,000 feet or more, or 18,000 feet or more. Category B may include airports that do not have a runway having any of the lengths described herein. In some instances, In another example, Category A may include airports having one or more, two or more, three or more, four or more, five or more, six or more, seven or more, eight or more, 10 or more, 12 or more, 15 or more, 20 or more, 30 or more, 40 or more, or 50 or more gates for receiving aircraft. Category B may have no gates, or may have one or less, two or less, three or less, four or less, five or less, or six or less gates for receiving aircraft.

Optionally, Category A may include airports capable of receiving planes capable of holding 10 or more individuals, 12 or more individuals, 16 or more individuals, 20 or more individuals, 30 or more individuals, 40 or more individuals, 50 or more individuals, 60 or more individuals, 80 or more individuals, 100 or more individuals, 150 or more individuals, 200 or more individuals, 250 or more individuals, 300 or more individuals, 350 or more individuals, or 400 or more individuals. Category B may include airports not capable of receiving planes capable of holding one or more number of individuals as described herein. For example, Category B may include airports not capable of receiving planes configured to hold 10 or more individuals, 12 or more individuals, 16 or more individuals, 20 or more individuals, 30 or more individuals, 40 or more individuals, 50 or more individuals, 60 or more individuals, 80 or more individuals, 100 or more individuals, 150 or more individuals, 200 or more individuals, 250 or more individuals, 300 or more individuals, 350 or more individuals, or 400 or more individuals.

In another example, Category A may include airports capable of receiving planes capable of traveling 100 or more miles, 200 or more miles, 300 or more miles, 400 or more miles, 500 or more miles, 600 or more miles, 800 or more miles, 1000 or more miles, 1200 or more miles, 1500 or more miles, 2000 or more miles, 3000 or more miles, 4000 or more miles, 5000 or more miles, 6,000 or more miles, 7000 or more miles, or 10,000 or more miles without stopping. Category B may include airports not capable of receiving planes capable of traveling the number of miles without stopping as described herein. For example, Category B may include airports not capable of receiving planes capable of traveling 100 or more miles, 200 or more miles, 300 or more miles, 400 or more miles, 500 or more miles, 600 or more miles, 800 or more miles, 1000 or more miles, 1200 or more miles, 1500 or more miles, 2000 or more miles, 3000 or more miles, 4000 or more miles, 5000 or more miles, 6,000 or more miles, 7000 or more miles, or 10,000 or more miles without stopping.

In another example, Category A may include airports capable of receiving planes weighing more than about 200,000 pounds, 250,000 pounds, 300,000 pounds, 350,000 pounds, 400,000 pounds, 450,000 pounds, 500,000 pounds, 550,000 pounds, 600,000 pounds, 650,000 pounds, 700,000 pounds. Category B may include airports not capable of receiving planes with weights as described herein. For example, Category B may include airports not capable of receiving planes weighing more than about 200,000 pounds, 250,000 pounds, 300,000 pounds, 350,000 pounds, 400,000 pounds, 450,000 pounds, 500,000 pounds, 550,000 pounds, 600,000 pounds, 650,000 pounds, 700,000 pounds.

In some implementations, Category A may include airports capable of receiving planes longer than about 3,000 feet, 4,000 feet, 5,000 feet, 6,000 feet, 7,000 feet, 8,000 feet, 9,000 feet, 10,000 feet, or 12,000 feet in length. Category B may include airports not capable of receiving planes with lengths as described herein. For example, Category B may include airports not capable of receiving planes longer than about 3,000 feet, 4,000 feet, 5,000 feet, 6,000 feet, 7,000 feet, 8,000 feet, 9,000 feet, 10,000 feet, or 12,000 feet in length.

Different flight rules or restrictions may apply for each category of flight-restricted region. In one example, Category A locations may have stronger flight restrictions than Category B locations. For example, Category A may have a larger flight-restricted region than Category B. Category A may require more rapid response by a UAV than Category B. For instance, Category A may automatically start causing a UAV to land at a farther distance from the Category A location than Category B would require.

One or more Category A flight restricted region 270a may be provided, and one or more Category B flight restricted regions 270b, 270c may be provided. Different flight rules may be provided for each category. The flight rules within the same category may be the same.

Category A locations may impose flight restriction rules, such as those described elsewhere herein. In one example, Category A may impose flight restriction rules such as those illustrated in FIG. 3. A UAV may not be able to take off within a first flight-restricted proximity zone. The UAV may be able to freely fly beneath a flight ceiling of a second flight-restricted proximity zone. If the UAV is above the flight ceiling and within the second flight-restricted proximity zone, the UAV may be forced to descent to beneath the flight ceiling. An alert may be provided if the UAV is within a third flight-restricted proximity zone.

Category B locations may impose different flight restriction rules from Category A.

Examples of flight restriction rules for Category B may include those described elsewhere herein.

In some instances, for Category B locations, a first flight-restricted proximity zone may be provided, with the category B location 270b, 270c located therein. In one example, the first flight-restricted proximity zone may include anything within a first radius of the airport. For example, the first flight-restricted proximity zone may include anything within 0.6 miles (or about 1 km) of the airport. The first flight-restricted proximity zone may have a substantially circular shape, including anything within the first radius of the airport. The flight-restricted proximity zone may have any shape. If a UAV is located within the first flight-restricted proximity zone, a first flight response measure may be taken. For example, if the UAV is within 0.6 miles of the airport, the UAV may automatically land. The UAV may automatically land without any input from an operator of the UAV, or may incorporate input from the operator of the UAV. The UAV may automatically start decreasing in altitude. The UAV may decrease in altitude at a predetermined rate, or may incorporate location data in determining the rate at which to land. The UAV may find a desirable spot to land, or may immediately land at any location. The UAV may or may not take input from an operator of the UAV into account when finding a location to land. The first flight response measure may be a software measure to prevent users from being able to fly near an airport. An immediate landing sequence may be automatically initiated when the UAV is in the first flight-restricted proximity zone. The UAV may not be able to take off if within the first flight-restricted proximity zone.

A second flight-restricted proximity zone may be provided around an airport. The second flight-restricted proximity zone may include anything within a second radius of the airport. The second radius may be greater than the first radius. For example, the second flight-restricted proximity zone may include anything within 1.2 miles (or about 2 km) of the airport. In another example, the second flight-restricted proximity zone may include anything within 1.2 miles of the airport and also outside the first radius (e.g., 0.6 miles) of the airport. The second flight-restricted proximity zone may have a substantially circular shape including anything within the second radius of the airport, or a substantially ring shape including anything within the second radius of the airport and outside the first radius of the airport.

If the UAV is located within the second flight-restricted proximity zone, a second flight response measure may be taken. For example, if the UAV is within 1.2 miles of the airport and outside 0.6 miles of the airport (i.e., if the UAV is within about 0.6 miles or 1 km of the first radius), the UAV may send an alert to an operator of the UAV. Alternatively, if the UAV is anywhere within 1.2 miles of the airport, an alert may be provided. When the UAV is within the second flight-restricted proximity zone, the UAV may alert the user via any method described elsewhere herein. Such alerts may be provided in combination with other flight response measures or alone. A UAV may be able to take off from a second flight-restricted proximity zone.

Any numerical value used to describe the dimension of the first, and/or second flight-restricted proximity zones are provided by way of example only and may be interchanged for any other distance threshold value or dimension as described elsewhere herein.

As previously mentioned, any number of different types of categories may be provided, having their own set of rules. Different flight response measures may be taken for different categories. The different flight response measures may be provided in accordance with different boundaries for the flight-restricted regions. The same flight response measures may be taken for the same categories. The various categories may vary in size, shape, and the like. Flight-restricted regions belonging to various categories may be located anywhere within the world. Information about such flight restricted regions and different categories may be stored in memory locally on-board the UAV. Updates to the information stored on-board the UAV may be made. Categories may be assigned or may be determined based on data or characteristics of a flight restricted region. Such information may include updates in flight-restricted regions and/or categories to which the flight-restricted regions belong. Such information may also include flight response measures for different flight-restricted regions and/or categories.

A user may set up waypoints for flight of a UAV. A UAV may be able to fly to a waypoint. The waypoints may have predefined location (e.g., coordinates). Waypoints may be a way for UAVs to navigate from one location to another or follow a path. In some instances, users may enter waypoints using a software. For example, a user may enter coordinates for way points and/or use a graphical user interface, such as a map, to designate waypoints. In some embodiments, waypoints may not be set up in flight-restricted regions, such as airports. Waypoints may not be set up within a predetermined distance threshold of a flight-restricted region. For example, waypoints may not be set up within a predetermined distance of an airport. The predetermined distance may be any distance value described elsewhere herein, such as 5 miles (or 8 km).

A waypoint may or may not be permitted outside a flight-restricted proximity zone. In some instances, a waypoint may be permitted beneath a flight ceiling within a predetermined distance of a flight-restricted region. Alternatively, a waypoint may not be permitted beneath a flight ceiling within a predetermined distance of a flight-restricted region. In some instances, a map showing information about waypoints and waypoint safety rules may be provided.

While flight restricted proximity zones having a substantially circular or ring shape have been described primarily herein, flight restricted zones may have any shape as previously mentioned, to which the measures described herein are equally applicable. It may be desirable to provide a flight restriction zone having an irregular shape in many instances. For example, a flight restriction zone having a regular shape such as a round shape or a rectangular shape may be over or under inclusive (e.g., FIG. 7).

Figure 5:
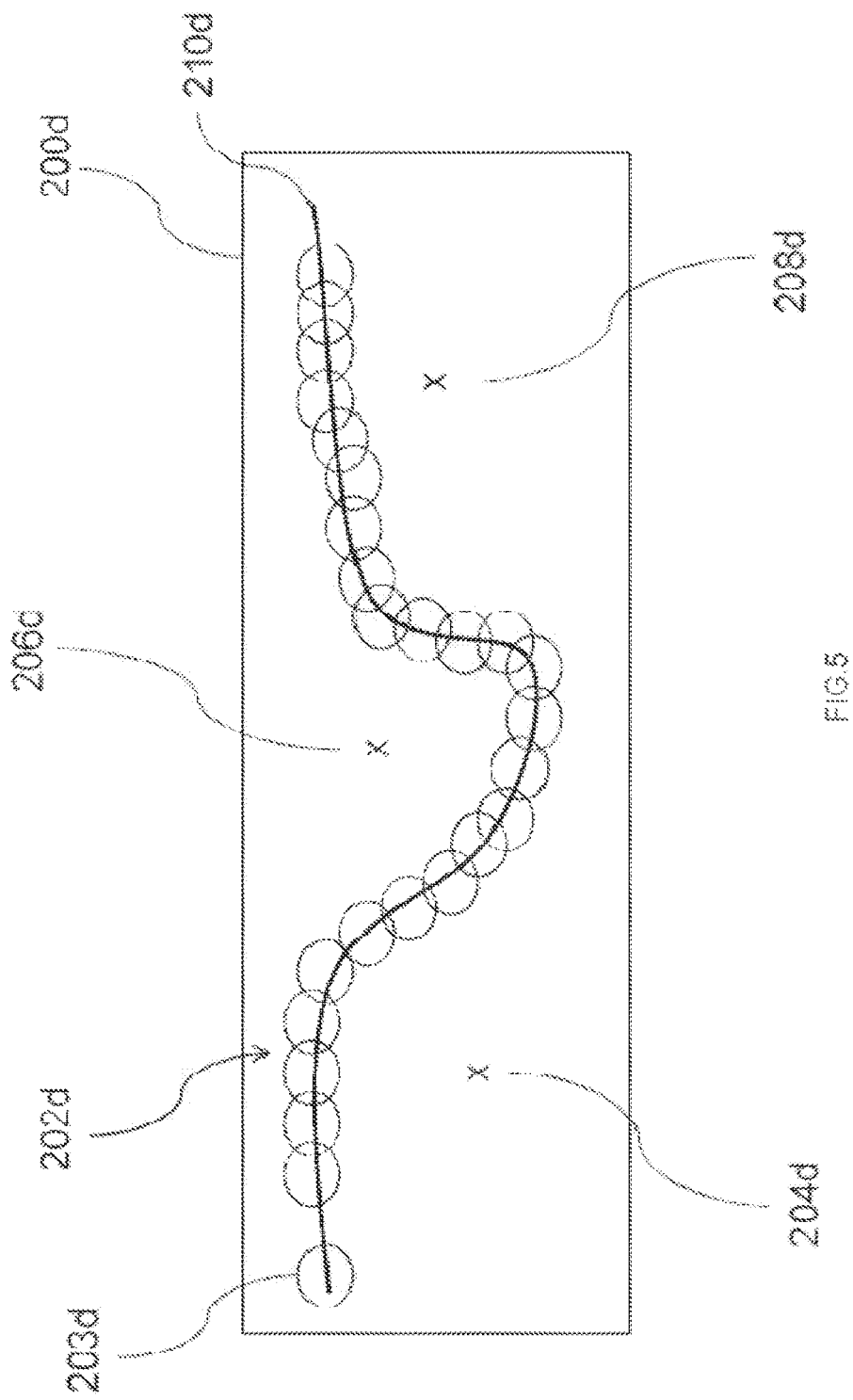
FIG. 5 provides a flight restricted region having a regular shape and an irregular shape, in accordance with an embodiment of the disclosure.

FIG. 5 provides a flight restriction zone having a regular shape 200D and an irregular shape 202d. FIG. 5 may be representative of a flight restriction zone imposed near boundaries of a region 210d (e.g., near a national border or at boundaries of an airport or boundary of an airport runway). Boundaries may be provided between any two regions. The regions may include different flight restrictions, if any. The boundary may be a closed boundary enclosing a region or an open boundary that does not enclose a region. For example, a closed boundary may be a boundary around an airport (e.g., enclosing the airport). For example, an open boundary may be a shoreline between the land and a body of water. Jurisdictional boundaries may be provided between different jurisdictions (e.g., nations, states, provinces, cities, towns, properties, etc). For example, the boundary may be between two nations, such as the United States and Mexico. For example, the boundary may be between two states such as California and Oregon. A flight restriction zone may be provided to avoid crossing a boundary (e.g., a national border) such as boundary 210d. For a flight restriction zone having a regular shape 200d to cover a boundary 210d, an area encompassing much more than the boundary may be covered, and the flight restriction zone may be over inclusive. For example, the flight restriction zone may be associated with one or more flight response measures. The flight response may be to prevent a UAV from entering the flight restriction zone. If flight is prohibited within the flight restriction zone, coordinates that should be freely navigable or accessible by the UAV such as 204d, 206d, and 208d may be inaccessible due to the flight restriction zone 200d.

In contrast, a flight restriction zone having an irregular shape may closely mimic the desired boundary and allow the UAV to have greater freedom in navigating a region. A flight restriction zone having an irregular shape may be generated by a plurality of flight restricted elements having a regular shape. The flight restricted elements may be centered at points along the boundary, wherein the points are determined as mentioned further below in the application. For example, flight restriction zone 202d is composed of a plurality of cylindrical flight restricted elements such as flight restricted element 203d. For instance, a plurality of flight restricted elements having a regular shape may overlap one another to together form a flight restriction zone having an irregular shape. This may permit tracing a boundary or filling in a region (e.g., enclosed region). The center points of the regular shapes may be along a boundary, within a boundary, or outside a boundary. The center points of the regular shapes may be spaced apart regularly or irregularly. However, the database required for storing such information and the computational power necessary to process such a plurality of flight restriction elements may be large. Alternatively, a flight restriction zone having an irregular shape may be composed of a plurality of flight restricted strips.

Figure 6:
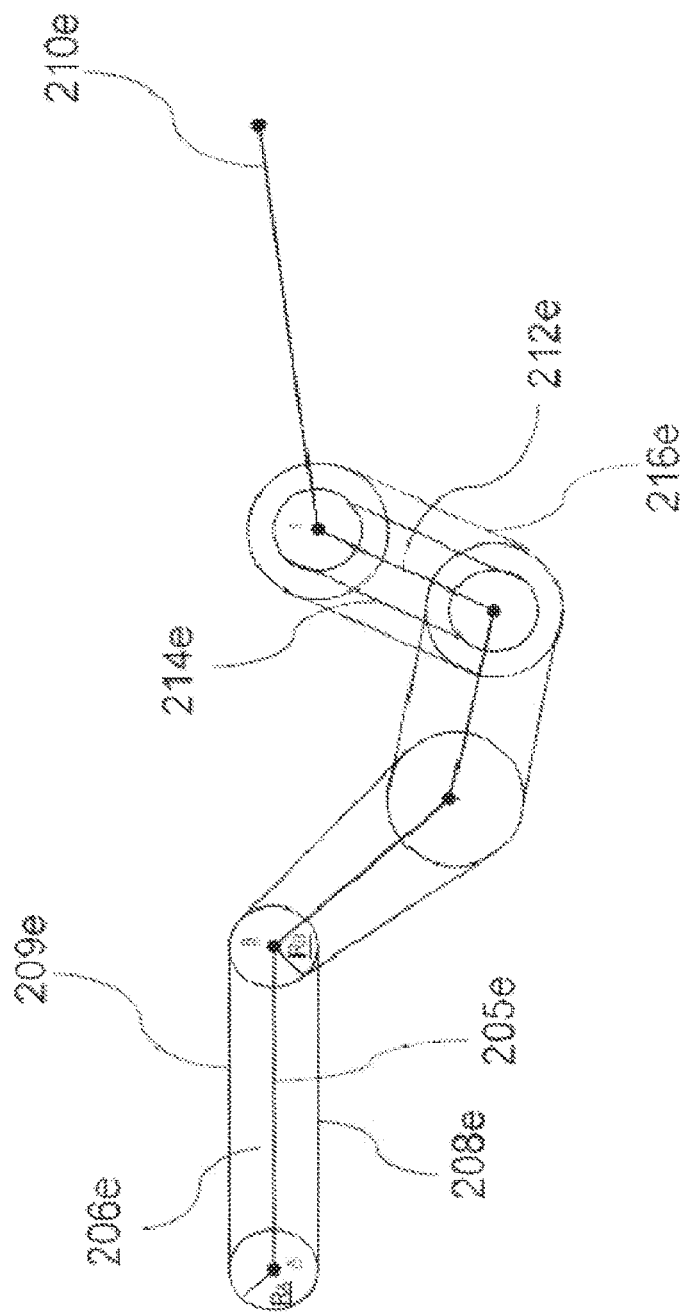
FIG. 6 provides flight restricted region defined by a plurality of flight restricted strips, in accordance with an embodiment of the disclosure.

FIG. 6 provides a flight restriction zone defined by a plurality of flight restricted strips (also referred to herein as flight restriction strips). The size or shape of the flight restriction zone may be selected based on a shape of the boundary. Data regarding a location of a boundary may be acquired using one or more processors. For example, the one or more processors may download (e.g., automatically or on command) a location or information regarding boundaries from a database, such as a third party data source. For example, a user may input data regarding the location of a boundary. In some instances, the user may be an authorized user, as described herein. Boundaries of a region may be represented as a collection of points connected by lines. The points along a boundary may be manually determined. In some instances, the points along a boundary may be manually controlled by an authorized user. The points along the boundary may be automatically determined. For example, one or more processors may select a plurality of points along the boundary. The points may be selected based on a shape of the boundary. The points along the boundary may be determined in advance or in real time. The points along the boundary may be determined based on coordinate points of the boundary (e.g., received through a local map of an environment). For example, the points along the boundary may be determined based on a change in the coordinate points (e.g., change in longitude and/or latitude) along the boundary. The points along the boundary may be equidistant from each other. The points along the boundary may be of unequal distance between each other. For example, boundary 210d of FIG. 5 may be represented as a collection of points and lines as shown in boundary 210e of FIG. 6. Boundary 210e is composed of five straight lines, each line having two end points. Each straight line of a boundary may be referred to herein as a flight restriction line. Each flight restriction line may represent a longitudinal axis of a flight restricted strip. For example, flight restriction line 205e represents a longitudinal axis of flight restricted strip 206e. A flight restricted strip may be generated from the points along the boundary that were determined using one or more processors.

The flight restricted strip may comprise a longitudinal axis and a lateral axis. The flight restricted strip may comprise a length and a width. In some instances, the length may be substantially equal to a length of the flight restriction line. In some instances, the width may be determined, e.g., by one or more processors based on parameters of the desired boundary or enclosure. Alternatively, the length may be predetermined or set based on other parameters (e.g., relevant provisions such as laws and regulations). In some instances, a flight restricted strip may comprise a length longer than a width. The length of the flight restricted strip is at least 10%, 25%, 50%, 75%, 100%, 200%, 500%, or more longer than the width of the flight restricted strip. In some instances, the flight restricted strip may be defined by a length, a width, and one or more coordinates. The one or more coordinates may comprise a center coordinate of the flight restricted strip. Alternatively or in addition, the one or more coordinates may comprise other coordinate such as end coordinates along the longitudinal axis of the flight restriction line. In some instances, the flight restricted strip may further be defined by an orientation. The orientation may be comprise an angle, e.g., with respect to a given coordinate system. The angle may be equal to less than about 5°, 10°, 15°, 30°, 45°, 60°, 75°, 90°, 120°, 150°, or 180°.

A flight restricted strip may be defined by one or more shapes, such as geometric shapes. For example, the geometric shapes may comprise circles and/or rectangles. In some instances, the geometric shapes may comprise an area encompassed by a first circle and a second circle and lines running tangent to the first circle and the second circle. In some instances, the geometric shapes may comprise any polygon or circular shapes.

One or more flight restricted strips may be used to generate and/or define a flight restriction zone as further described herein. For example, an area of the one or more flight restriction strips together may define a flight restriction zone. In some instances, the one or more flight restriction strips may enclose an area. The area enclosed by the one or more flight restriction strips may define a flight restriction zone. In some instances, an area outside of the region enclosed by the one or more flight restriction strips may define a flight restriction zone. The one or more flight restriction strips that generate or define the flight restriction zone may comprise same shapes, lengths, and/or widths. The one or more flight restriction strips that generate or define the flight restriction zone may comprise different shapes, lengths, and/or widths.

In some instances, a flight-restricted strip may be defined by two circles each with a respective radius $R_1$ and $R_2$ and each respectively centered at the two end points of the flight restriction line. The two circles may be connected by two lines running tangent to the two circles. The area encompassed by the two circles and the tangent lines may represent a flight restricted strip. For example, flight restricted strip 206e is defined by an area encompassed by a circle of radius RA centered at point A, a circle of radius $R_B$ centered at point B, and lines 208e and 209e tangent to the two circles. The two end points of the flight restriction line may be provided as a pair. Thus flight restricted strips may accurately mimic the intended boundary region and a flight restricted strip that is unintended (e.g., extending from point B to point C in FIG. 6) may not arise. While flight restricted strip 206e is defined by two circles centered at points A and B, the circular shape is not meant to be limiting and it is to be understood that any shape may be used, such as a square, trapezoid, rectangle, etc. In such a case, the flight restricted zone may be defined by the shape centered at the two ends and two lines tangent to the two shapes.

Radius $R_1$ and $R_2$ may be configurable in a database. Radius $R_1$ and $R_2$ may or may not be equal. Radius $R_1$ and $R_2$ may be set to give the flight restricted strip a width. Radius $R_1$ and $R_2$ may be set at any desired radius. The radius may depend on the type of flight restricted region under consideration. For example, for a flight restricted region having to do with a national border, the radius may be about or less than 100 km, 50 km, 25 km, 10 km, 5 km, 2 km, or 1 km. For example, for a flight restricted region having to do with boundaries of an airport, the radius may be about or less than 500 m, 200 m, 100 m, 50 m, 20 m, 10 m, or 5 m. Alternatively or in conjunction, the radius may be selected based on a shape (e.g., angularities) of the boundary itself. For example, for a twisting or looping boundary, a larger radius may be selected to cover the whole loop. Alternatively or in conjunction, the radius may be selected based on real world considerations. For example, if there is a territorial dispute between two countries, a larger radius such as 100 km may be set to ensure a broader area is covered by the flight restricted strip. Radius $R_1$ and $R_2$ may each be about or less than 50 km, 25 km, 10 km, 5 km, 2 km, 1 km, 500 m, 200 m, 100 m, 50 m, 20 m, 10 m, or 5 m. The radius may give a width or a buffer such that the UAV cannot fly too close to the flight restricted region. For example, the radius may give a width or a buffer to the flight restricted strip such that a UAV cannot fly too close to a national border or an airport. Alternatively or in conjunction, the radius may be selected depending on parameters of a UAV that interact with flight restricted strips and/or flight restriction zones. For example, the radius may be selected based on velocity, acceleration, and/or deceleration capabilities of the UAV, e.g., to ensure that the UAV will be incapable of going past a width of the flight restriction strips.

The length of a flight restricted strip (e.g., length of line 205e for flight restricted strip 206e) may depend on the type of flight restricted region under consideration. For example, for a flight restricted region having to do with a national border, the length of each flight restricted strip may be about or less than 500 km, 200 km, 100 km, 65 km, 50 km, 25 km, 10 km, 5 km, 2 km, or 1 km. For example, for a flight restricted region having to do with boundaries of an airport, the length of each flight restricted strip may be about or less than 10,000 ft, 5,000 ft, 2,000 ft, 1,000 ft, 500 ft, 200 ft, or 100 ft. Alternatively or in conjunction, the length of a flight restricted strip may be selected based on a shape of the boundary itself. For example, for a twisting or looping boundary, a smaller length may be selected to closely trace the boundary. The length of each flight restricted strip may be about or less than 500 km, 200 km, 100 km, 65 km, 50 km, 25 km, 10 km, 5 km, 2 km, 1 km, 2,000 ft, 1,000 ft, 500 ft, 200 ft, or 100 ft.

A flight restriction line may have one or more flight restricted strips associated with it. For example, FIG. 6 shows flight restriction line 212e having two flight restricted strips 214e, 216e associated with it. Each flight restriction line may have one, two, three, four, five, or more flight restricted strips associated with it. A UAV may take a different flight response measure depending on the flight restricted strip it is in, substantially as described herein. For example, a UAV may be barred from laterally moving into flight restricted strip 214e. If the UAV is within flight restricted strip 214e, a first flight response measure may be taken (e.g., automatically land). If the UAV is within flight restricted strip 216e, a second flight response may be taken (e.g. prompt an operator of the UAV to land within a predetermined time period). The flight response measure may affect operation of the UAV. The flight response measure may take control of the UAV away from the user, may provide a user limited time to take corrective action before taking control of the UAV away from the user, impose an altitude restriction, and/or may provide an alert or information to the UAV.

A flight restricted strip may be abstracted (e.g., converted) into a feature circle for storing in a database. A feature circle may be defined by a center coordinate $C_F$ and a radius $R_F$. $C_F$ may be obtained by taking a center coordinate of the flight restriction line. $R_F$ may be obtained with the equation $$R + \frac{L}{2}$$

where R equals $$\frac{R1 + R2}{2},$$

R1 is the radius of the first circle of the flight restricted strip, R2 is the radius of the second circle of the flight restricted strip, and L is the length of the flight restriction line. Thus, when R1=R2, a feature circle may be represented by a center coordinate, R, and L. The database required for storing such information and the computational power necessary to process a plurality of flight restricted strips may be small. The flight restricted strips may completely cover a boundary of a region. For example, the flight restricted strips may completely cover a border of a jurisdiction, such as the U.S.-Mexican border. The flight restriction zone (e.g., composed of a plurality of flight restricted strips) may cause a UAV to take a flight response. For example, the flight restricted region may prevent a UAV from crossing into the boundary of a region, may prevent a UAV from taking off in the boundary of a region, may force a UAV to land if it enters the flight restricted region, and the like.

In some instances, one or more flight restriction strips may define an enclosed area. The area may comprise convex portions. The area may comprise concave portions. In some instances, a polygon area may be defined by a plurality of flight restricted strips. For example, an area or a region that comprises 3, 4, 5, 6, 7, 8, 9, 10, or more vertices connected by lines may be defined by a plurality of flight restricted strips. For example a polygon area such as a triangular, rectangular, pentagonal, hexagonal, heptagonal, octagonal area may be defined by a plurality of flight restricted strips. In some instances, the number of flight restricted strips that can represent the polygon area may correspond to the number of vertices of the area. The polygon may be regular or irregular. A regular polygon may be equiangular and equilateral. An irregular polygon may not be equiangular and equilateral. The flight restriction strips as described herein may present an effective way of providing flight restriction zones around regions that can be defined by, or mimic, irregular polygon shapes.

Information regarding the one or more flight-restriction strips and/or the flight restriction zones may be stored on-board the UAV. Alternatively or in addition, information about the one or more flight-restriction strips and/or flight restriction zones may be accessed from a data source off-board the UAV. The information may comprise any information related to the flight restricted strips and/or zones. For example, the information may comprise a location of the one or more flight restriction strips or the zones. For example, the information may comprise a shape or size (e.g., length or width) of the flight restriction strips. For example, the information may comprise information regarding geometric shapes that define the one or more flight restriction trips. For example, the information may comprise a shape or size of the flight restriction zones. In some instances, if the Internet or another network is accessible, the UAV may obtain information regarding flight restriction strips and/or zones from a server online. The one or more flight-restriction strips or the flight restriction zones may be associated each with one or more flight response measures. The one or more flight response measures may be stored on-board the UAV. Alternatively or in addition, information about the one or more flight response measures may be accessed from a data source off-board the UAV. For example, if the Internet or another network is accessible, the UAV may obtain information regarding flight response measures from a server online. The location of the UAV may be determined as previously described herein. A position of the UAV relative to the one or more flight restriction strips or the flight restriction zone may be determined. Based on the positional information determined, one or more flight response measures may be taken. For example, if the UAV is within the flight restriction zone, the UAV may automatically land. If the UAV is near the flight restriction zone, the UAV may be prevented from entering the zone.

Figure 20:
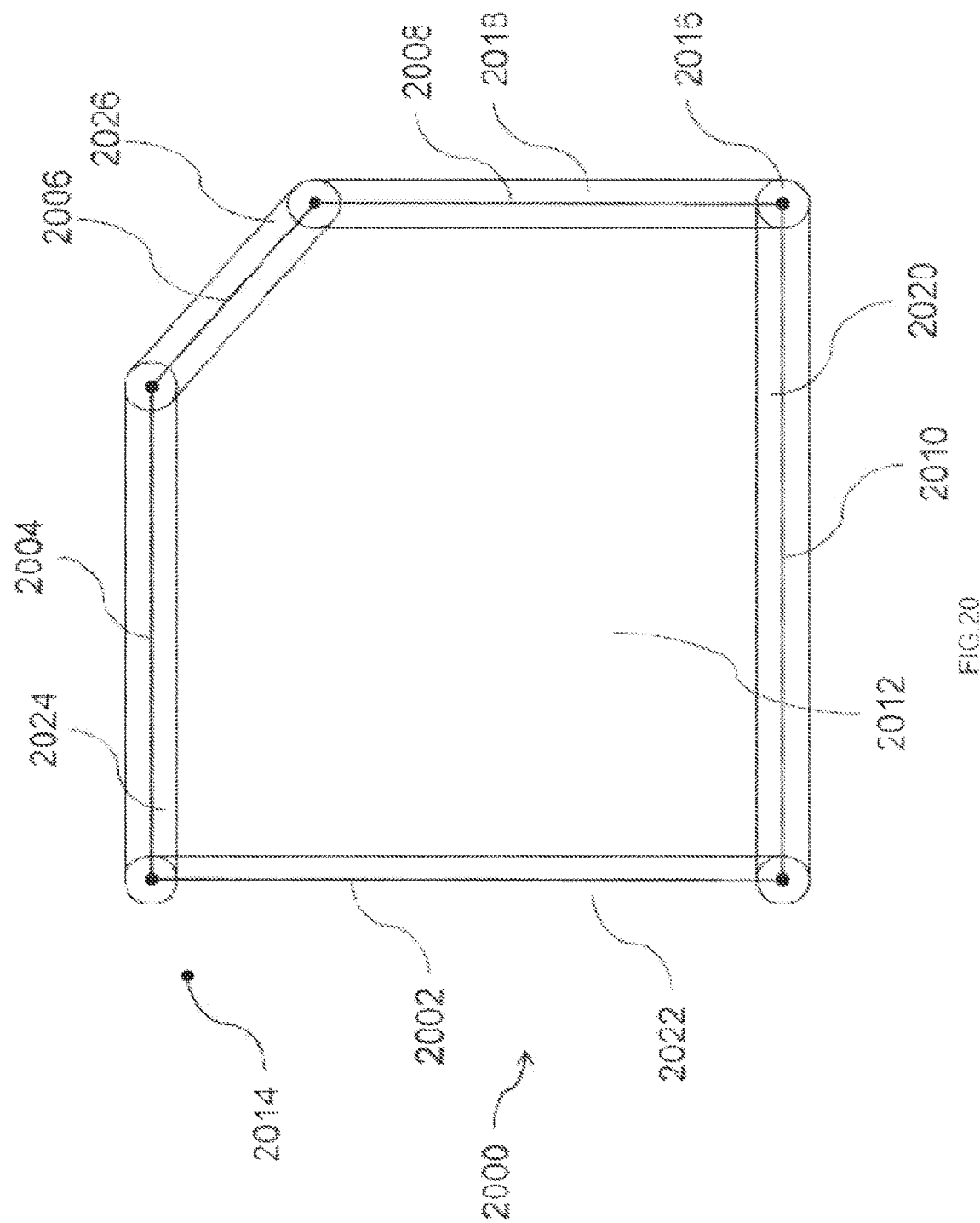
FIG. 20 illustrates an irregular polygon area defined by a plurality of flight restricted strips, in accordance with embodiments.

FIG. 20 illustrates an irregular polygon area defined by a plurality of flight restricted strips, in accordance with embodiments. In some instances, the polygon area 2000 may be defined by several flight restriction lines, e.g., flight restriction lines 2002, 2004, 2006, 2008, and 2010. The flight restriction lines may represent a boundary of a region where providing a flight restriction zone is desired, e.g., region 2012. The polygon area may be defined by any number of flight restriction lines and may comprise any shape, e.g., any polygonal shape. For example, the polygon area may be triangular, rectangular, pentagonal, hexagonal, heptagonal, or octagonal areas.

For example, in FIG. 20, the polygon area may be pentagonal region defined by five flight restriction lines 2002, 2004, 2006, 2008, and 2010. Flight restricted lines (e.g., and corresponding flight restriction strips) of the same or differing lengths may define an enclosed area (e.g., pentagon region). Each of the five flight restriction lines may comprise end points. A flight restricted strip may be provided around each of the flight restriction lines as previously described herein, e.g., by selecting, or determining a relevant radius. In some instances, flight restricted strips of differing radii or widths may be used to enclose an area. Alternatively, flight restricted strips of the same radii or widths may be used to enclose the area. Each of the flight restricted strips may be defined by same shapes (e.g., the same geometric shapes such as circles and rectangles). In some instances, the shapes defining each of the flight restricted strips may comprise an area encompassed by a first circle and a second circle and lines running tangent to the first circle and the second circle. Alternatively, each of the flight restricted strips may be defined by different shapes (e.g., one flight restricted strip may comprise circles and rectangles while another flight restricted strip may be comprised of rectangles). While a region (e.g., boundary) that can be represented by an octagon is shown for illustrative purposes, it is to be understood that any region (e.g., enclosed or open, regular or irregular) may be represented by the flight restricted strips described herein.

The flight restricted strips may enclose an area, or a region 2012. In some instances, end points of the flight restriction lines may overlap to enclose the region. Alternatively, end points of the flight restriction lines may not overlap. For example, an end point of one flight restriction line may overlap a mid-point (or any other region that is not an end point) to enclose the region. In some instances, flight restriction strips may connect together to form a loop, or overlap to enclose the region. In this case, the end points of the flight restriction lines may overlap, or may be sufficiently close without overlapping such that flight restriction strips still overlaps. In some instances, the flight strips may not overlap but may tangentially touch one another to enclose the region. In some instances, the shape of the flight restricted strips may be particular suited for forming an overlapping and/or enclosing a region. For example, a flight restricted strip comprising two circles at the end may be particularly suited for overlapping with other flight restricted strips comprising circles as the overlapping region may comprise a smooth region that is defined and/or calculated easily. For example, a flight restricted strip comprising a circle at an end may perfectly overlap with another flight restricted strip comprising a circle at an end (e.g., if ends of the flight restriction lines overlap and the width of the flight restriction strips are the same). For example, a coordinate and radius that defines one end circle of a first flight restricted strip may also define an end circle of a second flight restricted strip. For example, circle 2016 may represent a circle of a flight restricted strip 2018 but also a circle of a flight restricted strip 2020.

The flight restricted strips 2018, 2020, 2022, 2024, and 2026 together may define a flight restriction zone. An area of, or within the flight restriction strips may be associated with flight response measures, previously described herein. In some instances, each area within the flight restricted strips 2018, 2020, 2022, 2024, and 2026 enclosing the region 2012 may be associated with a same set of flight response measures. For example, each of the five flight restriction strips may be associated with flight response measures that prevent a UAV from entering the flight restriction strips. Alternatively, different flight restriction strips may be associated with different flight response measures. For example, flight restricted strips 2018, 2020, 2022, and 2024 may be associated with a flight response measures that prevent a UAV from entering the flight restriction strips while flight restriction strip 2026 may be associated with a flight response measure that sends an alert to an operator of the UAV while permitting flight within the flight restriction strip. In some instances, a UAV may be permitted to fly in regions outside of the flight restriction strips. For example, the UAV may be permitted to fly in regions 2012 and/or 2014.

In some instances, a flight restriction zone associated with flight response measures may be generated in region 2012 in association with the flight restriction strips. The flight restriction zone may be generated in region 2012 alternatively, or in addition to the flight restriction zone defined by the areas of the flight restriction strips themselves. In some instances, the area 2012 enclosed by the flight restricted strips may be associated with flight response measures. For example, whether a coordinate or position (e.g., UAV position) is within the enclosed area may be determined via graphical methods by utilizing information regarding the flight restriction strips, and a UAV may be caused to comply with flight response measures.

Only a limited number of flight restricted strips (e.g., enough to enclose an area) may be necessary to define a flight restriction zone enclosed by flight restriction strips. A limited number of flight restriction strips may be sufficient to define even large flight restriction zones. A small amount of data and/or processing capability may be necessary for calculating whether a position (e.g., UAV position) is within the enclosed region, e.g., due to use of a limited number flight restricted strips that is necessary. In some instances, defining a flight restriction zone by enclosing a region with flight restriction strips may be suitable for areas equal to or greater than about 100 m$^2$, 500 m$^2$, 1000 m$^2$, 2500 m$^2$, 5000 m$^2$, 10000 m$^2$, 20000 m$^2$, or 50000 m$^2$.

The area enclosed by the flight restricted strips may be associated with the same set of flight response measures as the surrounding flight restricted strips. For example, a UAV within region 2012 or any of the flight restriction strips may be prevented from taking off (e.g., even if not directly within a flight restricted strip). For example, a UAV that inadvertently, or through error, ends up in region 2012 or any of the flight restriction strips may be forced to land or be compelled to fly out of the region (e.g., the flight restriction zone). Alternatively, the area 2012 enclosed by the flight restriction strips may be associated with a different set of flight response measures than the flight restriction strips. For example, the flight restriction strips may be associated with a flight response measure that prevents a UAV from entering the flight restricted strips while the region enclosed by the flight restriction strips (e.g., flight restriction zone) may be associated with a flight response measure that compels a UAV to land when in the region 2012.

In some instances, a flight restriction zone associated with flight response measures may be generated in an area outside the region enclosed by the flight restricted strips. The area outside the region enclosed by the flight restricted strips may herein be referred to as an outside region. The flight restriction zone may be generated in the outside region alternatively, or in addition to the flight restriction zone defined by the areas of the flight restriction strips themselves and/or the flight restriction zone in the region enclosed by the flight restriction strips. For example, a UAV in region 2014 may be prevented from taking off. For example, a UAV that inadvertently, or through error, ends up in region 2014 may be forced to land or be compelled to fly out of the region to region 2012. In some instances, the flight restriction strips may provide an enclosed area 2012 in which the UAV is permitted to operate freely in. An area outside of the permitted area (e.g., enclosed area) may be associated with flight response measures that compel the UAV to abide by certain rules. In some instances, the area excluding the enclosed area 2012 may be associated with the same set of flight response measures as the flight restricted strips. Alternatively, the area excluding the enclosed area may be associated with a different set of flight response measures than the flight restriction strips.

Figure 21:
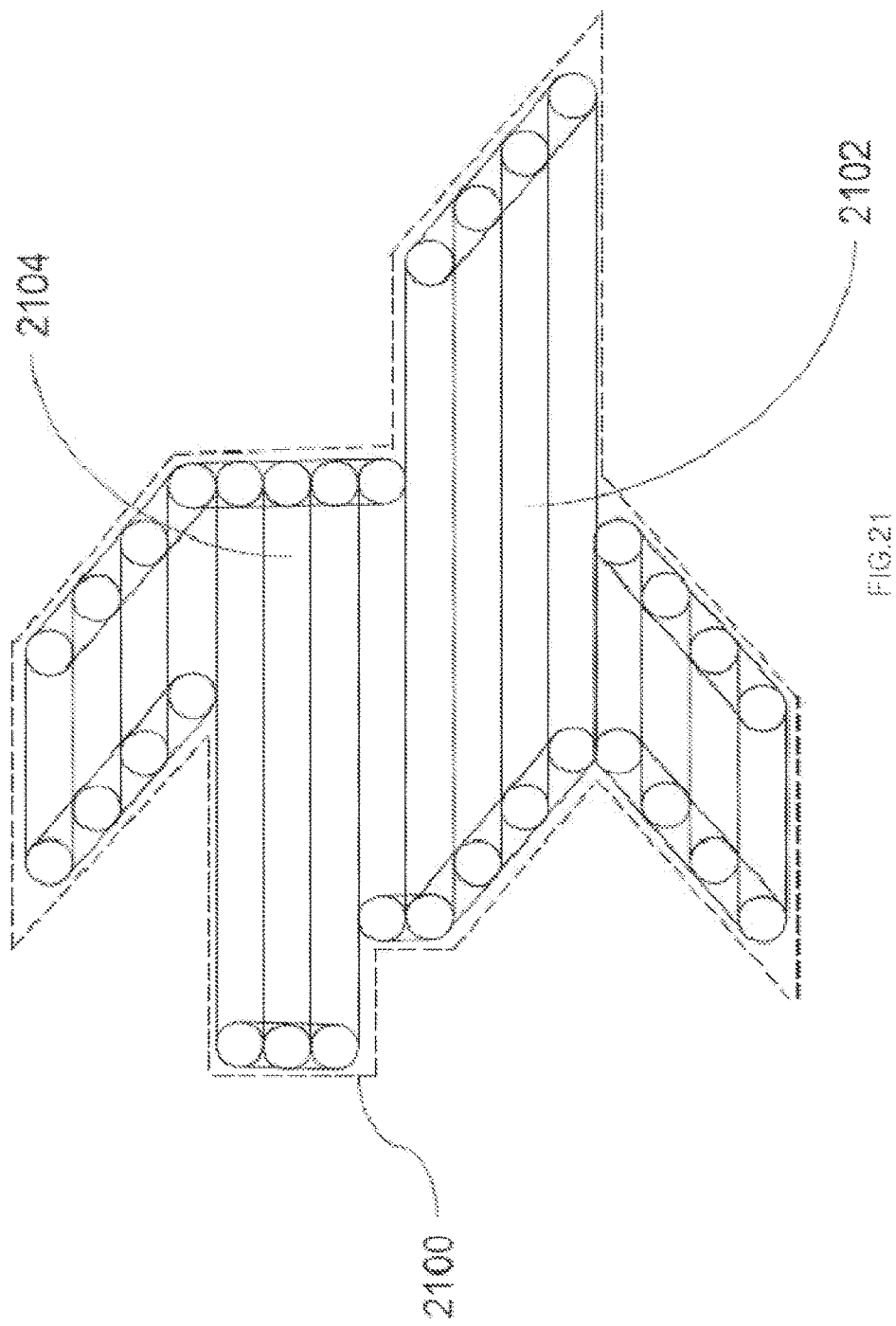
FIG. 21 illustrates a plurality of flight restricted strips that fill an irregular polygon area, in accordance with embodiments.

In some instances, a plurality of flight restricted strips may fill a region. The region may be a polygonal area (e.g., regular or irregular) as previously described herein. The region may be a region enclosed by flight restricted strips, substantially as described in FIG. 20. Alternatively, the region may not be enclosed but may nevertheless be filled by a plurality of flight restricted strips. FIG. 21 illustrates a plurality of flight restricted strips that fill an irregular polygon area, in accordance with embodiments. The irregular polygon area may have a complex shape 2100. The plurality of flight restriction strips that fill the area may define a flight restriction zone associated with flight response measures. In some instances, whether a coordinate or position (e.g., UAV position) is within the flight restriction zone may be determined via iterative or recursive methods, e.g., iteratively or recursively determining whether a current point is within any one of the plurality of flight restriction strips that fill the area.

The flight restriction strips that fill the region may be substantially non-overlapping. Alternatively, the flight restriction strips that fill the region may be overlapping. In some instances, the flight restriction strips that fill the region may be substantially parallel. Alternatively, the flight restriction strips that fill the region may not be parallel and may be perpendicular to one another, or at arbitrary angles with respect to one another. In some instances, the flight restriction strips within the region may comprise rows and/or columns of flight restriction strips.

Each of the flight restriction strips within the region may comprise a same width. In some instances, different flight restriction strips within the region may comprise different widths. For example, the widths of each of the flight restriction strips may be defined by a shape of a region or parameters of UAV. Each of the flight restriction strips within the region may comprise different lengths. For example, the lengths of each of the flight restriction strips may be defined by a shape of a region. In some instances, each of the flight restriction strips within the region may comprise a same length. Each of the flight restriction strips within the region may be defined by the same geometric shapes, e.g., circles at ends and a rectangular midsection. I some instances, different flight restriction strips within the region may be defined by different geometric shapes.

In some instances, the flight restriction strips may divide the region 2100 into a plurality of sections. In some instances, a flight restriction zone may be provided within at least one of the plurality of sections. In some instances, the flight restriction strips may form one or more sectional lines (e.g., dividing lines) in the region. The region 2100 may be divided into different sections depending on the sectional lines. For example, flight restriction strip 2102 may be an example of a sectional line. In some instances, different flight restriction zones (e.g., associated with different flight response measures) may be provided on different sides of the sectional line. In some instances, a flight restriction zone may be provided in at least one of the plurality of sections on a side of the sectional line. The flight restricted strips may completely fill a region, e.g., as shown in FIG. 21. Alternatively, there may be areas not covered by flight restriction strips within the region.

In some instances, different flight restriction strips within the region 2100 may be associated with a same set of flight response measures. Alternatively, different flight restriction strips within the region 2100 may be associated with different sets of flight response measures. For example, flight restriction strip 2104 may permit flight of the UAV while other flight restriction strips may prevent UAV flight. In some instances, the UAV may enter or exit only through select flight restriction strips within the flight restriction zone. For example, flight restriction strip 2104 may provide a single route to cross through region 2100. While permitting flight or grounding flight have been primarily discussed herein, it is to be understood that the flight restriction strips may be associated with any of the flight response measures previously discussed herein, e.g., having to do with payload operation, sending an alert, etc.

Filling a flight restriction zone may be suitable for areas that comprise a relatively complex shape. Filling a flight restriction zone may be suitable for relatively complex shaped areas because there is no need to define and enclose an area with a set number of flight restricted strips. Filling a flight restriction zone may be suitable for relatively small areas compared to simply enclosing an area, e.g., due to data storage and processing loads required. In some instances, defining a flight restriction zone by filling a region with flight restriction strips may be suitable for areas equal to or less than about 100 $m^2$, 500 $m^2$, 1000 $m^2$, 2500 $m^2$, 5000 $m^2$, 10000 $m^2$, 20000 $m^2$, or 50000 $m^2$. In some instances, defining a flight restriction zone by filling a region may depend both on a complexity of a shape of the area and the size of the area. For example, the more complex the area is, the more suitable it may be to define a flight restriction zone by filling a region, even if the area is large.

Figure 22:
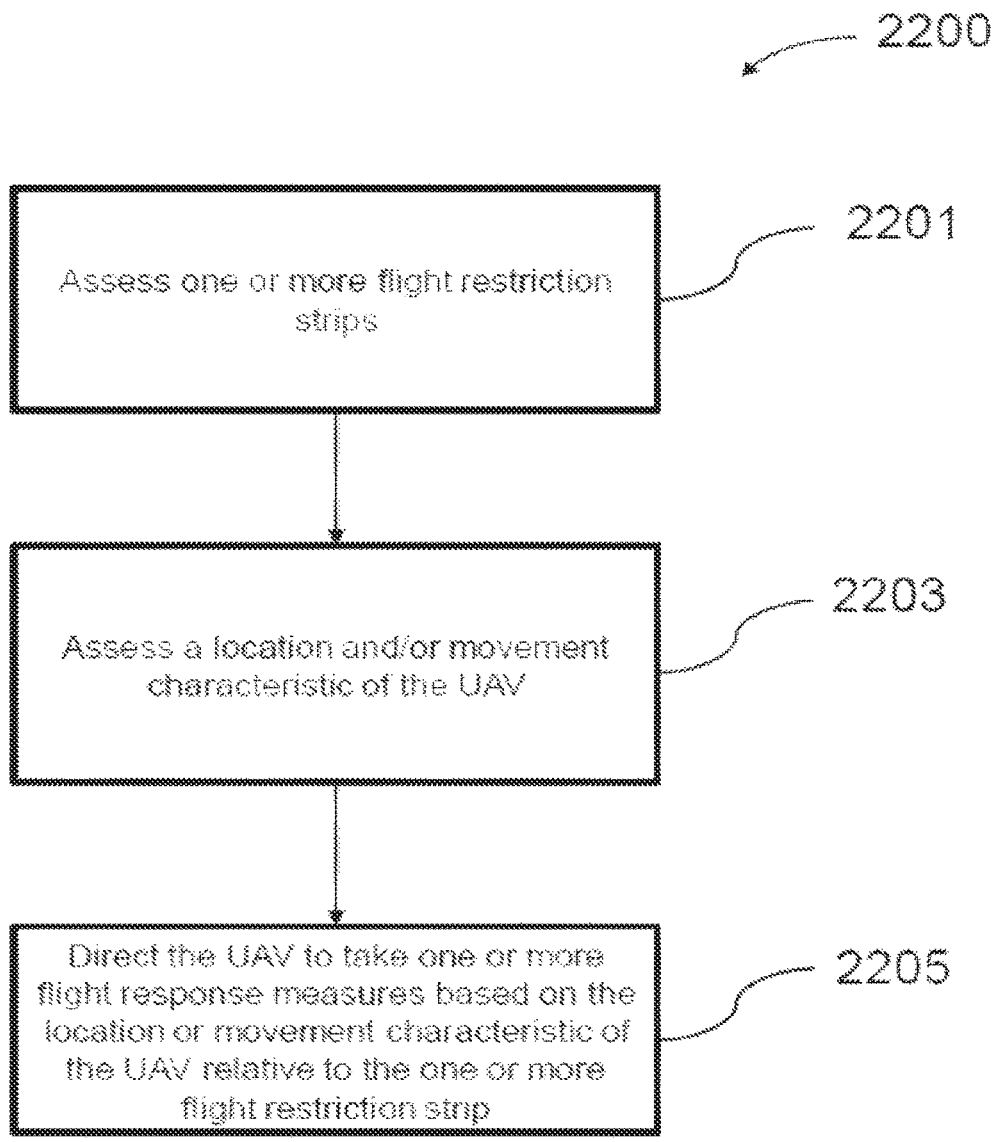
FIG. 22 illustrates a method for controlling a UAV, in accordance with embodiments.

In some instances, the flight response measures as referred to herein may depend upon characteristics or parameters associated with the UAV. For example, the flight response measures may depend upon a location and/or movement characteristics of the UAV. In some instances, flight response measures may be provided in association with flight restricted strips for UAVs outside the flight restriction strips. FIG. 22 illustrates a method 2200 for controlling a UAV, in accordance with embodiments. In step 2201, one or more flight restriction strips may be assessed. For example, a location of the flight restriction strips may be assessed. For example, other parameters of the flight restriction strips such as a size or shape of the flight restriction strips may be assessed.

The flight restriction strips may be substantially as described herein. For example, each flight restriction strip may be defined using one or more geometric shapes, e.g., circles, rectangles, etc. In some instances, the geometric shape may be an area encompassed by a first circle and a second circle and lines running tangent to the first circle and the second circle. The flight restriction strip may comprise a length and a width. The width may be determined as previously described herein. For example, a width of the flight restriction strip may be defined to ensure that a UAV interacting with the flight restriction strip does not encroach into a flight restriction zone. In some instances, a minimum width of the flight restriction strip may be defined to ensure that a UAV, which is flying at maximum level flight speed directly into a flight restriction zone, will not encroach into the flight restriction zone when a maximum brake, deceleration or reverse acceleration is applied.

In some instances, one or more flight restriction strips may generate the flight restriction zone. For example, a flight restriction zone may be generated by one or more flight restriction strips that trace a boundary or enclose an area, e.g., an irregular polygon area. In some instances, a plurality of flight restriction strips may connect together to form a loop (e.g., enclose an area). The plurality of flight restriction strips may overlap (e.g., at the ends) and enclose a region. The area or region enclosed by the flight restriction strips (e.g., the loop) may define a flight restriction zone. Alternatively, a flight restriction zone may be provided outside of the loop. In some instances, one or more flight restriction strips may substantially fill an area to generate the flight restriction zone. In some instances, one or more flight restriction strips may divide an area into a plurality of sections substantially as described with respect to FIG. 21. Different flight restriction zones may be provided within the area.

The flight restriction strips and/or flight restriction zones as referred herein may be generated with aid of one or more processors. The flight restriction zone may be generated using one or more flight restriction strips. The one or more processors may be off-board the UAV. For example, the flight restricted strips and/or zones may be generated at a database off board the UAV. In some instances, the flight restricted strips and/or zones may be generated at a server, e.g., cloud server. In some instances, the flight restricted strips and/or zones may be generated by a third party unaffiliated with a UAV that may interact with the flight restriction strips and/or zones. For example, the flight restricted strips and/or zones may be generated or mandated by a governmental entity. For example, the flight restricted strips and/or zones may be generated by a party providing a platform for generating and storing recommended flight restricted regions. In some instances, a UAV may desire to abide by the generated flight restricted strips and/or zones. In some instances, a UAV may desire to utilize the generated flight restricted strips and/or zones in imposing appropriate flight response measures. In some instances, the generated flight restriction strips and/or zones may be delivered to the UAV. For example, information about the flight restricted strips and/or zones may be delivered to a controller (e.g., flight controller) of the UAV. The UAV may be required to follow appropriate flight response measures associated with the flight restriction strips and/or zones in response to the delivered information. The information regarding the flight restriction strips and/or zones may be delivered from a third party or a government entity to the UAV. The information regarding the flight restricted strips and/or zones may be delivered to the UAV via wired connection and/or wireless connections. Alternatively, the flight restricted strips and/or zones may be generated with aid of one or more processors on-board the UAV. The information regarding the flight restricted strips and/or zones may be updated at any given interval, e.g., regular intervals or irregular intervals. For example, the information regarding the flight restricted strips and/or zones may be updated about or more often than every 30 minutes, every hour, every 3 hours, every 6 hours, every 12 hours, every day, every 3 days, every week, every 2 weeks, every 4 weeks, every month, every 3 months, every 6 months, or every year. The information regarding the flight restricted strips and/or zones may be uploaded to the UAV prior to UAV take off. In some instances, the information regarding the flight restricted region may be uploaded or updated during UAV flight.

In step 2203, a location and/or movement characteristic of the UAV may be assessed. In some instances, the location and/or movement characteristic of the UAV may be assessed relative to one or more flight restriction strips. For example, a location of the UAV may be assessed. The location may be assessed using any of the methods previously disclosed herein, e.g., via GPS. A movement characteristic of the UAV may be any characteristic associated with movement of the UAV. For example, the movement characteristic may comprise a minimum, average, and/or maximum velocity of the UAV. For example, the movement characteristic may comprise a minimum, average, and/or maximum acceleration of the UAV. In some instances, the movement characteristic may comprise braking capabilities of the UAV, e.g., minimum, average, and/or maximum deceleration of the UAV. In some instances, the movement characteristic may comprise a direction of travel of the UAV. The direction of travel may be assessed in two dimensional or three dimensional coordinates. In some instances, the movement characteristic may comprise a projected flight path of the UAV. For example, a movement characteristic of whether a UAV is directly flying towards a flight restriction strip or a flight restriction zone may be assessed.

In some instances, assessing the movement characteristic of the UAV relative to the one or more flight restriction strips may comprise detecting which of the one or more flight restriction strips the UAV is most likely to approach or intersect if no response is taken. For example, a direction or flight path of the UAV may be estimated or determined. The direction or flight path of the UAV may be compared to a location of the one or more flight restriction strips to determine which of the flight restriction strips the UAV is likely to approach. In some instances, assessing the movement characteristic of the UAV relative to the one or more flight restriction strips may comprise determining, or calculating, an estimated amount of time at which the UAV would approach the flight restriction strip. For example, based on the direction or flight path, a current UAV speed, and a location of the detected flight restriction strip that the UAV is most likely to approach, a time to approach may be calculated. In some instances, based on the estimated amount of time, the method 2200 may further comprise determining a time or distance at which the UAV will begin to experience a flight response measure prior to reaching the flight-restriction strip. For example, for a fast moving UAV headed towards a flight restriction strip, a flight response measure may be imposed when the UAV is further away from the flight restriction strip compared to a slow moving UAV headed towards the same flight restriction strip.

In some instances, the method 2200 may further comprise assessing the location of the UAV relative to a flight restriction zone based on the location of the UAV relative to the one or more flight restriction strips. Assessing the location of the UAV relative to the flight restriction zone may comprise assessing whether the location of the UAV is within a region surrounded by the one or more flight restriction strips forming a border or boundary of the region. In some instances, assessing the location of the UAV relative to the flight restriction zone may be based on graphical methods as previously described herein. In some instances, assessing the location of the UAV relative to the flight restriction zone may be based on recursive analysis of whether the location of the UAV is within one or more flight restriction strips that fill the flight restriction zone.

In step 2205, one or more processors may direct the UAV to take one or more flight response measures. The one or more flight response measures may be based on the previously assessed location and/or movement characteristics of the UAV. The one or more flight response measures may comprise any of the flight response measures previously described herein. For example, the one or more flight response measures may include preventing the UAV from entering the one or more flight restriction strips. The one or more flight response measures may include providing an alert to the UAV that the UAV is approaching the one or more flight restriction strips. The one or more flight response measures may include causing the UAV to land. The one or more flight response measures may include causing the UAV to slow down. In some instances, the flight response measure may comprise decelerating the UAV. In some instances, the flight response measure may comprise changing a direction of a path of the UAV.

The one or more flight response measure may be taken when the UAV is within the one or more flight restriction strips. In some instances, the one or more flight response measures may be taken when the UAV is about to exit the one or more flight restriction strips. In some instances, the one or more flight response measure may be taken when the UAV is about to enter the one or more flight restriction strips. For example, the one or more flight response measure may be taken when the UAV is within a distance threshold of the one or more flight restriction strips. The distance may be a static distance threshold. In some instances, the distance may be a variable distance threshold based on the location and/or movement characteristics of the UAV, e.g., acceleration, velocity.

In some instances, an apparatus for controlling an unmanned aerial vehicle (UAV) may be provided for performing the method 2200. The apparatus may comprise one or more controller running on one or more processors, individually or collectively configured to: assess one or more flight restriction strips; assess a location and/or movement characteristic of the UAV relative to the one or more flight restriction strips; and direct the UAV to take one or more flight response measure based on the location and/or movement characteristic of the UAV relative to the one or more flight restriction strips.

In some instances, a non-transitory computer readable medium for controlling an unmanned aerial vehicle (UAV) may be provided for performing the method 2200. The non-transitory computer readable medium may comprise code, logic, or instructions to: assess one or more flight-restriction strips; assess a location and/or movement characteristic of the UAV relative to the one or more flight-restriction strips; and direct the UAV to take one or more flight response measures based on the location and/or movement characteristic of the UAV relative to the one or more flight-restriction strips.

In some instances, an unmanned aerial vehicle (UAV) may be provided for performing the method 2200. The UAV may comprise one or more propulsion units configured to effect flight of the UAV; and one or more processors that direct the UAV to take one or more flight response measures in response to an assessed location and/or movement characteristic of the UAV relative to one or more flight-restriction strips.

Figure 10:
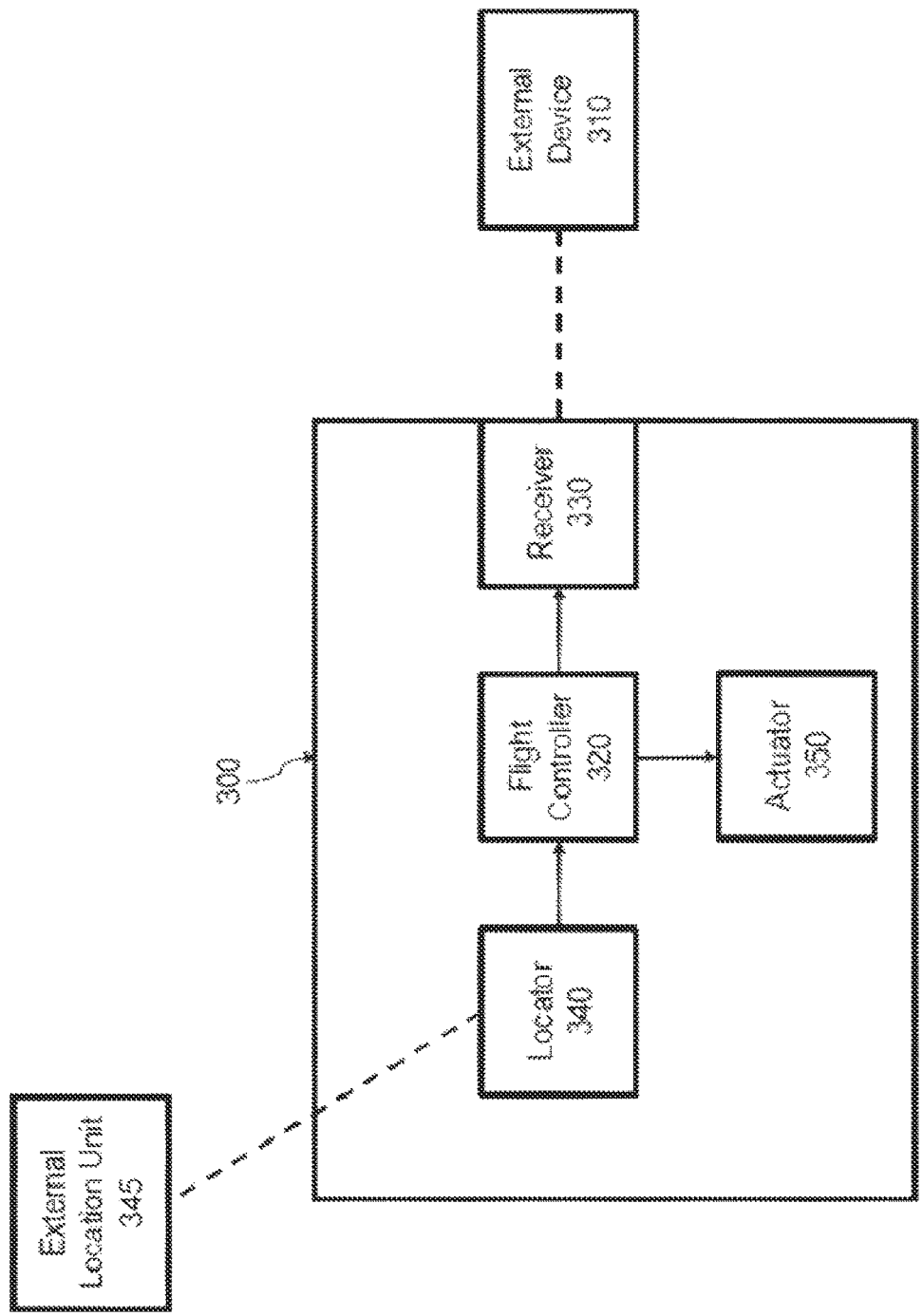
FIG. 10 provides a schematic illustration of an unmanned aerial vehicle in communication with an external device, in accordance with an embodiment of the disclosure.

FIG. 10 provides a schematic illustration of an unmanned aerial vehicle 300 in communication with an external device, 310 in accordance with an embodiment of the disclosure.

The UAV 300 may include one or more propulsion units that may control position of the UAV. The propulsion units may control the location of the UAV (e.g., with respect to up to three directions, such as latitude, longitude, altitude) and/or orientation of the UAV (e.g., with respect to up to three axes of rotation, such as pitch, yaw, roll). The propulsion units may permit the UAV to maintain or change position. The propulsion units may include one or more rotor blades that may rotate to generate lift for the UAV. The propulsion units may be driven by one or more actuators 350, such as one or more motors. In some instances, a single motor may drive a single propulsion unit. In other examples, a single motor may drive multiple propulsion units, or a single propulsion unit may be driven by multiple motors.

Operation of one or more actuator 350 of the UAV 300 may be controlled by a flight controller 320. The flight controller may include one or more processors and/or memory units. The memory units may include non-transitory computer readable media, which may comprise code, logic, or instructions for performing one or more steps. The processors may be capable of performing one or more steps described herein. The processors may provide the steps in accordance with the non-transitory computer readable media. The processors may perform location-based calculations and/or utilize algorithms to generate a flight command for the UAV.

The flight controller 320 may receive information from a receiver 330 and/or locator 340. The receiver 330 may communicate with an external device 310. The external device may be a remote terminal. The external device may be a control apparatus that may provide one or more sets of instructions for controlling flight of the UAV. A user may interact with the external device to issue instructions to control flight of the UAV. The external device may have a user interface that may accept a user input that may result in controlling flight of the UAV. Examples of external devices are described in greater detail elsewhere herein.

The external device 310 may communicate with the receiver 330 via a wireless connection. The wireless communication may occur directly between the external device and the receiver and/or may occur over a network, or other forms of indirect communication. In some embodiments, the wireless communications may be proximity-based communications. For example, the external device may be within a predetermined distance from the UAV in order to control operation of the UAV. Alternatively, the external device need not be within a predetermined proximity of the UAV. Communications may occur directly, over a local area network (LAN), wide area network (WAN) such as the Internet, cloud environment, telecommunications network (e.g., 3G, 4G), WiFi, Bluetooth, radiofrequency (RF), infrared (IR), or any other communications technique. In alternate embodiments, the communications between the external device and the receiver may occur via a wired connection.

Communications between the external device and the UAV may be two-way communications and/or one-way communications. For example, the external device may provide instructions to the UAV that may control the flight of the UAV. The external device may operate other functions of the UAV, such as one or more settings of the UAV, one or more sensors, operation of one or more payloads, operation of a carrier of the payload, or any other operations of the UAV. The UAV may provide data to the external device. The data may include information about the location of the UAV, data sensed by one or more sensors of the UAV, images captured by a payload of the UAV, or other data from the UAV. The instructions from the external device and/or data from the UAV may be transmitted simultaneously or sequentially. They may be transferred over the same communication channel or different communication channels. In some instances, instructions from the external device may be conveyed to the flight controller. The flight controller may utilize the flight control instructions from the external device in generating a command signal to one or more actuators of the UAV.

The UAV may also include a locator 340. The locator may be used to determine a location of the UAV. The location may include a latitude, longitude, and/or altitude of the aerial vehicle. The location of the UAV may be determined relative to a fixed reference frame (e.g., geographic coordinates). The location of the UAV may be determined relative to a flight-restricted region. The location of the flight-restricted region relative to the fixed reference frame may be used to determine the relative locations between the UAV and the flight-restricted region. The locator may use any technique or later developed in the art to determine the location of the UAV. For example, the locator may receive a signal from an external location unit 345. In one example, the locator may be a global positioning system (GPS) receiver and the external location unit may be a GPS satellite. In another example, the locator may be an inertial measurement unit (IMU), ultrasonic sensor, visual sensors (e.g., cameras), or communication unit communicating with an external location unit. The external location unit may include a satellite, tower, or other structure that may be capable of providing location information. One or more external location units may utilize one or more triangulation techniques in order to provide a location of the UAV. In some instances, the external location unit may be the external device 2310 or other remote control device. The location of the external device may be used as the location of the UAV or to determine the location of the UAV. The location of the external device may be determined using a location unit within the external device and/or one or more base stations capable of determining the location of the external device. The location unit of the external device may use any of the techniques described herein including, but not limited to, GPS, laser, ultrasonic, visual, inertial, infrared, or other location sensing techniques. The location of an external device may be determined using any technique, such as GPS, laser ultrasonic, visual, inertial, infrared, triangulation, base stations, towers, relays, or any other technique.

In alternate embodiments, an external device or external location unit may not be needed to determine the location of the UAV. For instance, the IMU may be used to determine the location of the UAV. An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the aerial vehicle such that the motion of the aerial vehicle corresponds to motion of the IMU. Alternatively the IMU can be permitted to move relative to the aerial vehicle with respect to up to six degrees of freedom. The IMU can be directly mounted onto the aerial vehicle, or coupled to a support structure mounted onto the aerial vehicle. The IMU may be provided exterior to or within a housing of the movable object. The IMU may be permanently or removably attached to the movable object. In some embodiments, the IMU can be an element of a payload of the aerial vehicle. The IMU can provide a signal indicative of the motion of the aerial vehicle, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the aerial vehicle, and the signal can be integrated once to provide velocity information, and twice to provide location and/or orientation information. The IMU may be able to determine the acceleration, velocity, and/or location/orientation of the aerial vehicle without interacting with any external environmental factors or receiving any signals from outside the aerial vehicle. The IMU may alternatively be used in conjunction with other location determining devices, such as GPS, visual sensors, ultrasonic sensors, or communication units.

The location determined by the locator 340 may be used by the flight controller 320 in the generation of one or more command signal to be provided to the actuator. For instance, the location of the UAV, which may be determined based on the locator information, may be used to determine a flight response measure to be taken by the UAV. The location of the UAV may be used to calculate a distance between the UAV and the flight-restricted region. The flight controller may calculate the distance with aid of a processor. The flight controller may determine which flight response measure, if any, needs to be taken by the UAV. The flight controller may determine the command signal to the actuator(s), which may control the flight of the UAV.

The UAV's flight controller may calculate its own current location via the locator (e.g., GPS receiver) and the distance to the flight-restricted region (e.g., center of the airport location or other coordinates representative of the airport location). Any distance calculation known or later developed in the art may be used.

In one embodiment, the distance between the two points (i.e., UAV and flight-restricted region) may be calculated using the following technique. An Earth-centered, Earth-fixed (ECEF) coordinate system may be provided. The ECEF coordinate system may be a Cartesian coordinate system. It may represent positions as X, Y, and Z coordinates. Local East, North, Up (ENU) coordinates are formed from a plane tangent to the Earth's surface fixed to a specific location and hence it is sometimes known as a "local tangent" or "local geodetic" plane. The east axis is labeled x, the north y and the up z.

For navigation calculations, the location data (e.g., GPS location data) may be converted into the ENU coordinate system. The conversion may contain two steps:

The data can be converted from a geodetic system to ECEF.

$$X = (N(\phi)+h)\cos\phi \cos\lambda$$

$$Y = (N(\phi)+h)\cos\phi \cos\lambda$$

$$Z = (N(\phi)(1-e^2)+h)\sin\phi$$

Where $$N(\phi) = \frac{a}{\sqrt{1-e^2\sin^2\phi}}$$

a and e are the semi-major axis and the first numerical eccentricity of the ellipsoid respectively.

$N(\Phi)$ is called the Normal and is the distance from the surface to the Z-axis along the ellipsoid normal.

The data in ECEF system may then be converted to the ENU coordinate system.

To transform data from the ECEF to the ENU system, the local reference may be chosen to the location when the UAV just receives a mission is sent to the UAV.

$$\begin{bmatrix} x \\ y \\ z \end{bmatrix} = \begin{bmatrix} -\sin\lambda_r & \cos\lambda_r & 0 \\ -\sin\phi_r\cos\lambda_r & -\sin\phi_r\sin\lambda_r & \cos\phi_r \\ \cos\phi_r\cos\lambda_r & \cos\phi_r\sin\lambda_r & \sin\phi_r \end{bmatrix} \begin{bmatrix} X - X_r \\ Y - Y_r \\ Z - Z_r \end{bmatrix}$$

The calculations may employ the Haversine Formula, which may give that the distance between two points A and B on the Earth surface is:

$$d_{A-B} = 2\arcsin\left(\sqrt{\sin^2\left(\frac{\Delta\phi}{2}\right) + \cos\phi_A\cos\lambda_B\sin^2\left(\frac{\Delta\lambda}{2}\right)}\right)R_e$$

Where $\Delta\phi = \phi_A - \phi_B$, $\Delta\lambda = \lambda_A - \lambda_B$, and $R_e$ is the radius of the Earth.

If the UAV is continuously calculating the current position and the distance to thousands of potential flight-restricted regions, such as airports, a large amount of computational power may be used. This may result in slowing down operations of one or more processors of the UAV. One or more techniques to simplify and/or speed up the calculations may be employed.

In one example, the relative location and/or distance between the UAV and the flight-restricted region may be calculated at specified time intervals. For example, the calculations may occur every hour, every half hour, every 15 minutes, every 10 minutes, every 5 minutes, every 3 minutes, every 2 minutes, every minute, every 45 seconds, every 30 seconds, every 15 seconds, every 12 seconds, every 10 seconds, every 7 seconds, every 5 seconds, every 3 seconds, every second, every 0.5 seconds, or every 0.1 second. The calculations may be made between the UAV and one or more flight-restricted regions (e.g., airports).

In another example, every time the aircraft's location is first obtained (e.g., via GPS receiver), the relatively distant airports may be filtered out. For example, airports that are far away need not pose any concern for the UAV. In one example, flight-restricted regions outside a distance threshold may be ignored. For example, flight-restricted regions outside a flight range of a UAV may be ignored. For example, if the UAV is capable of flying 100 miles in a single flight, flight-restricted regions, such as airports, that are greater than 100 miles away when the UAV is turned on may be ignored. In some instances, the distance threshold may be selected based on the type of UAV or capability of UAV flight.

In some examples, the distance threshold may be about 1000 miles, 750 miles, 500 miles, 300 miles, 250 miles, 200 miles, 150 miles, 120 miles, 100 miles, 80 miles, 70 miles, 60 miles, 50 miles, 40 miles, 30 miles, 20 miles, or 10 miles. Removing remote flight-restricted regions from consideration may leave only a few nearby coordinates, every time calculate the distance to these points. For example, only several airports or other types of flight-restricted regions may be within the distance threshold from the UAV. For example, when a UAV is first turned on, only several airports may fall within a distance of interest to the UAV. The distance of the UAV relative to these airports may be calculated. They may be calculated continuously in real-time, or may be updated periodically at time intervals in response to detected conditions. By reducing the number of flight-restricted regions of interest, less computational power may be employed, and calculations may occur more quickly and free up other operations of the UAV.

Figure 11:
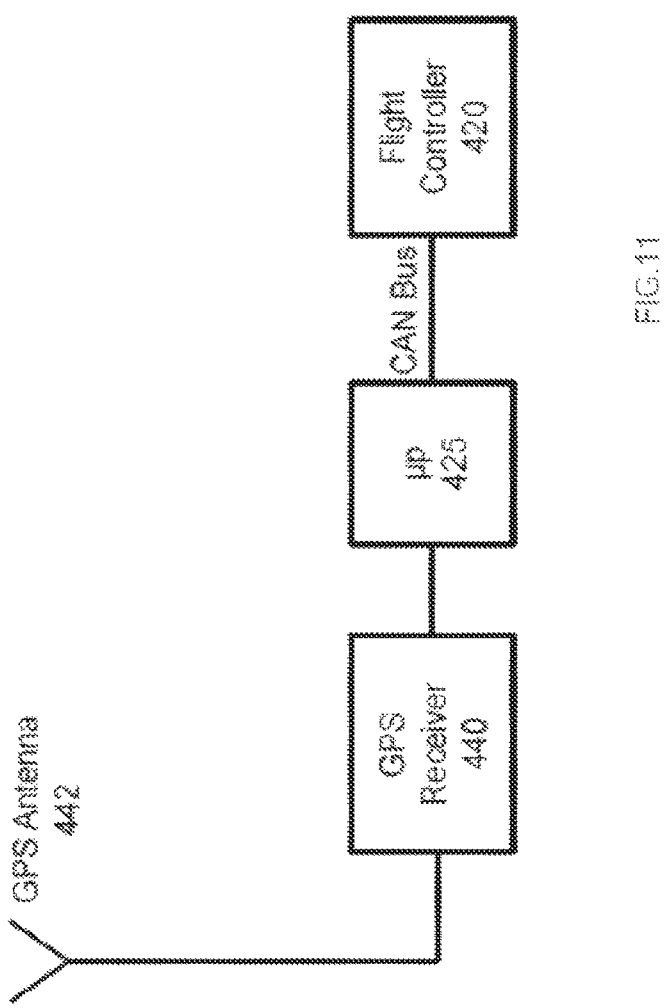
FIG. 11 provides an example of an unmanned aerial vehicle using a global positioning system (GPS) to determine the location of the unmanned aerial vehicle, in accordance with an embodiment of the disclosure.

FIG. 11 provides an example of an unmanned aerial vehicle using a global positioning system (GPS) to determine the location of the unmanned aerial vehicle, in accordance with an embodiment of the disclosure. The UAV may have a GPS module. The GPS module may include a GPS receiver 440 and/or a GPS antenna 442. The GPS antenna may pick up one or more signals from a GPS satellite or other structure and convey the captured information to the GPS receiver. The GPS module may also include a microprocessor 425. The microprocessor may receive information from the GPS receiver. The microprocessor may convey the data from the GPS receiver in a raw form or may process or analyze it. The microprocessor may perform calculations using the GPS receiver data and/or may provide location information based on the calculations.

The GPS module may be operably connected to a flight controller 420. The flight controller of a UAV may generate command signals to be provided to one or more actuators of the UAV and thereby control flight of the UAV. Any connection may be provided between the GPS module and the flight controller. For example, a communication bus, such as a controller area network (CAN) bus may be used to connect the GPS module and the flight controller. The GPS receiver may receive data via the GPS antenna, and may communicate data to the microprocessor, which may communicate data to a flight controller via the communication bus.

The UAV may find a GPS signal prior to taking off. In some instances, once the UAV is turned on, the UAV may search for the GPS signal. If the GPS signal is found, the UAV may be able to determine its location prior to taking off. If the GPS signal is found before the UAV has taken off, it can determine its distance relative to one or more flight-restricted region. If the distance falls beneath a distance threshold value (e.g., is within a predetermined radius of the flight-restricted region) the UAV may refuse to take off. For example if the UAV is within a 5 mile range of an airport, the UAV may refuse to take off.

In some embodiments, if the UAV is unable to find the GPS signal prior to takeoff, it may refuse to takeoff. Alternatively, the UAV may take off, even if it unable to find the GPS signal prior to takeoff. In another example, if the flight controller cannot detect the presence of the GPS module (which may include the GPS receiver, GPS antenna and/or microprocessor), it may refuse to take off. Inability to obtain the GPS signal and inability to detect the presence of the GPS module may be treated as different situations. For example, the inability to obtain the GPS signal may not prevent the UAV from taking off if the GPS module is detected. This may be because a GPS signal may be received after the UAV has taken off. In some instances, increasing the altitude of the UAV or having fewer obstructions around the UAV may make it easier to receive a GPS signal, and as long as the module is detected and operational. If the UAV finds a GPS signal during flight, it can obtain its location and take emergency measures. Thus, it may be desirable to permit the UAV to take off when the GPS module is detected, regardless of whether a GPS signals detected prior to take off. Alternatively, the UAV may take off when the GPS signal is detected and may not take off when the GPS signal is not detected.

Some embodiments may rely on the aircraft GPS module to determine the location of the UAV. If the GPS module takes too long to successfully determine position, this will affect the capabilities of the flight. UAV flight functionality may be limited if the GPS module is inoperational or a GPS signal can not be detected. For example, a maximum altitude of the UAV may be lowered or a flight ceiling may be enforced if the GPS module is inoperational or the GPS signal can not be detected. In some instances, other systems and methods may be used to determine a location of the UAV. Other location techniques may be used in combination with GPS or in the place of GPS.

Figure 12:
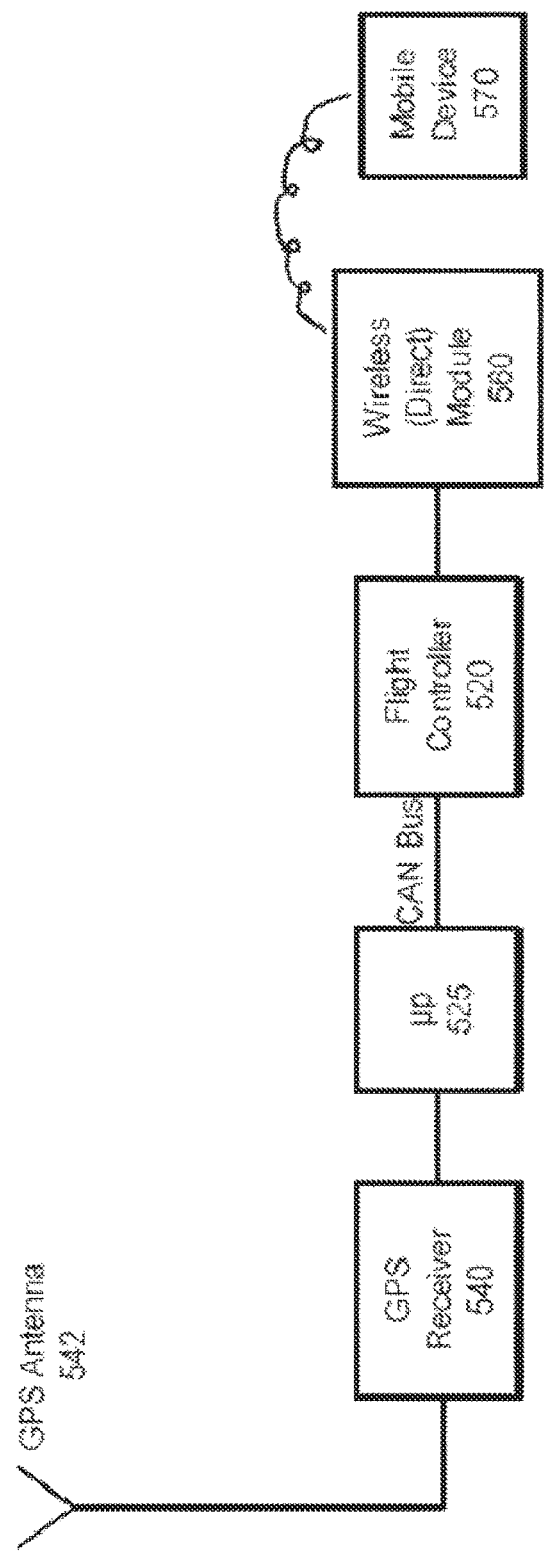
FIG. 12 is an example of an unmanned aerial vehicle in communication with a mobile device, in accordance with an embodiment of the disclosure.

FIG. 12 is an example of an unmanned aerial vehicle in communication with a mobile device, in accordance with an embodiment of the disclosure. The UAV may have a GPS module. The GPS module may include a GPS receiver 540 and/or a GPS antenna 542. The GPS antenna may pick up one or more signals from a GPS satellite or other structure and convey the captured information to the GPS receiver. The GPS module may also include a microprocessor 525. The microprocessor may receive information from the GPS receiver. The GPS module may be operably connected to a flight controller 520.

In some instances, the flight controller 520 may be in communication with a communication module. In one example, the communication module may be a wireless module. The wireless module may be a wireless direct module 560 which may permit direct wireless communications with an external device 570. The external device may optionally be a mobile device, such as a cell phone, smartphone, watch, tablet, remote controller, laptop, or other device. The external device may be a stationary device, e.g., personal computer, server computer, base station, tower, or other structure. The external device may be a wearable device, such as a helmet, hat, glasses, earpiece, gloves, pendant, watch, wristband, armband, legband, vest, jacket, shoe, or any other type of wearable device, such as those described elsewhere herein. Any description herein of a mobile device may also encompass or be applied to a stationary device or any other type of external device and vice versa. The external device may be another UAV. The external device may or may not have an antenna to aid in communications. For example, the external device may have a component that may aid in wireless communications. For example, direct wireless communications may include WiFi, radio communications, Bluetooth, IR communications, or other types of direct communications.

The communication module may be provided on-board the UAV. The communication module may permit one-way or two-way communications with the mobile device. The mobile device may be a remote control terminal, as described elsewhere herein. For example, the mobile device may be a smartphone that may be used to control operation of the UAV. The smartphone may receive inputs from a user that may be used to control flight of the UAV. In some instances, the mobile device may receive data from the UAV. For example, the mobile device may include a screen that may display images captured by the UAV. The mobile device may have a display that shows images captured by a camera on the UAV in real-time.

For example, one or more mobile devices 570 may be connected to the UAV via a wireless connection (e.g., WiFi)

to be able to receive data from the UAV in real-time. For example, the mobile device may show images from the UAV in real-time. In some instances, the mobile device (e.g., mobile phone) can be connected to the UAV and may be in close proximity to the UAV. For example, the mobile device may provide one or more control signals to the UAV. The mobile device may or may not need to be in close proximity to the UAV to send the one or more control signals. The control signals may be provided in real-time. The user may be actively controlling flight of the UAV and may provide flight control signals to the UAV. The mobile device may or may not need to be in close proximity to the UAV to receive data from the UAV. The data may be provided in real-time. One or more image capture device of the UAV or other types of sensors may capture data, and the data may be transmitted to the mobile device in real-time. In some instances, the mobile device and UAV may be in close proximity, such as within about 10 miles, 8 miles, 5 miles, 4 miles, 3 miles, 2 miles, 1.5 miles, 1 mile, 0.75 miles, 0.5 miles, 0.3 miles, 0.2 miles, 0.1 miles, 100 yards, 50 yards, 20 yards, or 10 yards.

A location of the mobile device 570 may be determined. The mobile device location results can be transmitted to the UAV, because during flight, the mobile device and UAV distance will typically not be too far. The mobile device location may be used by the UAV as the UAV location. This may be useful when the GPS module is inoperational or not receiving a GPS signal. The mobile device may function as a location unit. The UAV can perform assessments using the mobile device location results. For example, if it is determined that the mobile device is at a particular set of coordinates or a certain distance from a flight-restricted region, that data may be used by the flight controller. The location of the mobile device may be used as the UAV location, and the UAV flight controller may perform calculations using the mobile device location as the UAV location. Thus, the calculated distance between the UAV and the flight-restricted region may be the distance between the mobile device and the flight-restricted region. This may be a viable option when the mobile device is typically close to the UAV.

The mobile device may be used to determine the location of the UAV in addition to or instead of using a GPS module. In some instances, the UAV may not have a GPS module and may rely on the mobile device for determining the UAV location. In other instances, the UAV may have a GPS module, but may rely on the mobile device when unable to detect a GPS signal using the GPS module. Other location determining for the UAV may be used in combination of instead of the techniques described herein.

Figure 13:
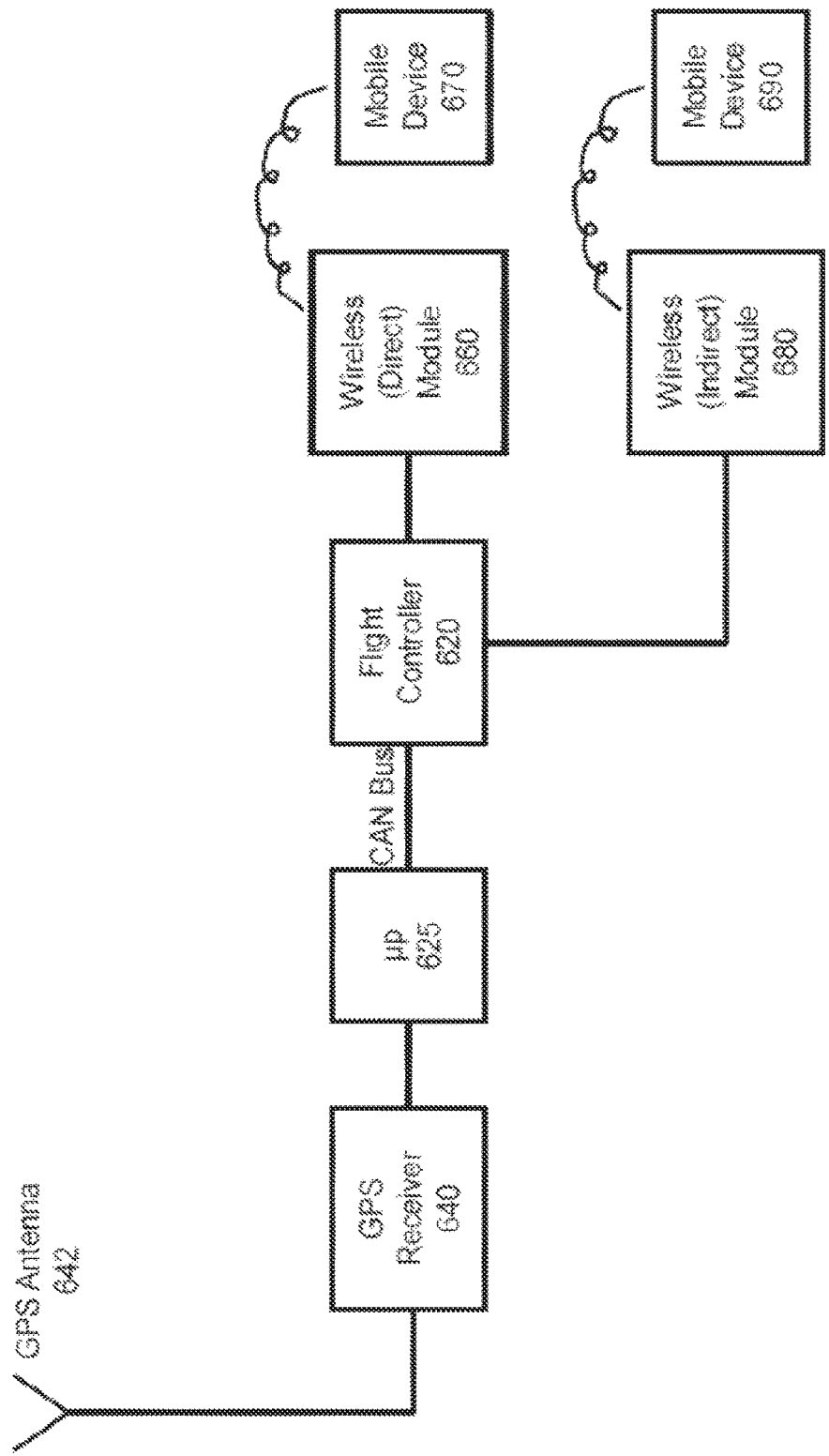
FIG. 13 is an example of an unmanned aerial vehicle in communication with one or more mobile devices, in accordance with an embodiment of the disclosure.

FIG. 13 is an example of an unmanned aerial vehicle in communication with one or more mobile devices, in accordance with an embodiment of the disclosure. The UAV may have a GPS module. The GPS module may include a GPS receiver 640 and/or a GPS antenna 642. The GPS antenna may pick up one or more signals from a GPS satellite or other structure and convey the captured information to the GPS receiver. The GPS module may also include a microprocessor 625. The microprocessor may receive information from the GPS receiver. The GPS module may be operably connected to a flight controller 620.

In some instances, the flight controller 620 may be in communication with a communication module. In one example, the communication module may be a wireless module. The wireless module may be a wireless direct module 560 which may permit direct wireless communications with an external mobile device 570. For example, direct wireless communications may include WiFi, radio communications, Bluetooth, IR communications, or other types of direct communications.

Alternatively, the wireless module may be a wireless indirect module 580 which may permit indirect wireless communications with an external mobile device 590. Indirect wireless communication may occur over a network, such as a telecommunications/mobile network. The network may be the type of network that requires insertion of a SIM card to permit communications. The network may utilize 3G/4G or other similar types of communications. The UAV can use a mobile base station to determine the location of the mobile device. Alternatively, the mobile base station location may be used as the mobile device location and/or the UAV location. For example, the mobile base station may be a mobile phone tower, or other type of static or moving structure. Although this technique may not be precise as GPS, this error can be very, very small relative to distance thresholds described (e.g., 4.5 miles, 5 miles, and 5.5 miles). In some implementations, the UAV can use the Internet to connect to the user's mobile device, to obtain the mobile device's base station location. The UAV may communicate with the mobile device which may communicate with a base station, or the UAV may communicate directly with the base station.

The UAV may have both a wireless direct module and a wireless indirect module. Alternatively, the UAV may have only a wireless direct module, or only a wireless indirect module. The UAV may or may not have a GPS module in combination with the wireless module(s). In some instances, when multiple location units are provided, the UAV may have a preference of order. For example, if the UAV has a GPS module and the GPS module is receiving a signal, the UAV may preferably use the GPS signal to provide the location of the UAV without using communication modules. If the GPS module is not receiving a signal, the UAV may rely on a wireless direct or indirect module. The UAV may optionally first try a wireless direct module, but if unable to get a location may try to use the wireless indirect module to get a location. The UAV may have a preference for a location technique that has a higher likelihood of providing a more precise and/or accurate location of the UAV. Alternatively, other factors may be provided, such as location technique that uses less power or is more reliable (less likely to fail) may have a higher preference. In another example, the UAV may gather location data from multiple sources and may compare the data. For example, the UAV may use GPS data in conjunction with data from a communication module using the location of the mobile device or base station. The data may or may not be averaged or other calculations may be performed to determine the location of the UAV. Simultaneous location data gathering may occur.

Figure 14:
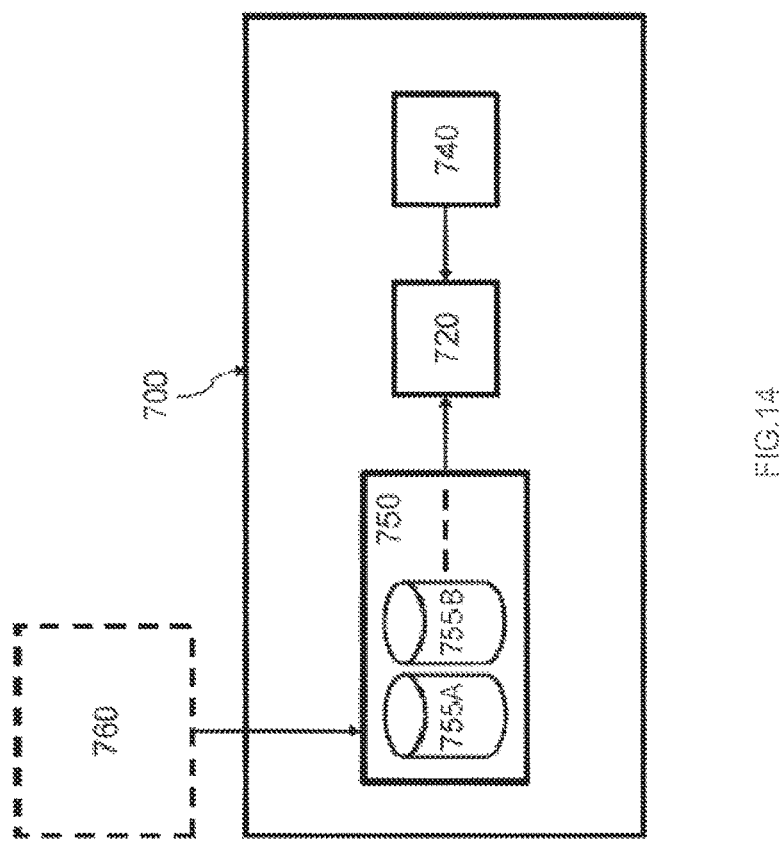
FIG. 14 provides an example of unmanned aerial vehicle with an on-board memory unit, in accordance with an aspect of the disclosure.

FIG. 14 provides an example of unmanned aerial vehicle 700 with an on-board memory unit 750, in accordance with an aspect of the disclosure. The UAV may have a flight controller 720 which may generate one or more command signals to effect flight of the UAV. A location unit 740 may be provided. The location unit may provide data indicative of a location of the UAV. The location unit may be a GPS receiver, communication module receiving location data from an external device, ultrasonic sensor, visual sensor, IR sensor, inertial sensor, or any other type of device that may be useful for determining the location of the UAV. The flight controller may use the location of the UAV to generate the flight command signal.

The memory unit 750 may include data about location of one or more flight-restricted regions. For example, one or more on-board database or memory 755A may be provided, storing lists of flight-restricted regions and/or their location. In one example, coordinates of various flight-restricted regions, such as airports, may be stored in the on-board memory of the UAV. In one example, the memory storage device may store latitude and longitude coordinates of many airports. All airports in the world, continent, country, or region of the world may be stored in the memory unit. Other types of flight-restricted regions may be stored. The coordinates may include only latitude and longitude coordinates, may further include altitude coordinates, or may include boundaries of flight-restricted regions. Thus information about flight-restricted regions, such as locations and/or associated rules, may be pre-programmed onto the UAV. In one example, every airport's latitude and longitude coordinates may be respectively stored as a "double" data type. For instance, every airport's position may occupy 16 bytes.

The UAV may be able to access the on-board memory to determine the location of flight-restricted regions. This may be useful in situations where a communication of a UAV may be inoperable or may have trouble accessing an external source. For instance, some communication systems may be unreliable. In some instances, accessing on-board stored information may be more reliable and/or may require less power consumption. Accessing on-board stored information may also be faster than downloading the information in real-time.

In some instances, other data may be stored on-board the UAV. For example, databases and/or memory 755B may be provided about rules relating to the particular flight-restricted regions or different jurisdictions. For example, the memory may store information on-board about flight rules for different jurisdictions. For example, Country A may not permit a UAV to fly within 5 miles of an airport, while Country B may not permit a UAV to fly within 9 miles of an airport. In another example, Country A may not permit a UAV to fly within 3 miles of a school during school hours, while Country B has no restrictions on UAV flight near schools. In some instances, the rules may be specific to jurisdictions. In some instances the rules may be specific to flight-restricted regions, regardless of jurisdiction. For example, within Country A, Airport A may not permit UAV flight anywhere within 5 miles of the airport at all times, while Airport B may permit UAV flight near the airport from 1:00-5:00 A.M. The rules may be stored on-board the UAV and may optionally be associated with the relevant jurisdictions and/or flight-restricted regions.

The flight controller 720 may access the on-board memory to calculate a distance between the UAV and a flight-restricted region. The flight controller may use information from the location unit 740 as the location of the UAV, and may use information from the on-board memory 750 for the flight-restricted region location. A calculation of the distance between the UAV and flight-restricted region may be made by the flight controller, with aid of a processor.

The flight controller 720 may access on-board memory to determine a flight response measure to take. For example, the UAV may access the on-board memory about different rules. The location of the UAV and/or the distance may be used to determine the flight response measure to be taken by the UAV in accordance with the relevant rules. For example, if the location of the UAV is determined to be within Country A, and Airport A is nearby, the flight controller may review the rules for Country A and Airport A in determining the flight response measure to take. This may affect the command signal generated and sent to one or more actuators of the UAV.

The on-board memory 750 of the UAV may be updated. For example, a mobile device in communication with the UAV may be used for updates. When the mobile device and UAV are connected the on-board memory may be updated. The mobile device and the UAV may be updated via a wireless connection, such as a direct or indirect wireless connection. In one example, the connection may be provided via WiFi or Bluetooth. The mobile device may be used to control flight of the UAV and/or receive data from the UAV. Information such as flight-restricted regions, or locations/rules associated with the flight-restricted regions may be updated. Such updates may occur while the mobile device interacting with the UAV. Such updates may occur when the mobile device first connects with the UAV, at periodic time intervals, when events are detected, or continuously in real-time.

In another example, a wired connection may be provided between the UAV and an external device for providing updates to on-board memory. For example, a USB port or similar port on the UAV may be used to connect to a personal computer (PC), and may use PC software to update. In another example, the external device may be a mobile device, or other type of external device. The updates may occur when the UAV first connects to the external device, at periodic time intervals while the wired connection remains, when events are detected, or continuously in real-time while the wired connection remains.

An additional example may permit the UAV to have a communication device for accessing the Internet or other network. Every time the UAV starts, it can automatically check whether the on-board memory needs to be updated. For example, every time the UAV starts, it can automatically check whether information about flight-restricted regions needs to be updated. In some embodiments, the UAV only checks whether there are updates to be made upon being turned on. In other embodiments, the UAV may make checks periodically, upon detected events or commands, or continuously.

Figure 15:
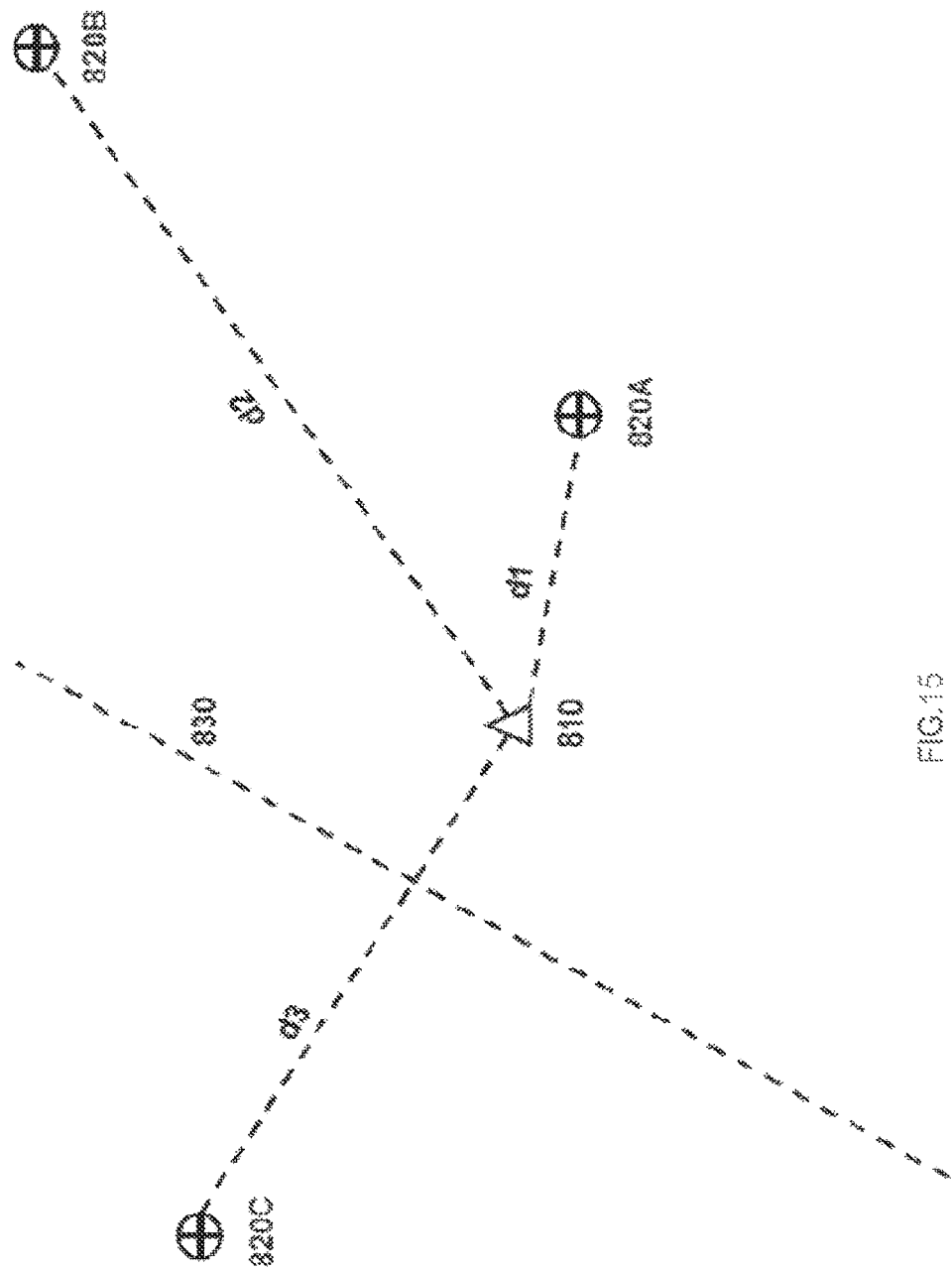
FIG. 15 shows an example of an unmanned aerial vehicle in relation to multiple flight-restricted regions, in accordance with an embodiment of the disclosure.

FIG. 15 shows an example of an unmanned aerial vehicle 810 in relation to multiple flight-restricted regions 820a, 820b, 820c, in accordance with an embodiment of the disclosure. For example, a UAV may be flying near several airports or other types of flight-restricted regions. The location of the flight-restricted regions may be stored on-board the UAV. Alternatively or in addition, the UAV may download or access the locations of the flight-restricted regions from off-board the UAV.

A location of the UAV may be compared with the location of the flight restricted regions. Respective distances d1, d2, d3 may be calculated. A flight response measure may be determined for the UAV with respect to the flight-restricted regions based on the distances. For example, the UAV 810 may be within a first radius of a first flight-restricted region 820A, which may cause the UAV to take a first flight response measure. The UAV may be within a second radius of a second flight-restricted region 820B, but may exceed the first radius. This may cause the UAV to take a second flight response measure.

In some instances, the UAV may be within distances to two or more flight-restricted regions such that it may receive instructions to perform two or more flight response measures. When two or more flight response measures are determined for the UAV, the responses for respective flight restricted regions may be simultaneously performed. For example, the UAV may be within a first radius of a flight-restricted region 820A, which may cause the UAV to take a first flight measure and second radius of a flight restricted region 820B, which may cause the UAV to take a second flight measure. In such a case, the UAV may perform both the first and second flight response measure. For example, if the UAV is within the first radius, the user may have a certain time period to operate the UAV and may be forced to land automatically after this this time period (e.g., the first flight response measure). Meanwhile, if the UAV is also within the second radius, the user may receive a warning on approaching a flight restricted zone.

In some instances, the flight response measures may have a hierarchy for performance, and a subset of the flight response measures may be performed. For example, the strictest flight response measure may be performed. For example, the UAV 810 may be at a distance d1, d2, and d3 to flight restricted-regions 820A, 820B, and 820C. The distance d1, d2, and d3 may be within a first, second, and third radius that elicits a first, second, and third flight response measure. If the first flight response measure is to automatically land the UAV, the second flight response measure is to provide the user with a warning, and the third flight response measure is to decrease the allowable altitude of the UAV, only the first flight response measure may be performed.

In some instances, the UAV may be within distances to two or more flight restricted-regions that elicits a same flight response measure. If the UAV can comply with all flight response measures, the UAV may comply. If the UAV cannot comply with all flight response measures, the UAV determine a separate flight response measure to follow. For example, the UAV 810 may be at a distance d1, d2, and d3 to flight restricted-regions 820A, 820B, and 820C. The distance d1, d2, and d3 may all be within a second radius that elicits a second flight response measure. The second flight response measure may be to fly the UAV away from the flight restricted regions 820A, 820B, and 820C. The UAV may be unable to determine a flight path that enables it to fly away from all three flight restricted regions 820A, 820B, and 820C. In such a case, the UAV may determine a separate flight response measure to follow. For example, the separate flight response measure may be to automatically land the UAV, or to give the user a predetermined period of time to operate the UAV before automatically landing the UAV. Alternatively, the second flight response measure may be to give a user a predetermined period of time to fly the UAV away from the flight restricted regions 820A, 820B, and 820C. If the UAV remains in the same region after having been operated by the user, the flight measure may automatic land the UAV.

In some instances, different jurisdictions may have different UAV no-fly provisions. For example, different countries may have different rules and/or some rules may be more complicated depending on jurisdiction, and may need to be accomplished step by step. Examples of jurisdictions may include, but are not limited to continents, unions, countries, states/provinces, counties, cities, towns, private property or land, or other types of jurisdictions.

The location of the UAV may be used to determine the jurisdiction within which the UAV is currently located and whole rules may apply. For example, GPS coordinates can be used to determine the country at which the UAV is located, and which laws apply. For example, Country A may prohibit flight of a UAV within 5 miles of an airport, while Country B may prohibit flight within 6 miles of an airport. Then after the aircraft obtains GPS coordinates, it can determine whether it is currently located within Country A or Country B. Based on this determination, it may assess whether the flight restrictions are in play within 5 miles or 6 miles, and may take a flight response measure accordingly.

For example, a boundary between jurisdictions 830 may be provided. The UAV may be determined to fall within Country A which is to the right of the boundary, based on the UAV location. Country B may be to the left of the boundary and may have different rules from Country A. In one example, the location of the UAV may be determined using any of the location techniques described elsewhere herein. Coordinates of the UAV may be calculated. In some instances, an on-board memory of the UAV may include boundaries for different jurisdiction. For example, the UAV may be able to access on-board memory to determine which jurisdiction the UAV falls within, based on its location. In other examples, information about the different jurisdictions may be stored off-board. For example, the UAV may communicate externally to determine which jurisdiction into which the UAV falls.

Rules associated with various jurisdictions may be accessed from on-board memory of the UAV. Alternatively, the rules may be downloaded or accessed from a device or network outside the UAV. In one example, Country A and Country B may have different rules. For example, Country A, within which the UAV 810 is located, may not permit UAVs to fly within 10 miles of an airport. Country B may not permit UAVs to fly within 5 miles of an airport. In one example, a UAV may currently have a distance d2 9 miles from Airport B 820B. The UAV may have a distance d3 7 miles from Airport C 820C. Since the UAV is in Country A, the UAV may need to take measures in response to its 9 mile proximity to Airport B, which falls within the 10 mile threshold. However, if the UAV was in Country B, no flight response measures may be required. Since Airport B is located in Country B, no flight response measure may be required by the UAV, since it is beyond the 5 mile threshold applicable in Country B.

Thus, the UAV may be able to access information about the jurisdiction into which the UAV falls and/or applicable flight rules for the UAV. The no-fly rules that are applicable may be used in conjunction with the distance/location information to determine whether a flight response measure is needed and/or which flight response measure should be taken.

An optional flight limitation feature may be provided for the UAV. The flight limitation feature may permit the UAV to fly only within a predetermined region. The predetermined region may include an altitude limitation. The predetermined region may include a lateral (e.g., latitude and/or longitude) limitation. The predetermined region may be within a defined three-dimensional space. Alternatively, the predetermined region may be within a defined two-dimensional space without a limitation in the third dimension (e.g., within an area without an altitude limitation).

The predetermined region may be defined relative to a reference point. For example, the UAV may only fly within a particular distance of the reference point. In some instances, the reference point may be a home point for the UAV. The home point may be an origination point for the UAV during a flight. For example, when the UAV takes off, it may automatically assign its home point as the take-off location. The home point may be a point that is entered or pre-programmed into the UAV. For example, a user may define a particular location as the home-point.

The predetermined region may have any shape or dimension. For example, the predetermined region may have a hemi-spherical shape. For instance, any region falling within a predetermined distance threshold from a reference point may be determined to be within the predetermined region. The radius of the hemi-sphere may be the predetermined distance threshold. In another example, the predetermined region may have a cylindrical shape. For instance, any region falling within a predetermined threshold from a reference point laterally may be determined to be within the predetermined region. An altitude limit may be provided as the top of the cylindrical predetermined region. A conical shape may be provided for a predetermined region. As a UAV moves away laterally from the reference point, the UAV may be permitted to fly higher and higher (ceiling), or may have a higher and higher minimum height requirement (floor). In another example, the predetermined region may have a prismatic shape. For instance, any region falling within an altitude range, a longitude range, and a latitude range may be determined to be within the predetermined region. Any other shapes of predetermined region in which a UAV may fly may be provided.

In one example, one or more boundaries of the predetermined region may be defined by a geo-fence. The geo-fence may be a virtual perimeter for a real-world geographic area. The geo-fence may be pre-programmed or pre-defined. The geo-fence may have any shape. The geo-fence may include a neighborhood, or follow any boundary. Data about the geo-fence and/or any other predetermined region may be stored locally on-board the UAV. Alternatively, the data may be stored off-board and may be accessed by the UAV.

Figure 16:
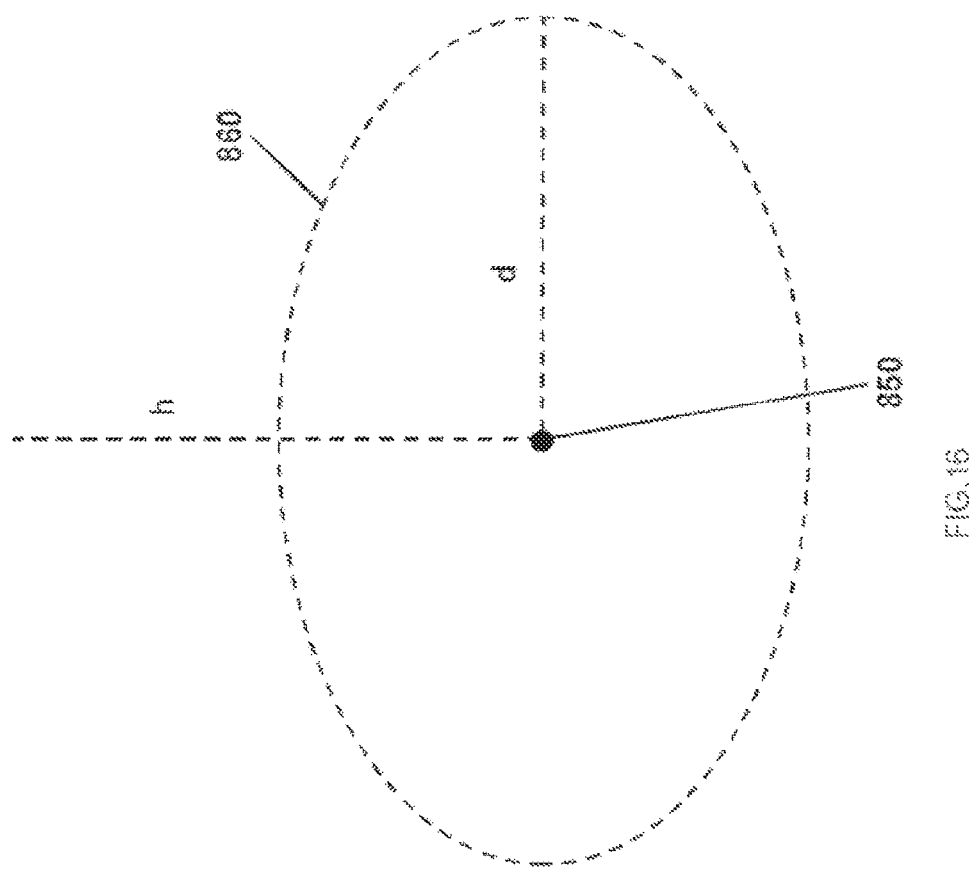
FIG. 16 shows an example of a flight limitation feature in accordance with an embodiment of the disclosure.

FIG. 16 shows an example of a flight limitation feature in accordance with an embodiment of the disclosure. A reference point 850, which may be a home point may be provided. The UAV may not be able to fly beyond a predetermined height h. The height may have any distance threshold limit as described elsewhere herein. In one example, the height may be no more than 1300 feet or 400 m. In other examples, the height limit may be less than or equal to about 50 feet, 100 feet, 200 feet, 300 feet, 400 feet, 500 feet, 600 feet, 700 feet, 800 feet, 900 feet, 1000 feet, 1100 feet, 1200 feet, 1300 feet, 1400 feet, 1500 feet, 1600 feet, 1700 feet, 1800 feet, 1900 feet, 2000 feet, 2200 feet, 2500 feet, 2700 feet, 3000 feet, 3500 feet, 4000 feet, 5000 feet, 6000 feet, 7000 feet, 8000 feet, 9000 feet, 10,000 feet, 12,000 feet, 15,000 feet, 20,000 feet, 25,000 feet, or 30,000 feet. Alternatively, the height limit may be greater than or equal to any of the height limits described.

The UAV may not be able to fly beyond a predetermined distance d relative to the reference point. The distance may have any distance threshold limit as described elsewhere herein. In one example, the height may be no more than 1 mile or 1.6 km. In other examples, the distance limit may be less than or equal to about 0.01 miles, 0.05 miles, 0.1 miles, 0.3 miles, 0.5 miles, 0.7 miles, 0.9 miles, 1 mile, 1.2 miles, 1.5 miles, 1.7 miles, 2 miles, 2.5 miles, 3 miles, 3.5 miles, 4 miles, 4.5 miles, 5 miles, 5.5 miles, 6 miles, 6.5 miles, 7 miles, 7.5 miles, 8 miles, 8.5 miles, 9 miles, 9.5 miles, 10 miles, 11 miles, 12 miles, 13 miles, 14 miles, 15 miles, 16 miles, 17 miles, 18 miles, 19 miles, 20 miles, 25 miles, 30 miles, 35 miles, 40 miles, 45 miles, 50 miles. Alternatively, the distance limit may be greater than or equal to any of the distance limits described. The distance limit may be greater than or equal to the height limit. Alternatively, the distance limit may be less than or equal to the height limit.

The predetermined region within which the UAV may fly may be a cylindrical region with the reference point 850 at the center of a circular cross-section 860. The circular cross-section may have a radius that is the predetermined distance d. The height of the predetermined region may be the height h. The height of the predetermined region may be the length of the cylindrical region. Alternatively, any other shape, including those described elsewhere herein, may be provided.

The height and/or distance limits may be set to default values. A user may or may not be able to alter the default values. For example, a user may be able to enter in new values for the flight limitation dimensions. In some instances, a software may be provided that may assist the user in entering new flight limitation dimensions. In some instances, information about flight-restricted regions may be accessible and used to advise the user in entering flight limitation dimensions. In some instances, the software may prevent the user from entering particular flight limitation dimensions if they are in contradiction with one or more flight regulations or rules. In some instances, a graphical tool or aid may be provided which may graphically depict the flight limitation dimensions and/or shapes. For example, a user may see a cylindrical flight limitation region, and the various dimensions.

In some instances, flight regulations or rules may trump flight limitation dimensions set up by a user. For example, if a user defines a radius of 2 miles for an aircraft to fly, but there is an airport within 1 mile of the home point, the flight response measures pertaining to flight-restricted regions may apply.

The UAV may be able to fly freely within the predetermined flight limitation region. If the UAV is nearing an edge of the flight limitation region, an alert may be provided to a user. For example, if the UAV is within several hundred feet of the edge of the flight limitation region, the user may be alerted and given an opportunity to take evasive action. Any other distance threshold, such as those described elsewhere herein, may be used to determine whether the UAV is near the edge of the flight limitation region. If the UAV continues on to the edge of the flight limitation region, the UAV may be forced to turn around to stay within the flight limitation region. Alternatively, if the UAV passes out of the flight limitation region, the UAV may be forced to land. A user may still be able to control the UAV in a limited manner but the altitude may decrease.

A UAV may determine where it is relative to the predetermined flight region using any location system as described elsewhere herein. In some instances, a combination of sensors may be used to determine a location of a UAV. In one example, the UAV may use GPS to determine its location, and follow the one or more flight rules as described herein. If the GPS signal is lost, the UAV may employ other sensors to determine its location. In some instances, the other sensors may be used to determine a local location of the UAV. If the GPS signal is lost, the UAV may follow a set of flight rules that may come into effect when the GPS signal is lost. This may include lowering the altitude of the UAV. This may include reducing the size of the predetermined region within which the UAV may fly. This may optionally including landing the UAV, and/or alerting the user of the loss of GPS connection for the UAV.

A flight limitation feature may be an optional feature. Alternatively, it may be built into a UAV. A user may or may not be able to turn the flight limitation feature on or off. Using a flight limitation feature may advantageously permit the UAV to fly freely within a known region. If anything were to happen to the UAV or the user lose visual sight or contact with the UAV, the user may be able to find the UAV more easily. Furthermore, the user may know that the UAV has not wandered into a flight-restricted region or other dangerous region. The flight limitation feature may also increase the likelihood that good communications will be provided between a remote controller and the UAV, and reduce likelihood of loss of control.

The systems, devices, and methods described herein can be applied to a wide variety of movable objects. As previously mentioned, any description herein of a UAV may apply to and be used for any movable object. Any description herein of a UAV may apply to any aerial vehicle. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 17:
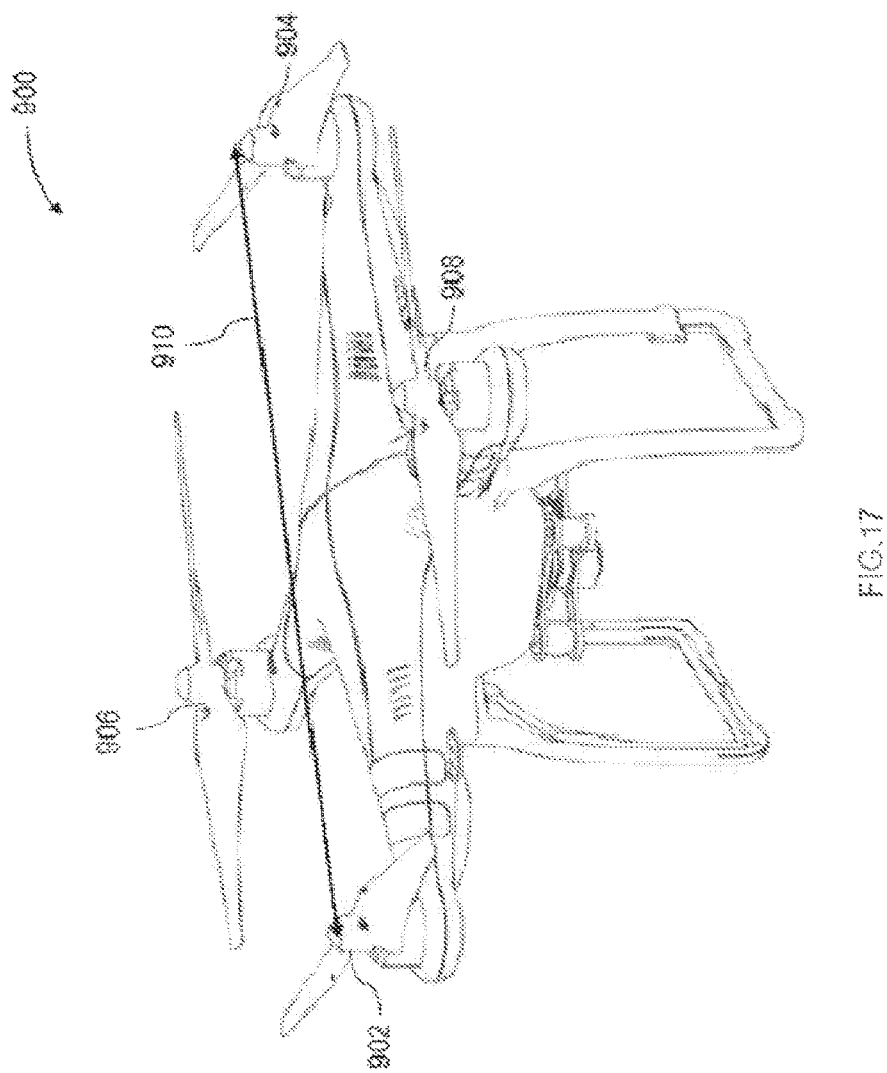
FIG. 17 illustrates an unmanned aerial vehicle, in accordance with an embodiment of the disclosure.

FIG. 17 illustrates an unmanned aerial vehicle (UAV) 900, in accordance with embodiments of the present disclosure. The UAV may be an example of a movable object as described herein. The UAV 900 can include a propulsion system having four rotors 902, 904, 906, and 908. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 910. For example, the length 910 can be less than or equal to 1 m, or less than equal to 5 m. In some embodiments, the length 910 can be within a range from 1 cm to 7 m, from 70 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 18:
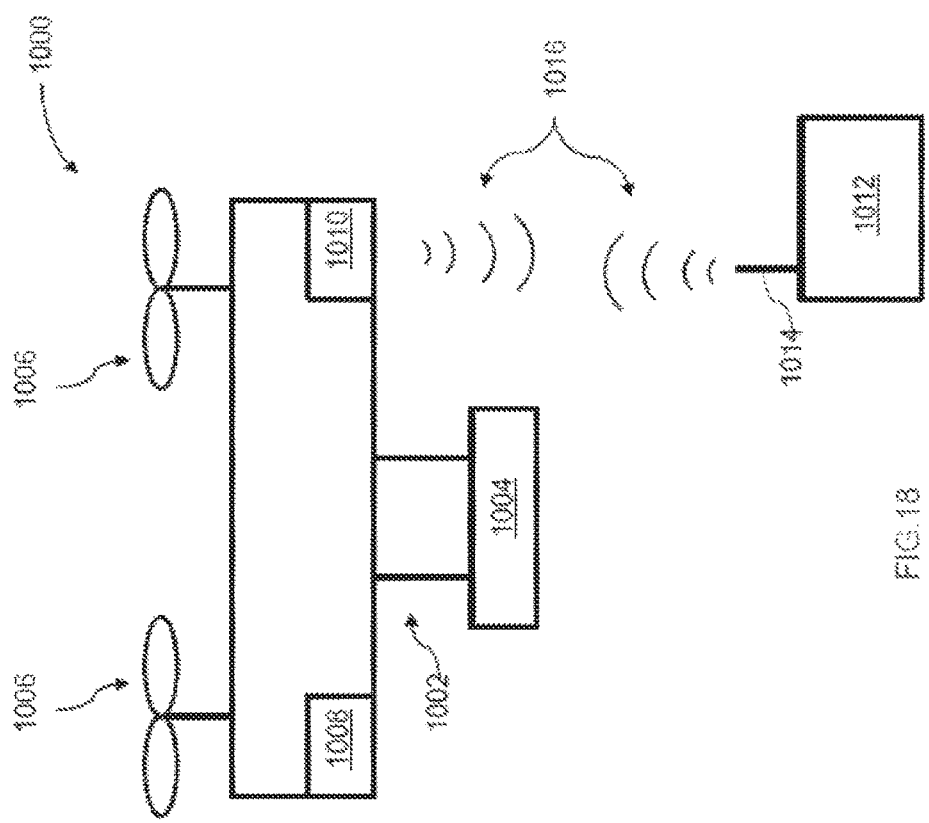
FIG. 18 illustrates a movable object including a carrier and a payload, in accordance with an embodiment of the disclosure.

FIG. 18 illustrates a movable object 1000 including a carrier 1002 and a payload 1004, in accordance with embodiments. Although the movable object 1000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1004 may be provided on the movable object 1000 without requiring the carrier 1002. The movable object 1000 may include propulsion mechanisms 1006, a sensing system 1008, and a communication system 1010.

The propulsion mechanisms 1006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1006 can be mounted on the movable object 1000 using any suitable means, such as a support element (e.g., a drive shaft) as described elsewhere herein. The propulsion mechanisms 1006 can be mounted on any suitable portion of the movable object 1000, such on the top, bottom, front, back, sides, or suitable combinations thereof.

In some embodiments, the propulsion mechanisms 1006 can enable the movable object 1000 to take off vertically from a surface or land vertically on a surface without requiring any horizontal movement of the movable object 1000 (e.g., without traveling down a runway). Optionally, the propulsion mechanisms 1006 can be operable to permit the movable object 1000 to hover in the air at a specified position and/or orientation. One or more of the propulsion mechanisms 1000 may be controlled independently of the other propulsion mechanisms. Alternatively, the propulsion mechanisms 1000 can be configured to be controlled simultaneously. For example, the movable object 1000 can have multiple horizontally oriented rotors that can provide lift and/or thrust to the movable object. The multiple horizontally oriented rotors can be actuated to provide vertical takeoff, vertical landing, and hovering capabilities to the movable object 1000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1000 (e.g., with respect to up to three degrees of translation and up to three degrees of rotation).

The sensing system 1008 can include one or more sensors that may sense the spatial disposition, velocity, and/or acceleration of the movable object 1000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1008 can be used to control the spatial disposition, velocity, and/or orientation of the movable object 1000 (e.g., using a suitable processing unit and/or control module, as described below). Alternatively, the sensing system 1008 can be used to provide data regarding the environment surrounding the movable object, such as weather conditions, proximity to potential obstacles, location of geographical features, location of manmade structures, and the like.

The communication system 1010 enables communication with terminal 1012 having a communication system 1014 via wireless signals 1016. The communication systems 1010, 1014 may include any number of transmitters, receivers, and/or transceivers suitable for wireless communication. The communication may be one-way communication, such that data can be transmitted in only one direction. For example, one-way communication may involve only the movable object 1000 transmitting data to the terminal 1012, or vice-versa. The data may be transmitted from one or more transmitters of the communication system 1010 to one or more receivers of the communication system 1012, or vice-versa. Alternatively, the communication may be two-way communication, such that data can be transmitted in both directions between the movable object 1000 and the terminal 1012. The two-way communication can involve transmitting data from one or more transmitters of the communication system 1010 to one or more receivers of the communication system 1014, and vice-versa.

In some embodiments, the terminal 1012 can provide control data to one or more of the movable object 1000, carrier 1002, and payload 1004 and receive information from one or more of the movable object 1000, carrier 1002, and payload 1004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1006), or a movement of the payload with respect to the movable object (e.g., via control of the carrier 1002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1008 or of the payload 1004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1012 can be configured to control a state of one or more of the movable object 1000, carrier 1002, or payload 1004. Alternatively or in combination, the carrier 1002 and payload 1004 can also each include a communication module configured to communicate with terminal 1012, such that the terminal can communicate with and control each of the movable object 1000, carrier 1002, and payload 1004 independently.

In some embodiments, the movable object 1000 can be configured to communicate with another remote device in addition to the terminal 1012, or instead of the terminal 1012. The terminal 1012 may also be configured to communicate with another remote device as well as the movable object 1000. For example, the movable object 1000 and/or terminal 1012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1000, receive data from the movable object 1000, transmit data to the terminal 1012, and/or receive data from the terminal 1012. Optionally, the remote device can be connected to the Internet or other telecommunications network, such that data received from the movable object 1000 and/or terminal 1012 can be uploaded to a website or server.

Figure 19:
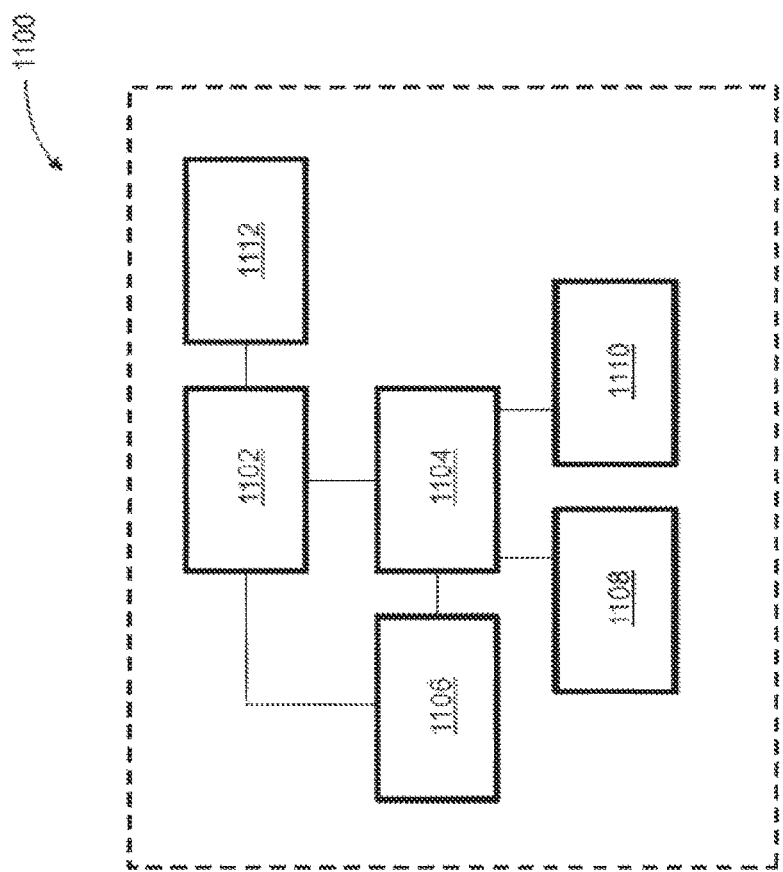
FIG. 19 is a schematic illustration by way of block diagram of a system for controlling a movable object, in accordance with an embodiment of the disclosure.

FIG. 19 is a schematic illustration by way of block diagram of a system 1100 for controlling a movable object, in accordance with embodiments. The system 1100 can be used in combination with any suitable embodiment of the systems, devices, and methods disclosed herein. The system 1100 can include a sensing module 1102, processing unit 1104, non-transitory computer readable medium 1106, control module 1108, and communication module 1110.

The sensing module 1102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1102 can be operatively coupled to a processing unit 1104 having a plurality of processors. In some embodiments, the sensing module can be operatively coupled to a transmission module 1112 (e.g., a Wi-Fi image transmission module) configured to directly transmit sensing data to a suitable external device or system. For example, the transmission module 1112 can be used to transmit images captured by a camera of the sensing module 1102 to a remote terminal.

The processing unit 1104 can have one or more processors, such as a programmable processor (e.g., a central processing unit (CPU)). The processing unit 1104 can be operatively coupled to a non-transitory computer readable medium 1106. The non-transitory computer readable medium 1106 can store logic, code, and/or program instructions executable by the processing unit 1104 for performing one or more steps. The non-transitory computer readable medium can include one or more memory units (e.g., removable media or external storage such as an SD card or random access memory (RAM)). In some embodiments, data from the sensing module 1102 can be directly conveyed to and stored within the memory units of the non-transitory computer readable medium 1106. The memory units of the non-transitory computer readable medium 1106 can store logic, code and/or program instructions executable by the processing unit 1104 to perform any suitable embodiment of the methods described herein. For example, the processing unit 1104 can be configured to execute instructions causing one or more processors of the processing unit 1104 to analyze sensing data produced by the sensing module. The memory units can store sensing data from the sensing module to be processed by the processing unit 1104. In some embodiments, the memory units of the non-transitory computer readable medium 1106 can be used to store the processing results produced by the processing unit 1104.

In some embodiments, the processing unit 1104 can be operatively coupled to a control module 1108 configured to control a state of the movable object. For example, the control module 1108 can be configured to control the propulsion mechanisms of the movable object to adjust the spatial disposition, velocity, and/or acceleration of the movable object with respect to six degrees of freedom. Alternatively or in combination, the control module 1108 can control one or more of a state of a carrier, payload, or sensing module.

The processing unit 1104 can be operatively coupled to a communication module 1110 configured to transmit and/or receive data from one or more external devices (e.g., a terminal, display device, or other remote controller). Any suitable means of communication can be used, such as wired communication or wireless communication. For example, the communication module 1110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1110 can transmit and/or receive one or more of sensing data from the sensing module 1102, processing results produced by the processing unit 1104, predetermined control data, user commands from a terminal or remote controller, and the like.

The components of the system 1100 can be arranged in any suitable configuration. For example, one or more of the components of the system 1100 can be located on the movable object, carrier, payload, terminal, sensing system, or an additional external device in communication with one or more of the above. Additionally, although FIG. 19 depicts a single processing unit 1104 and a single non-transitory computer readable medium 1106, one of skill in the art would appreciate that this is not intended to be limiting, and that the system 1100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1100 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A method for restricting motion of a vehicle, comprising:
   receiving, via one or more processors, two or more points associated with a restriction region;
   generating, via the one or more processors, one or more restriction strips along a boundary of the restriction region by connecting adjacent points of the two or more points, the one or more restriction strips defining at least a portion of the restriction region, each restriction strip in the one or more restriction strips being defined by an area encompassed by a first circle, a second circle, and two or more lines connected-to the first circle and the second circle, a distance between two of the two or more lines being equal to a diameter of the first circle or the second circle; and
   causing, via the one or more processors, the vehicle to automatically undertake one or more response measures based on at least one of a location or a movement characteristic of the vehicle relative to the restriction region.

2. The method of claim 1, wherein the irregularly-shaped restriction region corresponds to a man-made feature.

3. The method of claim 1, wherein the one or more response measures include at least one of:
   decelerating the vehicle;
   providing a safety measure to prevent the vehicle from entering the restriction region;
   changing a direction of the vehicle;
   adjusting a path of the vehicle;
   providing an alert regarding the vehicle;
   automatically disabling the vehicle;

ceasing to take commands from a user of the vehicle; or taking control of the vehicle.

4. The method of claim 1, further comprising:
determining which one of the one or more response measures to cause the vehicle to undertake, based on a location or a movement characteristic of the vehicle relative to the restriction region.

5. The method of claim 1, further comprising:
providing at least one of the one or more persons with limited time to take corrective action before taking control of the vehicle.

6. The method of claim 1, wherein each of the one or more restriction strips is configured with a width that is larger than or equal to a minimum width.

7. The method of claim 6, wherein the minimum width is defined to prevent the vehicle from penetrating the restriction region.

8. The method of claim 1, wherein the one or more restriction strips have ends, and wherein an end of one restriction strip overlaps with an end of another restriction strip.

9. The method of claim 1, wherein causing the vehicle to undertake the one or more response measures includes:
calculating a distance between a location of the vehicle and the boundary of the restriction region; and
determining whether to cause the vehicle to undertake the one or more response measures based at least in part on comparing the calculated distance to a distance threshold.

10. The method of claim 1, wherein causing the vehicle to undertake the one or more response measures includes:
calculating an estimated amount of time for the vehicle to approach the restriction region, or a time or distance for the vehicle to begin experience a response measure.

11. A system for restricting motion of a vehicle, comprising:
one or more processors having instructions that, when executed:
receive two or more points associated with a restriction region;
generate one or more restriction strips along a boundary of the restriction region, by connecting adjacent points of the two or more points, the one or more restriction strips defining at least a portion of the restriction region, each restriction strip in the one or more restriction strips being defined by an area encompassed by a first circle, a second circle, and two or more lines connected to the first circle and the second circle, a distance between two of the two or more lines being equal to a diameter of the first circle or the second circle; and
cause the vehicle to automatically undertake one or more response measures based on at least one of a location or a movement characteristic of the vehicle relative to the restriction region.

12. The system of claim 11, wherein the irregularly-shaped restriction region corresponds to a man-made feature.

13. The system of claim 11, wherein the one or more response measures include at least one of:
decelerating the vehicle;
providing a safety measure to prevent the vehicle from entering the restriction region;
changing a direction of the vehicle;
adjusting a path of the vehicle;
providing an alert regarding the vehicle;
automatically disabling the vehicle;
ceasing to take commands from a user of the vehicle; or
taking control of the vehicle.

14. The system of claim 11, wherein the instructions, when executed:
determine which one of the one or more response measures to cause the vehicle to undertake, based on a location or a movement characteristic of the vehicle relative to the restriction region.

15. The system of claim 11, wherein the instructions, when executed:
provide at least one of the one or more persons with limited time to take corrective action before taking control of the vehicle.

16. The system of claim 11, wherein each of the one or more restriction strips is configured with a width that is larger than or equal to a minimum width.

17. The system of claim 16, wherein the minimum width is defined to prevent the vehicle from penetrating the restriction region.

18. The system of claim 11, wherein the one or more restriction strips have ends, and wherein an end of one restriction strip overlaps with an end of another restriction strip.

19. The system of claim 11, wherein the instructions, when executed, cause the vehicle to undertake the one or more response measures includes:
calculating a distance between a location of the vehicle and the boundary of the restriction region; and
determining whether to cause the vehicle to undertake the one or more response measures based at least in part on comparing the calculated distance to a distance threshold.

20. The system of claim 11, wherein the instructions, when executed, cause the vehicle to undertake the one or more response measures includes:
calculating an estimated amount of time for the vehicle to approach the restriction region, or a time or distance for the vehicle to begin experience a response measure.

* * * * *